(12) United States Patent
Smyth et al.

(10) Patent No.: US 11,614,570 B1
(45) Date of Patent: Mar. 28, 2023

(54) OPTICAL LENS ASSEMBLIES WITH ADAPTIVE ELEMENTS AND RELATED SYSTEMS AND METHODS

(71) Applicant: META PLATFORMS TECHNOLOGIES, LLC, Menlo Park, CA (US)

(72) Inventors: Katherine Marie Smyth, Seattle, WA (US); John Cooke, Bothell, WA (US); Andrew John Ouderkirk, Redmond, WA (US); Spencer Allan Wells, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 928 days.

(21) Appl. No.: 16/364,845

(22) Filed: Mar. 26, 2019

(51) Int. Cl.
*G02B 5/30* (2006.01)
*G02B 5/18* (2006.01)
(Continued)

(52) U.S. Cl.
CPC ............... *G02B 3/14* (2013.01); *G02B 7/12* (2013.01); *G02B 27/0172* (2013.01)

(58) Field of Classification Search
CPC ...... G02B 3/14; G02B 26/005; G02B 26/004; G02B 3/12; G02B 13/0075; G02B 1/06; G02B 27/646; G02B 7/028; G02B 27/0025; G02B 26/0825; G02B 21/33; G02B 3/0056; G02B 7/08; G02B 26/0875; G02B 13/009; G02B 26/02; G02B 27/0068; G02B 3/0081; G02B 30/27; G02B 7/04; G02B 15/00; G02B 2207/115; G02B 13/18; G02B 1/041; G02B 3/08; G02B 7/021; G02B 3/00; G02B 3/04; G02B 7/102; G02B 7/36; G02B 3/02; G02B 1/043; G02B 5/06;
(Continued)

(56) References Cited

U.S. PATENT DOCUMENTS

| 9,709,824 B2 * | 7/2017 | Stevens ................... G02B 3/14 |
| 10,371,936 B2 * | 8/2019 | DiDomenico ...... H01L 31/0547 |
| 10,928,558 B1 * | 2/2021 | Cooke .................... G02B 26/06 |

OTHER PUBLICATIONS

Cooke et al., "Optical Lens Assemblies, Head-Mounted Displays, and Methods Of Altering Optical Properties Of Optical Lens Assemblies", U.S. Appl. No. 16/013,837 dated Jun. 20, 2018, 65 pages.
(Continued)

*Primary Examiner* — Collin X Beatty
*Assistant Examiner* — Grant A Gagnon
(74) *Attorney, Agent, or Firm* — Greenberg Traurig, LLP

(57) ABSTRACT

The disclosed optical lens assemblies may include a deformable optical element and at least one adaptive element positioned at a peripheral region of the deformable optical element. The deformable optical element may include a substantially transparent electroactive element positioned at least partially within an optical aperture of the deformable optical element. An electrical driving circuit may be configured to apply a voltage to the electroactive element to deform the electroactive element and thus change at least one optical property of the deformable optical element. The at least one adaptive element may be positioned outside of the optical aperture and may be configured to alter a physical boundary condition of the deformable optical element. Various other methods and systems are also disclosed.

20 Claims, 27 Drawing Sheets

(51) Int. Cl.
*G02B 3/14* (2006.01)
*G02B 27/01* (2006.01)
*G02B 7/12* (2021.01)

(58) Field of Classification Search
CPC .... G02B 17/08; G02B 17/0892; G02B 26/00; G02B 26/06; G02B 3/0012; G02B 30/28; G02B 6/4214; G02B 7/023; G02B 7/09; G02B 7/28; G02B 21/02; G02B 27/0172; G02B 3/0006; G02B 7/02; G02B 13/22; G02B 23/2446; G02B 26/0883; G02B 5/005; G02B 6/4206; G02B 13/143; G02B 13/16; G02B 3/0075; G02B 5/045; G02B 1/04; G02B 1/14; G02B 13/006; G02B 13/0085; G02B 2027/0178; G02B 27/017; G02B 3/0062; G02B 3/0087; G02B 5/201; G02B 7/008; G02B 13/001; G02B 13/003; G02B 13/004; G02B 13/14; G02B 19/0042; G02B 26/08; G02B 3/06; G02B 7/026; G02B 7/182; G02B 9/34; G02B 1/10; G02B 1/11; G02B 13/0035; G02B 13/0045; G02B 17/0812; G02B 2003/0093; G02B 2027/0185; G02B 23/22; G02B 23/2438; G02B 26/007; G02B 26/0816; G02B 27/0006; G02B 27/0955; G02B 30/56; G02B 5/04; G02B 7/025; G02B 1/00; G02B 1/007; G02B 1/02; G02B 13/146; G02B 15/143105; G02B 17/0896; G02B 19/0028; G02B 26/001; G02B 27/005; G02B 27/0093; G02B 5/24; G02B 7/10; G02B 13/0025; G02B 13/0065; G02B 15/14; G02B 15/143507; G02B 17/006; G02B 17/0808; G02B 17/0856; G02B 19/0014; G02B 19/0061; G02B 21/0008; G02B 21/002; G02B 21/0028; G02B 21/34; G02B 23/145; G02B 23/2407; G02B 23/243; G02B 26/0833; G02B 26/0841; G02B 26/0866; G02B 26/0891; G02B 26/10; G02B 26/105; G02B 27/0075; G02B 27/40; G02B 3/0037; G02B 5/0278; G02B 5/1828; G02B 6/4203; G02B 6/4204; G02B 6/4246; G02B 7/022; G02B 7/1821; G02B 7/285; G02B 7/40; G02B 1/002; G02B 13/0015; G02B 13/24; G02B 15/144515; G02B 15/22; G02B 17/0694; G02B 19/0009; G02B 2027/011; G02B 2027/0152; G02B 21/0076; G02B 21/248; G02B 2207/117; G02B 23/00; G02B 23/02; G02B 23/2476; G02B 26/0808; G02B 27/0176; G02B 27/09; G02B 27/0961; G02B 27/48; G02B 27/62; G02B 27/64; G02B 3/0043; G02B 3/005; G02B 3/10; G02B 30/10; G02B 30/26; G02B 5/1814; G02B 5/1838; G02B 5/1895; G02B 5/20; G02B 5/208; G02B 5/32; G02B 6/0066; G02B 6/032; G02B 6/262; G02B 6/30; G02B 7/14; G02B 7/38; G02B 1/005; G02B 1/113; G02B 1/116; G02B 1/12; G02B 1/16; G02B 1/18; G02B 13/00; G02B 13/0055; G02B 13/0095; G02B 13/02; G02B 13/08; G02B 15/10; G02B 15/1421; G02B 15/1425; G02B 15/143; G02B 15/1461; G02B 15/15; G02B 15/177; G02B 17/0852; G02B 17/086; G02B 17/0884; G02B 17/0888; G02B 19/0019; G02B 2027/0107; G02B 2027/0127; G02B 2027/014; G02B 2027/0159; G02B 2027/0187; G02B 21/0016; G02B 21/025; G02B 21/06; G02B 21/24; G02B 21/26; G02B 21/361; G02B 2207/101; G02B 2207/109; G02B 23/10; G02B 23/14; G02B 25/002; G02B 26/002; G02B 26/04; G02B 26/0858; G02B 26/101; G02B 26/125; G02B 27/0031; G02B 27/0081; G02B 27/0101; G02B 27/0179; G02B 27/022; G02B 27/095; G02B 27/0972; G02B 27/0977; G02B 27/123; G02B 27/141; G02B 27/28; G02B 27/4227; G02B 27/4272; G02B 27/58; G02B 27/648; G02B 3/0031; G02B 3/0068; G02B 30/31; G02B 30/33; G02B 30/36; G02B 30/52; G02B 5/00; G02B 5/003; G02B 5/02; G02B 5/0226; G02B 5/0242; G02B 5/0257; G02B 5/0284; G02B 5/0294; G02B 5/0891; G02B 5/10; G02B 5/1876; G02B 5/23; G02B 5/284; G02B 5/3058; G02B 5/3083; G02B 6/0011; G02B 6/0025; G02B 6/021; G02B 6/02385; G02B 6/0239; G02B 6/06; G02B 6/1226; G02B 6/3538; G02B 6/3546; G02B 7/00; G02B 7/006; G02B 7/007; G02B 7/1805; G02B 7/1828; G02B 7/183; G02B 7/30; G02B 9/10; G02B 9/12; G02B 9/14; G02B 1/045; G02B 1/046; G02B 1/111; G02B 1/115; G02B 13/005; G02B 13/008; G02B 13/04; G02B 13/06; G02B 13/26; G02B 15/02; G02B 15/04; G02B 15/06; G02B 15/08; G02B 15/142; G02B 15/1435; G02B 15/143503; G02B 15/144; G02B 15/1441; G02B 15/1451; G02B 15/173; G02B 17/002; G02B 17/008; G02B 17/023; G02B 17/04; G02B 17/0828; G02B 17/0844; G02B 17/0848; G02B 19/0004; G02B 19/0023; G02B 19/0047; G02B 19/0076; G02B 19/008; G02B 19/0085; G02B 19/009; G02B 2006/12102; G02B 2006/10104; G02B 2006/12107; G02B 2006/1213; G02B 2006/12171; G02B 2027/0118; G02B 2027/0132; G02B 2027/0134; G02B 2027/015; G02B 2027/0154; G02B 2027/0181; G02B 2027/0194; G02B 21/00; G02B 21/0004; G02B 21/0012; G02B 21/0032; G02B 21/0036; G02B 21/006; G02B 21/0072; G02B 21/04; G02B 21/16; G02B 21/22; G02B 21/30; G02B 21/32; G02B 21/362; G02B 21/367; G02B 2207/113; G02B 23/08; G02B 23/12; G02B 23/16; G02B 23/2423; G02B 23/2461; G02B 23/2469; G02B 23/26; G02B 25/001; G02B 26/085; G02B 26/108; G02B 27/0018; G02B 27/0037; G02B 27/0103; G02B 27/027; G02B 27/1006; G02B 27/1013; G02B 27/1033; G02B 27/1053; G02B 27/1066; G02B 27/1086; G02B 27/12; G02B 27/126; G02B 27/144; G02B 27/145; G02B 27/20; G02B 27/30; G02B 27/42; G02B 27/4205; G02B 27/4216; G02B 27/56; G02B 27/644; G02B 3/0018; G02B 3/0025; G02B 30/24; G02B 30/29; G02B 30/30; G02B 30/35; G02B 30/50; G02B 5/001; G02B 5/008; G02B 5/0215; G02B 5/0236; G02B 5/0263; G02B 5/0268; G02B 5/0816; G02B 5/122; G02B 5/18; G02B 5/1809; G02B 5/1847; G02B 5/205; G02B 5/206; G02B 5/223; G02B 5/286; G02B 5/30; G02B 5/3016; G02B 6/0001; G02B 6/0036; G02B 6/0043; G02B 6/005; G02B 6/0073; G02B 6/02052; G02B 6/02195; G02B 6/02333; G02B 6/02338; G02B 6/02366; G02B 6/02371; G02B 6/02376; G02B 6/10; G02B 6/107; G02B 6/122; G02B 6/124; G02B 6/138; G02B 6/266; G02B 6/32; G02B 6/3512; G02B 6/3524; G02B 6/3528; G02B 6/353; G02B 6/3536; G02B 6/3548; G02B 6/3574; G02B 6/3576; G02B 6/3578; G02B 6/3582; G02B 6/3584; G02B 6/3594; G02B 6/3596; G02B 6/3624; G02B 6/3803; G02B 6/3807; G02B 6/382; G02B 6/4212; G02B 6/422; G02B 6/4225; G02B 6/4228; G02B 6/4244; G02B 6/4249; G02B 6/428; G02B 6/43; G02B 7/003; G02B 7/105; G02B 7/1815; G02B 7/1822; G02B 7/185; G02B 7/282; G02B 7/365; G02B 9/02; G02B 9/04; G02B 9/16

See application file for complete search history.

(56) References Cited

OTHER PUBLICATIONS

Smyth et al., "Optical Lens Assemblies, Head-Mounted Displays, and Related Methods", U.S. Appl. No. 16/016,428 dated Jun. 22, 2018, 91 pages.

Ouderkirk et al., "Electroactive Polymer Devices and Nanovoided Polymer Materials and Methods and Systems for Fabrication Thereof", U.S. Appl. No. 16/106,945 dated Aug. 21, 2018, 109 pages.

* cited by examiner

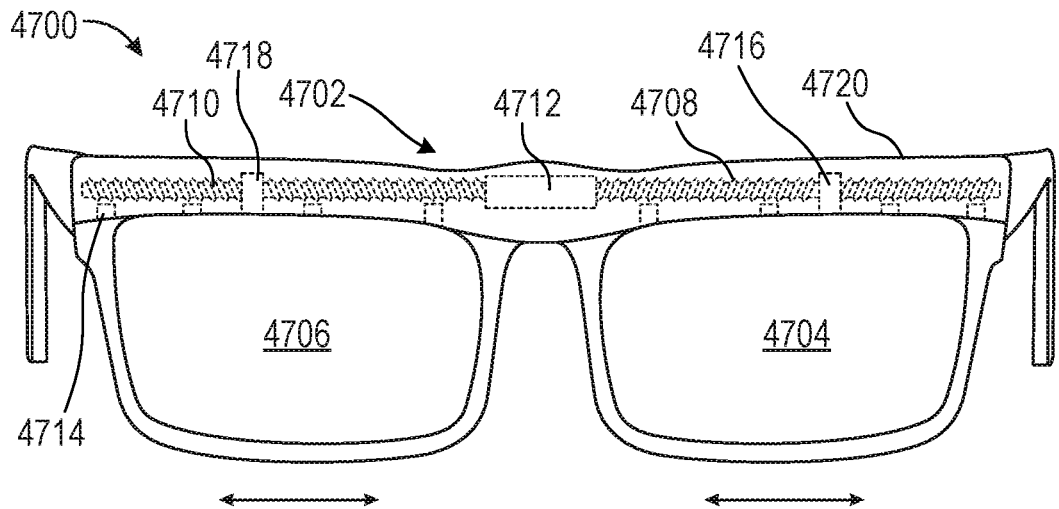
FIG. 47
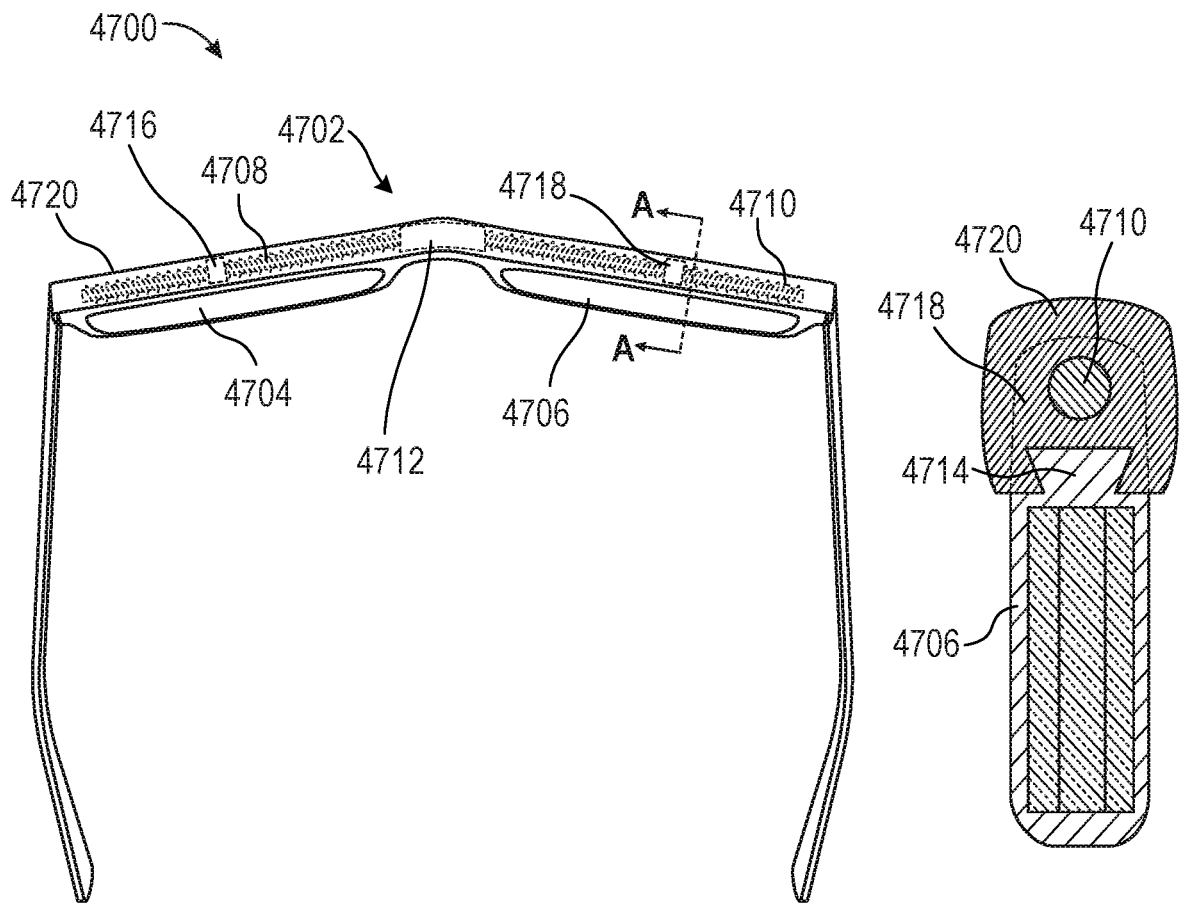
FIG. 48
FIG. 49

OPTICAL LENS ASSEMBLIES WITH ADAPTIVE ELEMENTS AND RELATED SYSTEMS AND METHODS

BACKGROUND

Adjustable-lens systems may be useful in a variety of devices, including eyeglasses, cameras, and artificial-reality (e.g., virtual-reality, augmented-reality) systems such as to adjust the focus of a display element (e.g., screen) or of a real-world image viewed by a user. The actuation of liquid lenses and other deformable optical lens assemblies typically involves generating forces in the range of about 1N-10N by an electromechanical actuator, depending on the amount of optical power shift desired and the size and construction of the optical lens assembly. Deformable portions of the optical lens assemblies may react to such forces with displacement distances in, for example, the hundreds of microns to millimeter range. Precise control over a deformed shape of a deformable optical lens can be difficult.

Actuators for deformable optical lens assemblies are conventionally designed to be small and lightweight to be considered viable as a consumer-wearable product for a head-mounted display ("HMD"), such as artificial-reality glasses or headsets. In addition, the displacement capacity of some small actuators, such as piezoelectric devices, is often dependent on a reaction force of the load, which generally increases over the actuation stroke in the case of deforming portions of optical lens assemblies. Accordingly, the design of actuation mechanisms for HMDs may involve balancing several factors, such as stroke distance capabilities, force capabilities, size and weight.

SUMMARY

As will be described in greater detail below, the instant disclosure describes optical lens assemblies with a deformable optical element and at least one adaptive element positioned at a peripheral region of the deformable optical element. The adaptive element may be configured to alter a physical boundary condition of the deformable optical element.

In some embodiments, the present disclosure includes optical lens assemblies that may include a deformable optical element and at least one adaptive element. The deformable optical element may include a substantially transparent electroactive element positioned at least partially within an optical aperture of the deformable optical element and an electrical driving circuit configured to apply a voltage to the electroactive element to deform the electroactive element and thus change at least one optical property of the deformable optical element. The at least one adaptive element may be positioned at a peripheral region of the deformable optical element outside of the optical aperture. The adaptive element may be configured to alter a physical boundary condition of the deformable optical element.

In some examples, the adaptive element may include an adjustment mechanism that is configured to alter the physical boundary condition of the deformable optical element to calibrate the deformable optical element. The adaptive element may include an adjustment mechanism that is configured to adjust a position of a contact point of the adaptive element against the peripheral region of the deformable optical element. The adjustment mechanism may be at least one of: a set screw that, when rotated, adjusts the position of the contact point; a bendable cantilever that, when bent, adjusts the position of the contact point; a rotatable cam that, when rotated, adjusts the position of the contact point; or a slide comprising a pin in a slot that, when the pin is slid in the slot, adjusts the position of the contact point. The adaptive element may also include a transducer coupled to the adjustment mechanism and configured to compress or relax the peripheral region of the deformable optical element at the contact point. The transducer may include at least one of: a linear spring, a nonlinear spring; a voice coil actuator; a nanovoided polymer actuator; or a shape memory alloy.

In some examples, the at least one adaptive element may include a plurality of adaptive elements positioned along the peripheral region of the deformable optical element. The electroactive element may include at least one of the following materials arranged in a single layer, double layer, or multi-layer structure: a dielectric elastomer material; a piezoelectric material; or an electrostrictive material. The optical lens assembly may also include another deformable optical element and at least one interpupillary distance modification mechanism configured to laterally move the deformable optical elements relative to each other to adjust an interpupillary distance of the optical lens assembly. The interpupillary distance modification mechanism may include at least one of: a rack and pinion mechanism; or a threaded rod rotatably coupled to the deformable optical element and a counter-threaded rod rotatably coupled to the other deformable optical element.

In some examples, the deformable optical element may also include a plurality of first electrode traces on a first side of the electroactive element and within the optical aperture and at least one second electrode on a second, opposite side of the electroactive element. Each first electrode trace of the plurality of first electrode traces may be individually addressable and selectively actuatable relative to the other first electrode traces of the plurality of first electrode traces.

In some embodiments, the present disclosure includes an optical lens system that includes a frame, at least one deformable optical element held by the frame, at least one adaptive element coupled to the frame, and at least one electronic display supported by the frame. The at least one deformable optical element may include a substantially transparent electroactive element positioned at least partially within an optical aperture of the deformable optical element and an electrical driving circuit configured to apply a voltage to the electroactive element to deform the electroactive element and thus change at least one optical property of the deformable optical element. The at least one adaptive element may be further coupled to a peripheral region of the deformable optical element outside of the optical aperture. The adaptive element may be configured to alter a physical boundary condition of the deformable optical element. The deformable optical element may be positioned in front of the electronic display relative to a user of the optical lens system.

In some examples, the adaptive element may include an adjustment mechanism configured to apply a force to at least a portion of the peripheral region of the deformable optical element. The adjustment mechanism ay be configured to apply the force to only a portion of the peripheral region. The deformable optical element may also include a substantially transparent rigid substrate supporting the electroactive element and a substantially transparent deformable medium between the rigid substrate and the electroactive element. The deformable optical element may be deformably into at least one of the following shapes for at least a part of its operating range: a prism lens; a freeform lens; a meniscus lens; a bi-convex lens; a plana-convex lens; a plana-concave lens; or a bi-concave lens. The adaptive element may be configured to alter at least one of the following properties of the deformable optical element: centration; cylinder power; prism; chromatic aberration; spherical aberration; field curvature; coma; astigmatism; or distortion.

In some embodiments the present disclosure includes methods of fabricating an optical lens assembly. In accordance with such methods, a substantially transparent electroactive element may be coupled to a substantially transparent substrate to form a deformable optical element. An electrical driving circuit may be electrically coupled to the electroactive element to deform the electroactive element and thus change at least one optical property of the deformable optical element when activated. At least one adaptive element may be positioned at a peripheral region of the deformable optical element. The adaptive element may be adjusted to alter a physical boundary condition of the deformable optical element.

In some examples, adjusting the adaptive element may include moving a point of contact between the adaptive element and the peripheral region of the deformable optical element. In additional examples adjusting the adaptive element may include offsetting a load experienced by an electromechanical actuator that is configured to deform the deformable optical element.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 47 shows a front view of an optical lens assembly including an interpupillary distance modification mechanism, according to at least one embodiment of the present disclosure.

FIG. 48 shows a top view of the optical lens assembly of FIG. 47.

FIG. 49 shows a cross-sectional view of the optical lens assembly of FIGS. 47 and 48, taken at line A-A of FIG. 48.

Figure 1:
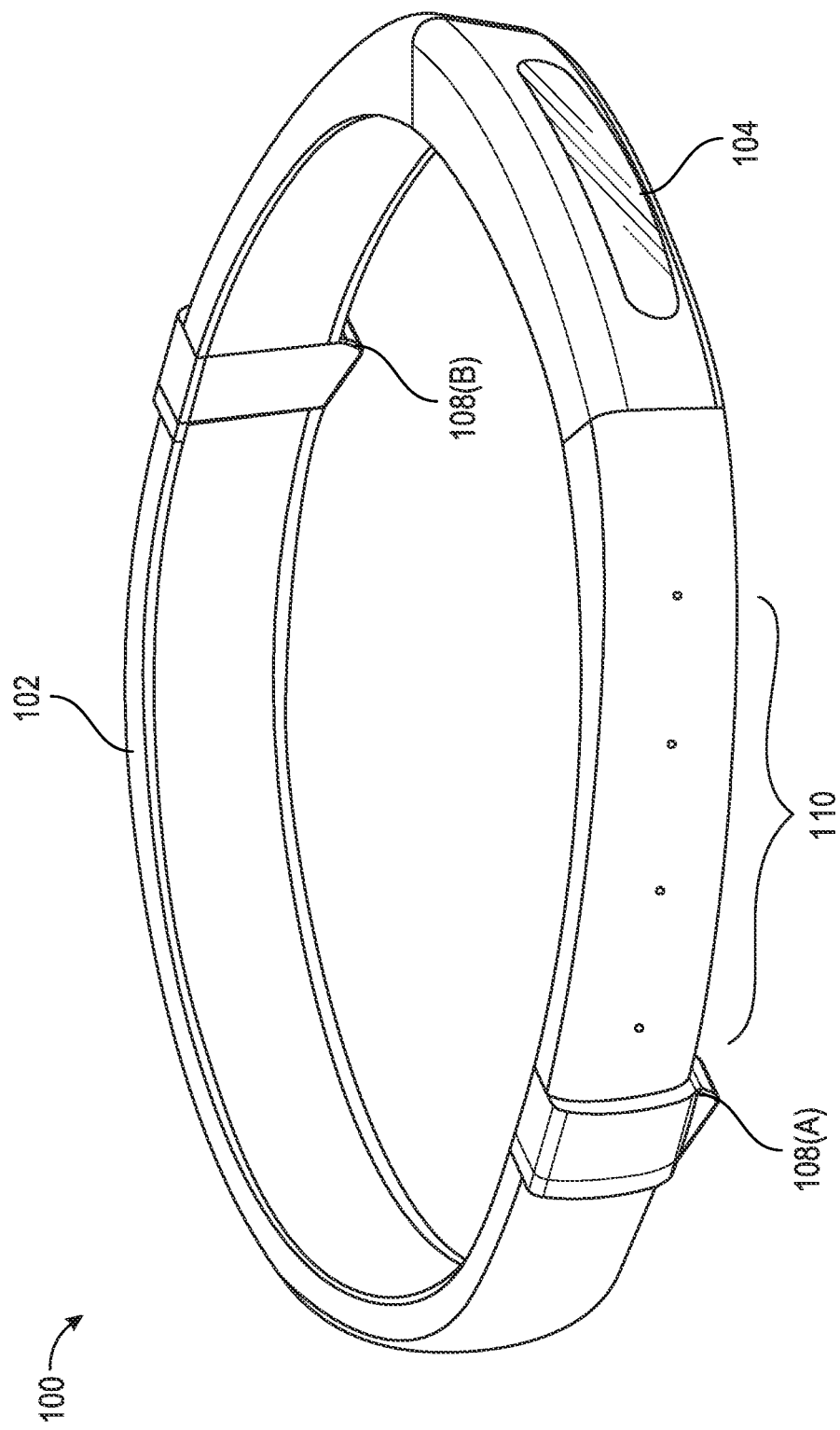
FIG. 1 is an illustration of an example artificial-reality headband that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for improved control of deformable optical lenses. As will be explained in greater detail below, embodiments of the instant disclosure may include adaptive elements positioned at peripheral regions of deformable optical lenses to alter at least one physical boundary condition thereof. The deformable optical lenses may include electroactive elements that, upon application of a sufficient voltage, deform to change an optical property of the deformable optical lenses. By altering the physical boundary conditions with an adaptive element, the shape, position, and other properties of the deformable optical lenses may be modified and controlled.

Figure 2:
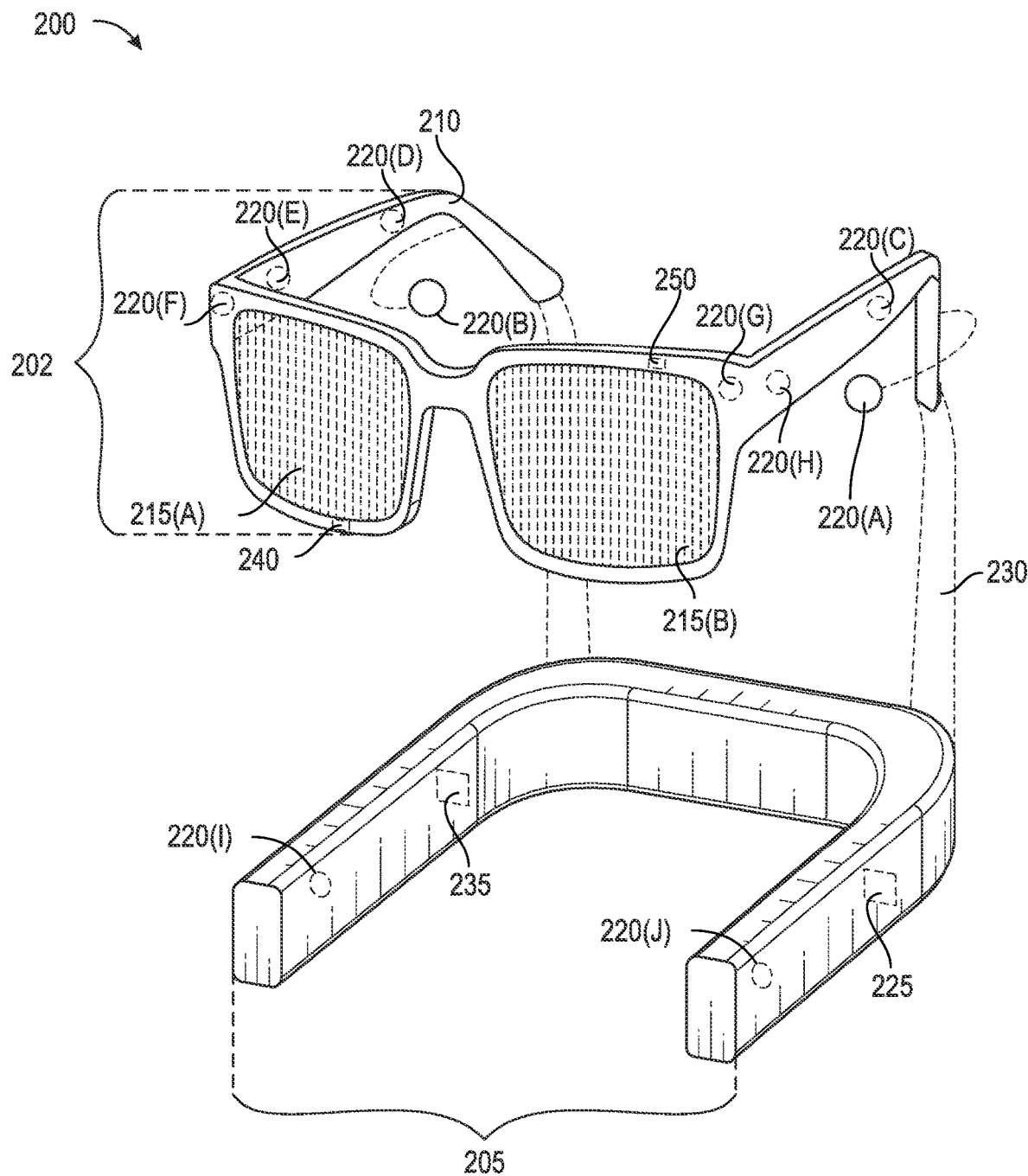
FIG. 2 is an illustration of example augmented-reality glasses that may be used in connection with embodiments of this disclosure.
Figure 3:
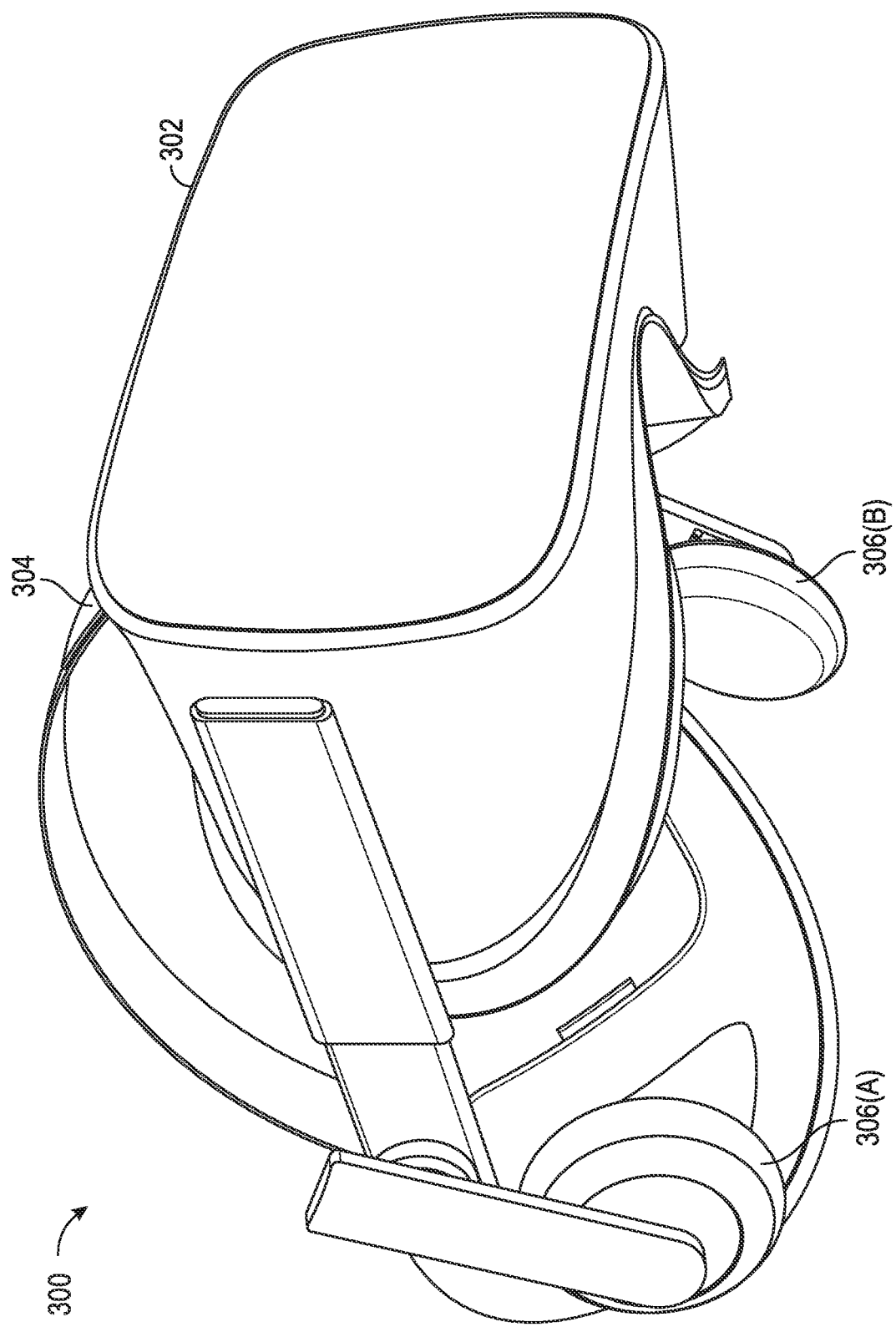
FIG. 3 is an illustration of an example virtual-reality headset that may be used in connection with embodiments of this disclosure.
Figure 52:
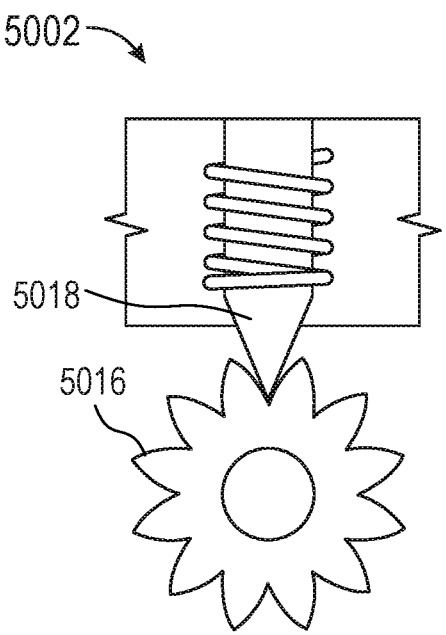
FIG. 52 shows a side view of a portion of the interpupillary distance modification mechanism of FIG. 50.
Figure 53:
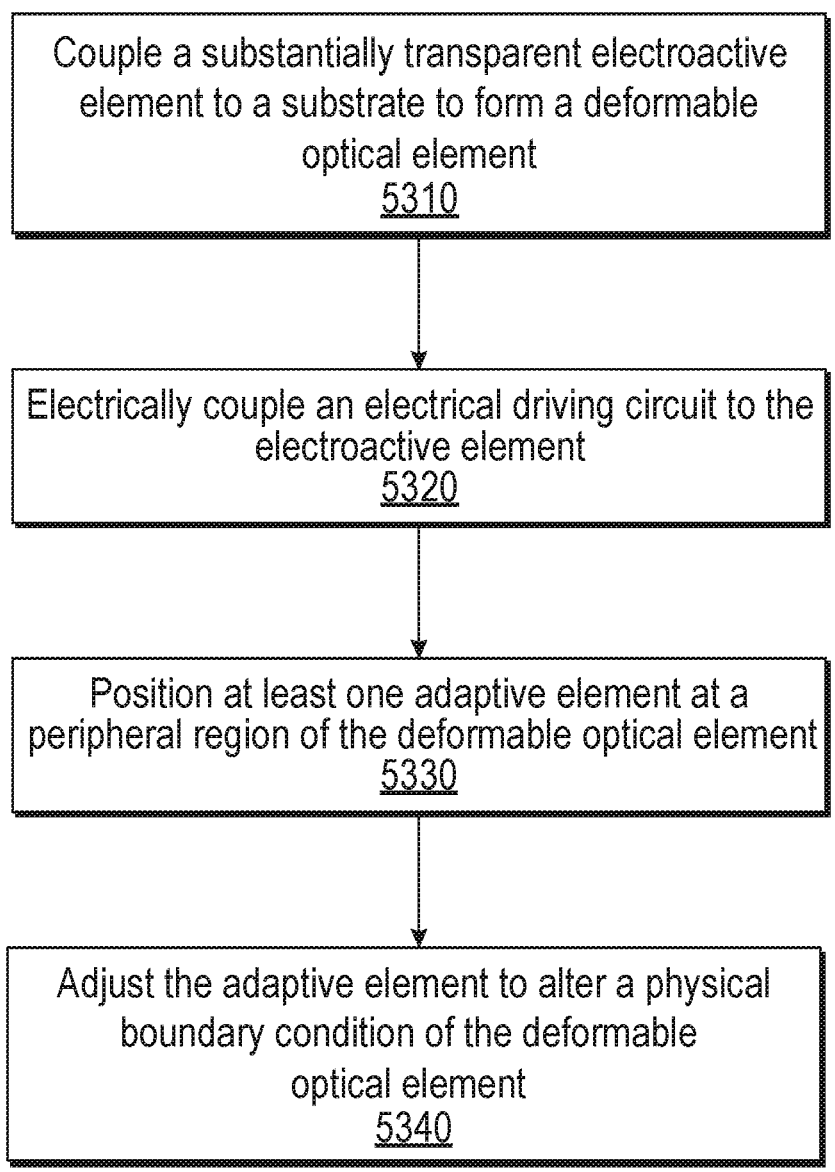
FIG. 53 is a flow diagram illustrating a method of fabricating an optical lens assembly, according to at least one embodiment of the present disclosure.
Figure 54:
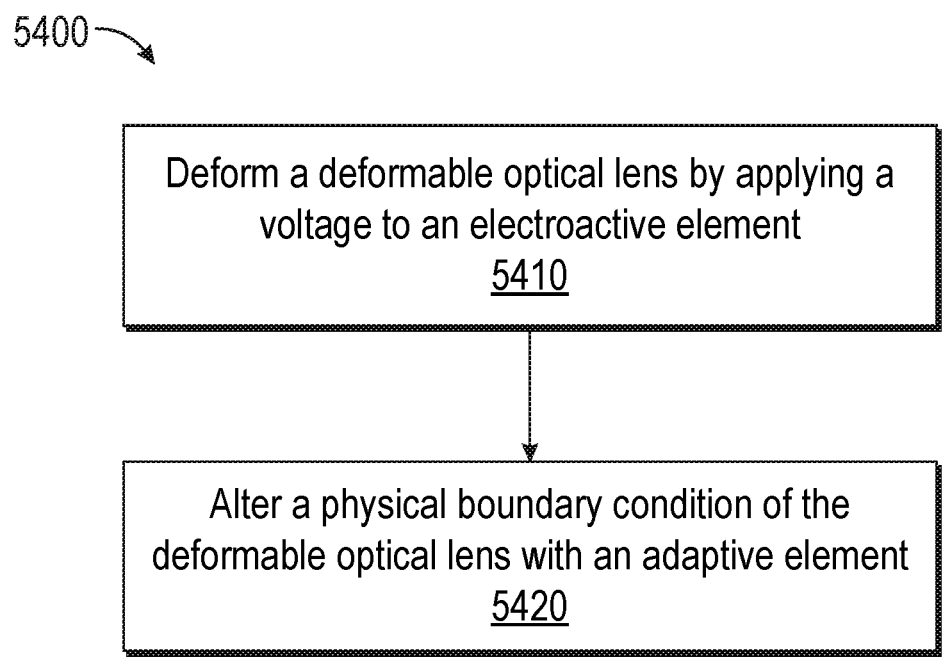
FIG. 54 is a flow diagram illustrating a method of operating an optical lens assembly, according to at least one embodiment of the present disclosure.

The following will provide, with reference to FIGS. 1-3, detailed descriptions of various artificial-reality systems. With reference to FIGS. 4-19, 21-31, and 33-52, detailed descriptions of various optical lens assemblies and adaptive elements are provided. Detailed descriptions of a plot of force and displacement applied to an optical lens assembly are provided with reference to FIG. 20. With reference to FIG. 32, detailed descriptions of a plot of maximum displacement of a deformable optical element at various spring constants are provided. With reference to FIGS. 53 and 54, detailed descriptions of methods of fabrication and use of optical lens assemblies are provided.

Embodiments of the present disclosure may include or be implemented in conjunction with various types of artificial-reality systems. Artificial reality is a form of reality that has been adjusted in some manner before presentation to a user, which may include a virtual reality, an augmented reality, a mixed reality, a hybrid reality, or some combination and/or derivative thereof. Artificial-reality content may include completely generated content or generated content combined with captured (e.g., real-world) content. The artificial-reality content may include video audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof that are used to, e.g., create content in an artificial reality and/or are otherwise used in (e.g., to perform activities an artificial reality.

Artificial-reality systems may be implemented in a variety of different form factors and configurations. Some artificial-reality systems may be designed to work without near-eye displays (NEDs), an example of which is an augmented-reality system 100 in FIG. 1. Other artificial-reality systems may include an NED that also provides visibility into the real world (e.g., an augmented-reality system 200 in FIG. 2) or that visually immerses a user in an artificial reality (e.g., a virtual-reality system 300 in FIG. 3). While some artificial-reality devices may be self-contained systems other artificial-reality devices may communicate and/or coordinate with external devices to provide an artificial-reality experience to a user. Examples of such external devices include handheld controllers, mobile devices desktop computers, devices worn by a user, devices worn by one or more other users, and/or any other suitable external system.

Turning to FIG. 1, the augmented-reality system 100 generally represents a wearable device dimensioned to fit about a body part (e.g., a head) of a user. As shown in FIG. 1, the system 100 may include a frame 102 and a camera assembly 104 that is coupled to the frame 102 and configured to gather information about a local environment by observing the local environment. The augmented-reality system 100 may also include one or more audio devices, such as output audio transducers 108(A) and 108(B) and input audio transducers 110. The output audio transducers 108(A) and 108(B) may provide audio feedback and/or content to a user, and the input audio transducers 110 may capture audio in a user's environment.

As shown, the augmented-reality system 100 may not necessarily include a NED positioned in front of a user's eyes. Augmented-reality systems without NEDs may take a variety of forms, such as head bands, hats hair bands, belts, watches, wrist bands, ankle bands, rings, neckbands, necklaces, chest bands, eyewear frames, and/or any other suitable type or form of apparatus. While the augmented-reality system 100 may not include an NED, the augmented-reality system 100 may include other types of screens or visual feedback devices (e.g., a display screen integrated into a side of the frame 102).

The embodiments discussed in this disclosure may also be implemented in augmented-reality systems that include one or more NEDs. For example, as shown in FIG. 2, the augmented-reality system 200 may include an eyewear device 202 with a frame 210 configured to hold a left display device 215(A) and a right display device 215(B) in front of a user's eyes. The display devices 215(A) and 215(B) may act together or independently to present an image or series of images to a user. While the augmented-reality system 200 includes two displays, embodiments of this disclosure may be implemented in augmented-reality systems with a single NED or more than two NEDs.

In some embodiments, the augmented-reality system 200 may include one or more sensors, such as a sensor 240. The sensor 240 may generate measurement signals in response to motion of the augmented-reality system 200 and may be located on substantially any portion of the frame 210. The sensor 240 may represent a position sensor, an inertial measurement unit (IMU), a depth camera assembly, or any combination thereof. In some embodiments, the augmented-reality system 200 may or may not include the sensor 240 or may include more than one sensor. In embodiments in which the sensor 240 includes an IMU, the IMU may generate calibration data based on measurement signals from the sensor 240. Examples of the sensor 240 may include, without limitation, accelerometers, gyroscopes, magnetometers, other suitable types of sensors that detect motion, sensors used for error correction of the IMU, or some combination thereof.

The augmented-reality system 200 may also include a microphone array with a plurality of acoustic transducers 220(A)-220(J), referred to collectively as acoustic transducers 220. The acoustic transducers 220 may be transducers that detect air pressure variations induced by sound waves. Each acoustic transducer 220 may be configured to detect sound and convert the detected sound into an electronic format (e.g., an analog or digital format). The microphone array in FIG. 2 may include, for example, ten acoustic transducers: 220(A) and 220(B), which may be designed to be placed inside a corresponding ear of the user, acoustic transducers 220(C), 220(D), 220(E), 220(F), 220(G), and 220(H), which may be positioned at various locations on frame 210, and/or acoustic transducers 220(I) and 220(J), which may be positioned on a corresponding neckband 205.

In some embodiments, one or more of the acoustic transducers 220(A)-(F) may be used as output transducers (e.g., speakers). For example, the acoustic transducers 220(A) and/or 220(B) may be earbuds or any other suitable type of headphone or speaker.

The configuration of the acoustic transducers 220 of the microphone array may vary. While the augmented-reality system 200 is shown in FIG. 2 as having ten acoustic transducers 220, the number of the acoustic transducers 220 may be greater or less than ten. In some embodiments, using higher numbers of the acoustic transducers 220 may increase the amount of audio information collected and/or the sensitivity and accuracy of the audio information. In contrast, using a lower number of the acoustic transducers 220 may decrease the computing power required by the controller 250 to process the collected audio information. In addition, the position of each acoustic transducer 220 of the microphone array may vary. For example, the position of an acoustic transducer 220 may include a defined position on the user, a defined coordinate on the frame 210, an orientation associated with each acoustic transducer, or some combination thereof.

The acoustic transducers 220(A) and 220(B) may be positioned on different parts of the user's ear, such as behind the pinna or within the auricle or fossa. Or, there may be additional acoustic transducers on or surrounding the ear in addition to the acoustic transducers 220 inside the ear canal. Having an acoustic transducer positioned next to an ear canal of a user may enable the microphone array to collect information on how sounds arrive at the ear canal. By positioning at least two of the acoustic transducers 220 on either side of a user's head (e.g., as binaural microphones), the augmented-reality device 200 may simulate binaural hearing and capture a 3D stereo sound field around about a user's head. In some embodiments, the acoustic transducers 220(A) and 220(B) may be connected to the augmented-reality system 200 via a wired connection 230, and in other embodiments, the acoustic transducers 220(A) and 220(B) may be connected to the augmented-reality system 200 via a wireless connection (e.g., a Bluetooth connection). In still other embodiments, the acoustic transducers 220(A) and 220(B) may not be used at all in conjunction with the augmented-reality system 200.

The acoustic transducers 220 on the frame 210 may be positioned along the length of the temples, across the bridge, above or below the display devices 215(A) and 215(B), or some combination thereof. The acoustic transducers 220 may be oriented such that the microphone array is able to detect sounds in a wide range of directions surrounding the user wearing the augmented-reality system 200. In some embodiments, an optimization process may be performed during manufacturing of the augmented-reality system 200 to determine relative positioning of each acoustic transducer 220 in the microphone array.

In some examples, the augmented-reality system 200 may include or be connected to an external device (e.g., a paired device), such as a neckband 205. The neckband 205 generally represents any type or form of paired device. Thus, the following discussion of the neckband 205 may also apply to various other paired devices, such as charging cases, smart watches, smart phones, wrist bands, other wearable devices, hand-held controllers, tablet computers, laptop computers and other external compute devices, etc.

As shown, the neckband 205 may be coupled to the eyewear device 202 via one or more connectors. The connectors may be wired or wireless and may include electrical and/or non-electrical (e.g., structural) components. In some cases, the eyewear device 202 and the neckband 205 may operate independently without any wired or wireless connection between them. While FIG. 2 illustrates the components of the eyewear device 202 and the neckband 205 in example locations on the eyewear device 202 and the neckband 205, the components may be located elsewhere and/or distributed differently on the eyewear device 202 and/or the neckband 205. In some embodiments, the components of the eyewear device 202 and the neckband 205 may be located on one or more additional peripheral devices paired with the eyewear device 202, the neckband 205, or some combination thereof.

Pairing external devices, such as the neckband 205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 200 may be provided by a paired device or shared between a paired device and an eyewear device, thus reducing the weight, heat profile, and form factor of the eyewear device overall while still retaining desired functionality. For example, the neckband 205 may allow components that would otherwise be included on an eyewear device to be included in the neckband 205 since users may tolerate a heavier weight load on their shoulders than they would tolerate on their heads. The neckband 205 may also have a larger surface area over which to diffuse and disperse heat to the ambient environment. Thus, the neckband 205 may allow for greater battery and computation capacity than might otherwise have been possible on a stand-alone eyewear device. Since weight carried in the neckband 205 may be less invasive to a user than weight carried in the eyewear device 202, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 205 may be communicatively coupled with the eyewear device 202 and/or to other devices. These other devices may provide certain functions (e.g., tracking, localizing, depth mapping, processing, storage, etc.) to the augmented-reality system 200. In the embodiment of FIG. 2, the neckband 205 may include two acoustic transducers (e.g., 220(I) and 220(J)) that are part of the microphone array (or potentially form their own microphone subarray). The neckband 205 may also include a controller 225 and a power source 235.

The acoustic transducers 220(I) and 220(J) of the neckband 205 may be configured to detect sound and convert the detected sound into an electronic format (analog or digital). In the embodiment of FIG. 2, the acoustic transducers 220(I) and 220(J) may be positioned on the neckband 205, thereby increasing the distance between the neckband acoustic transducers 220(I) and 220(J) and other acoustic transducers 220 positioned on the eyewear device 202. In some cases, increasing the distance between the acoustic transducers 220 of the microphone array may improve the accuracy of beamforming performed via the microphone array. For example, if a sound is detected by the acoustic transducers 220(C) and 220(D) and the distance between the acoustic transducers 220(C) and 220(D) is greater than, e.g., the distance between the acoustic transducers 220(D) and 220 (E), the determined source location of the detected sound may be more accurate than if the sound had been detected by the acoustic transducers 220(D) and 220(E).

The controller 225 of the neckband 205 may process information generated by the sensors on the neckband 205 and/or the augmented-reality system 200. For example, the controller 225 may process information from the microphone array that describes sounds detected by the microphone array. For each detected sound, the controller 225 may perform a direction-of-arrival (DOA) estimation to estimate a direction from which the detected sound arrived at the microphone array. As the microphone array detects sounds, the controller 225 may populate an audio data set with the information. In embodiments in which augmented-reality system 200 includes an inertial measurement unit, the controller 225 may compute all inertial and spatial calculations from the IMU located on the eyewear device 202. A connector may convey information between the augmented-reality system 200 and the neckband 205 and between the augmented-reality system 200 and the controller 225. The information may be in the form of optical data, electrical data, wireless data, or any other transmittable data form. Moving the processing of information generated by the augmented-reality system 200 to the neckband 205 may reduce weight and heat in the eyewear device 202, making it more comfortable to the user.

The power source 235 in the neckband 205 may provide power to the eyewear device 202 and/or to the neckband 205. The power source 235 may include, without limitation, lithium ion batteries, lithium-polymer batteries, primary lithium batteries, alkaline batteries, or any other form of power storage. In some cases, the power source 235 may be a wired power source. Including the power source 235 on the neckband 205 instead of on the eyewear device 202 may help better distribute the weight and heat generated by the power source 235.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 300 in FIG. 3, that mostly or completely covers a user's field of view. The virtual-reality system 300 may include a front rigid body 302 and a band 304 shaped to fit around a user's head. The virtual-reality system 300 may also include output audio transducers 306(A) and 306(B). Furthermore, while not shown in FIG. 3, the front rigid body 302 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in the augmented-reality system 200 and/or the virtual-reality system 300 may include one or more liquid crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 200 and/or the virtual-reality system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the augmented-reality system 100, the augmented-reality system 200, and/or the virtual-reality system 300 may include one or more optical sensors, such as two-dimensional (2D) or three-dimensional (3D) cameras, time-offlight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 1 and 3, the output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

In some embodiments, optical lens assemblies of the present disclosure (such as may be employed in any of the artificial-reality systems 100, 200, and 300) may include a deformable optical element that, when deformed, changes at least one optical property (e.g., an accommodative optical property, an adaptive optical property, etc.) of the optical lens assemblies. The deformable optical element may be deformed in part by at least one primary actuator. The primary actuator may include a substantially transparent electroactive element that is positioned at least partially within an optical aperture of the deformable optical element, which may be actuated by an electrical driving circuit. The primary actuator may, optionally, additionally include an electromechanical actuator positioned to apply a force to a peripheral region of the electroactive element.

Deformation profiles of the deformable optical element may be affected in part by physical boundary conditions of the deformable optical element. In some embodiments, the optical lens assemblies of the present disclosure may also include at least one adaptive element that is positioned at a peripheral region of the electroactive element (e.g., outside of the optical aperture). The adaptive element may be configured to alter a physical boundary condition of the electroactive element and, therefore, to alter a deformation profile of the deformable optical element.

In some examples, the phrase "deformable optical element" may refer to an element (including one or more materials or sub-elements) that is configured to be deformed to alter an optical property (e.g., an accommodative property or an adaptive optical property) of the optical lens assembly. In some examples, the term "accommodative" or "accommodation" may refer to changing an optical power. In some examples, the term "adaptive" may refer to tunability for providing control, compensation, and/or correction of wave front errors such as distortion and aberration(s).

In some examples, the phrase "substantially transparent" may refer to an element exhibiting greater than about 20% transmissivity and less than about 10% haze in the visible light spectrum. In additional examples, the term "substantially," in reference to a given parameter, property, or condition may generally refer to a degree that one of ordinary skill in the art would understand that the given parameter, property, or condition is met with a small degree of variance, such as within acceptable manufacturing tolerances. By way of example, depending on the parameter, property, or condition that is substantially met, the parameter, property, or condition may be at least 90% met, at least 95% met, or at least 99% met.

In some examples, the term "electroactive" may refer to a property of a material or composite material that deforms in response to an application of electrical energy (e.g., a voltage) and may generate electrical energy when strained or deformed. Electroactive materials, as described in some examples of this disclosure, may function as actuators (e.g., transducers) or as a component of actuators for deforming optical lens assemblies. The term "optical aperture" may, in some examples, refer to a portion of an optical lens assembly, deformable optical element, and/or HMD through which a user may view a virtual image and/or a real-world environment.

Figure 4:
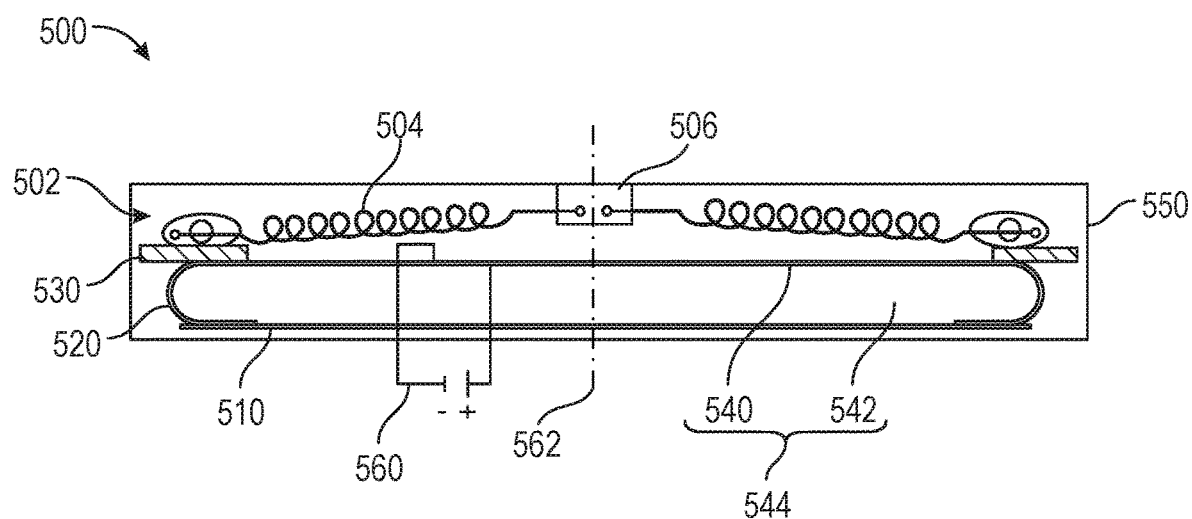
FIG. 4 is a cross-sectional side view of an optical lens assembly in a neutral, non-actuated state, according to at least one embodiment of the present disclosure.

The adaptive elements described herein may augment the force and/or displacement applied by at least one primary actuator and/or may alter a physical boundary condition of deformable optical elements in a variety of ways using a variety of techniques. In addition, the adaptive elements may offset a load experienced by a primary actuator. FIG. 4 illustrates one example of an optical lens assembly 500 that includes an adaptive element. As shown in this figure, the optical lens assembly 500 in a non-actuated state may include an adaptive element including a rotatable cam 502 and a spring 504 for augmenting deformation of a deformable optical element 544 (including a substantially transparent electroactive element 540 and a deformable medium 542) by a primary actuator. In this example, the primary actuator may be or include the electroactive element 540 that is deformable upon application of a sufficient voltage by an electrical driving circuit 560. In this example, the optical lens assembly 500 may include a substantially transparent support element 510 coupled to a peripheral region 520 of the electroactive element 540. The cam 502 may abut against a force distributor ring 530 coupled to the peripheral region 520 of the electroactive element 540. A housing 550 may support the other components of the optical lens assembly 500.

Materials suitable for the electroactive element 540 may include, for example, piezoelectric and electrostrictor polymers, ceramics, and minerals; dielectric elastomers; ionic polymer conductors; etc. By way of example and not limitation, elastic piezoelectric polymers may be employed, such as bi-axial polyvinylidene fluoride ("PVDF") or co-polymer poly(vinylidene fluoride-co-trifluoroethylene) ("PVDF-TrFE"). Single crystal materials that may be suitable for the electroactive element 540 include, for example, $K_{0.5}Na_{0.5}NbO_3$ ("KNN"), barium titanate, lithium niobate, lithium tetraborate, quartz, $Pb(Mg_{1/3}Nb_{2/3})O_3$—$PbTiO_3$ ("PMN-PT"), $Pb(Zn_{1/3}Nb_{2/3})O_3$—$PbTiO_3$ ("PZN-PT"), etc. In additional examples, the electroactive element 540 may be or include a polycrystalline material. The material of the electroactive element 540 may have a perovskite-type crystallography.

In some examples, the material of the electroactive element 540 may include a ceramic material (e.g., a polycrystalline ceramic material), such as a hot-pressed (e.g., pressed at high pressure and hot isostatic pressure), vacuum sintered, spark plasma sintered, and/or microwave sintered ceramic material. In such examples, a precursor powder material may be pressed and/or heated to form the electroactive element 540. Powder may be formed by various methods, such as by grinding the material, abrading the material, chemical co-precipitation, and/or sol-gel and gel combustion. In some embodiments, a green body may initially be formed prior to hot-pressing and/or sintering, such as by tape casting, slip casting, or gel casting a powdered ceramic material.

For example, hot-pressed lead zirconate titanate ("PZT") may be used for the electroactive element 540. In this example, the hot-pressing process may increase a density of the PZT (relative to conventional processes), which may in turn increase the transmissivity and optical transparency of the electroactive element 540 (since, e.g., increased densities may lower the effects of scattering, which may negatively impact transmissivity).

In some embodiments, the density of the hot-pressed PZT (or other materials formed from a powdered precursor) may be further increased by including a dopant, such as niobium (Nb), lanthanum (La), barium (Ba), etc. In these embodiments, this increase in density may further increase the transmissivity and optical transparency of the electroactive element 540. Additional examples of hot-pressed polycrystalline ceramic materials (which may or may not include a dopant for further increasing the density) may include KNN, barium titanate, lead zirconate titanate ("PZT"), PMN-PT, and/or PZN-PT. Such materials may be fabricated by hot-pressing (e.g., applying heat and pressure to) a powdered ceramic material or powdered ceramic compact, which may optionally include a dopant (e.g., a powdered dopant), as described above. In some embodiments, the resulting material may be polished.

Conductive electrode materials may be operatively coupled to one or more surfaces of the electroactive element 540. One or more electrode materials may also be positioned within the electroactive element 540 between the surfaces thereof. The electrode materials may operatively couple the electrical driving circuit 560 to the electroactive material(s) of the electroactive element 540. The electrode materials may be disposed on or in a portion of major surfaces of the electroactive element 540 or may be disposed across substantially an entirety of the major surfaces of the electroactive element 540.

In some examples, the electrode materials may be or include a substantially continuous, substantially transparent, conductive material. In other examples, the electrode materials may be or include conductive wires (e.g., metallic wires) disposed on or in the electroactive element 540, such as non-intersecting (e.g., evenly spaced parallel, non-evenly spaced parallel, skew, etc.) conductive wires or intersecting (e.g., a crosshatch pattern, a square grid, etc.) conductive wires. In embodiments including intersecting conductive wires, addressable nodes may be included at intersections of the conductive wires, which may be capable of application of varying voltages at the addressable nodes (e.g., a first applied voltage at a first addressable node and a second applied voltage at a second addressable node). For example, the optical lens assembly 500 may be capable of deformation and operation in a bifocal mode by applying different voltages at different addressable nodes, or to correct for optical aberrations or distortions. In additional embodiments, the electrode materials may be arranged to have conductive branching, with a subset of conductive branches that may intersect a conductive wire and other conductive branches that may intersect with the subset of conductive branches. The conductive branching, if present, may provide for the application of a voltage across a wider area compared to embodiments with conductive wires but lacking such conductive branching.

Actuation of the electroactive element 540 by the electrical driving circuit 560 may result in deformation of the deformable optical element 544, and thereby adjustment of an optical property (e.g., an accommodative and/or an adaptive optical property) of the optical lens assembly 500. For example, deformation of the electroactive element 540 by the electrical driving circuit 560 may result in adjusting the focus of a virtual image displayed by a display element and/or of a real-world view from the perspective of the user's eye.

The deformable medium 542 may be a substantially transparent material with mechanical properties that allow for deformation upon actuation of the optical lens assembly 500. By way of example and not limitation, the deformable medium 542 may be or include a gas (e.g., air, nitrogen, etc.), a liquid (e.g., water, oil, saline solution, a high-refractive index liquid, etc.), a polymer material, a gel (e.g., a silicone gel), or a foam (e.g., a silica aerogel), etc.

The support element 510 may be or include a substantially transparent substrate that provides a protective barrier for the user's eye, for the electroactive element 540 and the deformable medium 542, and for other components of the optical lens assembly 500 (e.g., a display element, an actuator, etc.). The support element 510 may optionally include an eye-tracking element, which may be configured for estimating an interpupillary distance ("IPD") of the user's eyes, a gaze distance, and/or a focal point. The eye-tracking element, if present, may include a selective-transmission element that transmits light having a selected property and that does not transmit light that does not have the selected property. For example, the support element 510 may include a coating or material that allows visible light to pass while reflecting non-visible light (e.g., infrared light). In this example, an infrared light source may direct infrared light to the support element 510, which may be reflected onto the user's eye. An infrared camera may detect infrared light that is reflected from the user's eye and back to the support element 510, to track the position of the user's eye.

As shown in FIG. 4, the support element 510 may be a substantially planar element that does not substantially alter an image viewed through the support element 510. In other embodiments, the support element 510 may include a corrective ophthalmic lens (e.g., a positive-optical power (i.e., magnifying) lens, a negative-optical power (i.e., diminishing) lens, a lens for correction of an aberration, etc.), or another optical lens element. Optionally, an anti-reflective coating may be applied to the support element 510. The peripheral region 520 of the electroactive element 540 may be directly or indirectly (e.g., through another material) coupled to the support element 510, which may define a cavity therebetween for containing the deformable medium 542.

Figure 5:
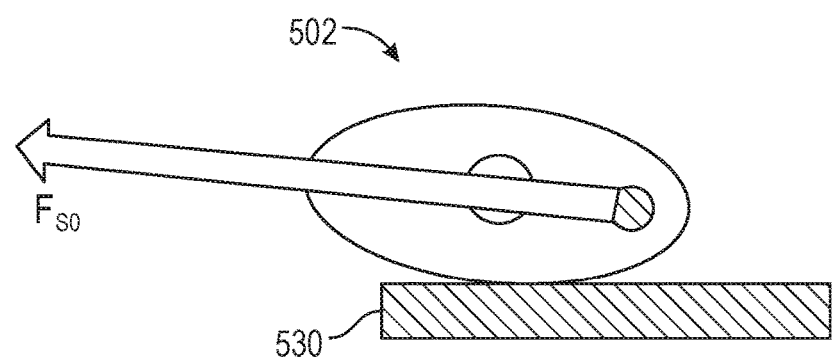
FIG. 5 is a detailed view of an adaptive element of the optical lens assembly of FIG. 4.

As shown in FIG. 5, in the neutral, non-actuated state, the cam 502 may be orientated with the spring 504 and a resulting spring force $F_{S0}$ may be aligned with a pivot of the cam 502, such that substantially no torque acts on the cam 502 from the spring 504 in this state. The spring 504 may initially be in a stretched condition between an outer portion of the cam 502 and a spring attachment structure 506 (FIG. 4) of the housing 550. The neutral, non-actuated state may be an unstable state of the cam 502, with potential energy stored in the stretched spring 504.

Figure 6:
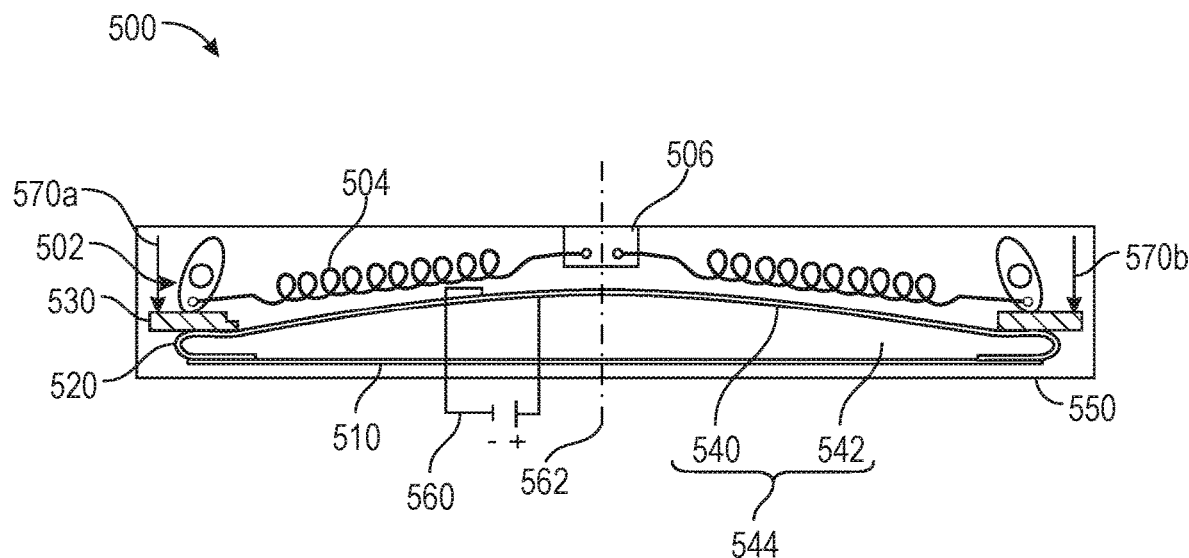
FIG. 6 is a cross-sectional side view of the optical lens assembly of FIG. 4 in an actuated state.
Figure 7:
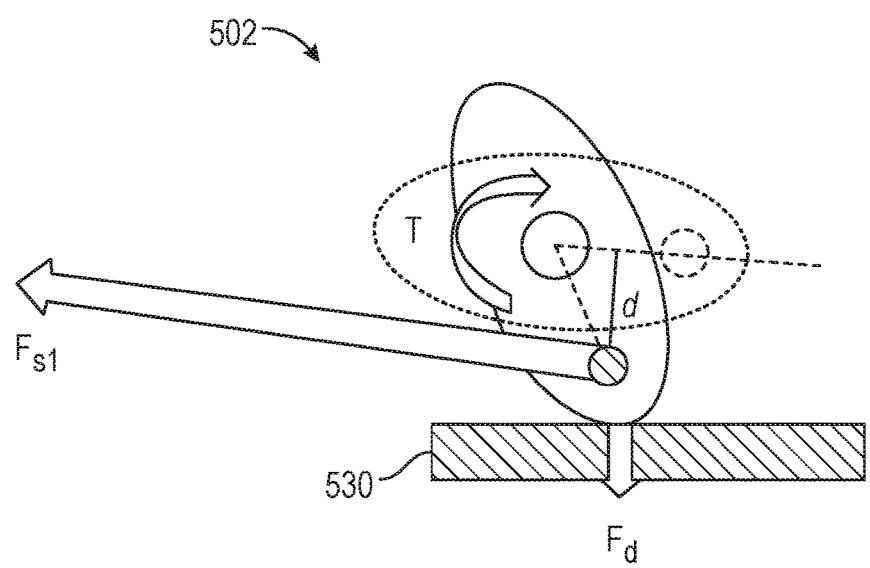
FIG. 7 is a detailed view of the adaptive element of FIG. 5 in the actuated state.

Referring to FIGS. 6 and 7, as the primary actuator (e.g., the electroactive element 540) is actuated, the force distributor ring 530 may be displaced downward (as illustrated with arrows 560a, 560b in FIG. 6). In some embodiments, primary actuation may be supplemented by an additional transducer (e.g., an electromechanical actuator, a spring, etc.) acting on the force distributor ring 530. As the force distributor ring 530 is displaced downward, the cam 502 may rotate about its pivot, creating a moment arm d (FIG. 7) between the spring attachment structure 506 (FIG. 6) and the pivot of the cam 502. The spring force $F_{S1}$ acting on the moment arm d will apply a torque T (FIG. 7) to the cam 502, resulting in the application of a secondary force $F_d$ (FIG. 7) on the force distributor ring 530. As the displacement of the force distributor ring 530 increases, the moment arm d may become larger. Accordingly, the secondary force $F_d$ applied to the force distributor ring 530 may, in some embodiments, increase during the course of actuation. There may be some drop in the spring force $F_{S1}$ (compared to the initial spring force $F_{S0}$) as a stretched length of the spring 504 is reduced during actuation, but the increasing moment arm d may compensate for this reduction so that the overall secondary force $F_d$ of the augment mechanism may decrease less, be the same, or increase during downward (from the perspective of FIGS. 4-7) stroke of the force distributor ring 530.

As shown in FIG. 6, actuation of the electroactive element 540 by application of a sufficient voltage by the electrical driving circuit 560 may result in deformation of the deformable optical element 544 to a convex shape. In this example and in other embodiments of the present disclosure, applying a voltage of opposite polarity may result in the deformable optical element 544 having a concave shape, and the peripheral region of the deformable optical element 544 may expand and move upward (with the force distributor ring 530) while a central region contracts.

An optical axis 562 (FIGS. 4 and 6) of the deformable optical element 544 may be at a center of the resulting lens shape (e.g., generally where the deformable optical element 544 is thickest for a concave shape or thinnest for a convex shape). Depending on the physical boundary conditions, actuation mechanism, application of voltage to the electroactive element 540, lens shape, etc., the optical axis 562 (i.e., the principal axis) may be aligned with a geometric center of the lens shape (as illustrated in FIGS. 4 and 6) or may be offset from the geometric center of the lens shape. In some examples, the optical axis 562 may be actively moved to a desired location in the optical lens assembly 500, such as to compensate for eye movement and/or an IPD of a given user. For example, the adaptive element may be tailored (e.g., by moving the cams 502, by adjusting a spring constant of the springs 504, etc.) and/or a controlled voltage may be applied to the electroactive element 540 to position the optical axis 562 in a desired location.

As shown in FIGS. 4 and 6 by way of example, the adaptive element may include one rotatable cam 502 and one spring 504. In additional embodiments, two cams 502 and two springs 504 or any other number of cams 502 and springs 504 as may be desired may be utilized for a given application. For example, additional cams 502 and corresponding springs 504 may be added to apply additional force, or to distribute force from the cams 502 along portions of the force distributor ring 530. The spring(s) 504 may be selected to have a spring constant to apply a desired secondary force to the force distributor ring 530. For example, a higher spring constant may result in a higher secondary force $F_d$ and a lower spring constant may result in a lower secondary force $F_d$ (FIG. 7). In addition, a shape and configuration of the cam 502 may be selected to apply a desired secondary force and displacement. For example, a placement of a spring connection point on the cam 502 may be moved farther from the pivot point of the cam 502 for a larger force (due to a larger moment arm d) and greater potential displacement. In addition, the secondary force $F_j$ to be applied by the adaptive element may be selected to be less than a return force applied by the deformable optical element 544, such that the optical lens assembly 500 may return to or toward the neutral, non-actuated state upon release or relaxation of the primary force(s) 570a, 570b by the primary actuator. In some examples, the adaptive element may offset a load experienced by an electromechanical actuator, such as the electroactive element 540 or another electromechanical actuator.

Figure 8:
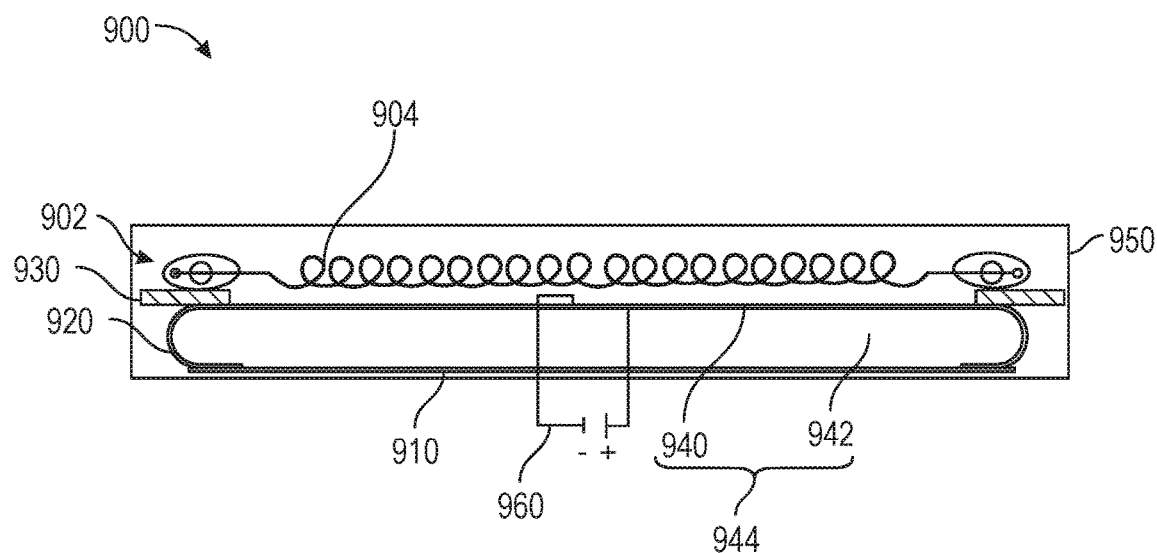
FIG. 8 is a cross-sectional side view of an optical lens assembly in a neutral, non-actuated state, according to another embodiment of the present disclosure.
Figure 9:
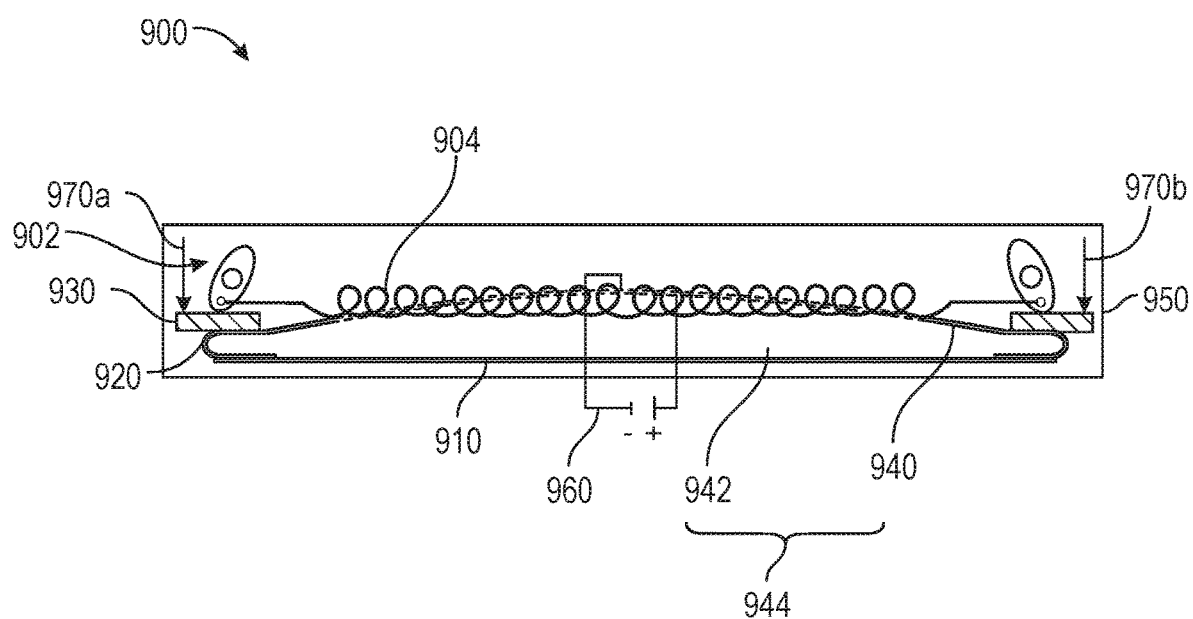
FIG. 9 is a cross-sectional side view of the optical lens assembly of FIG. 8 in an actuated state.

FIGS. 8 and 9 show an embodiment of an optical lens assembly 900 similar to the optical lens assembly 500 described above with reference to FIGS. 4-7. However, the adaptive element may include a single spring 904 extending directly between two cams 902, rather than between each cam 902 and a spring attachment structure of a housing 950. The optical lens assembly 900 may include a support element 910 coupled to and supporting a deformable optical element 944 including an electroactive element 940 and deformable medium 942. A force distributor ring 930 may be coupled to the electroactive element 940 at a peripheral region 920 thereof. The optical lens assembly 900 may operate in a similar fashion to the optical lens assembly 500 described above. However, upon application of a sufficient voltage by an electrical driving circuit 960 to the electroactive element 940, and downward movement 970a, 970b (FIG. 9) of the force distributor ring 930, the configuration of the optical lens assembly 900 shown in FIGS. 8 and 9 may balance the secondary force applied by and between the cams 902 on the force distributor ring 930, and ultimately on the electroactive element 940, should such balancing be desired for some applications. The spring 904 may be positioned along the peripheral region 920 of the deformable optical element 944 and may be covered by the housing 950.

Figure 10:
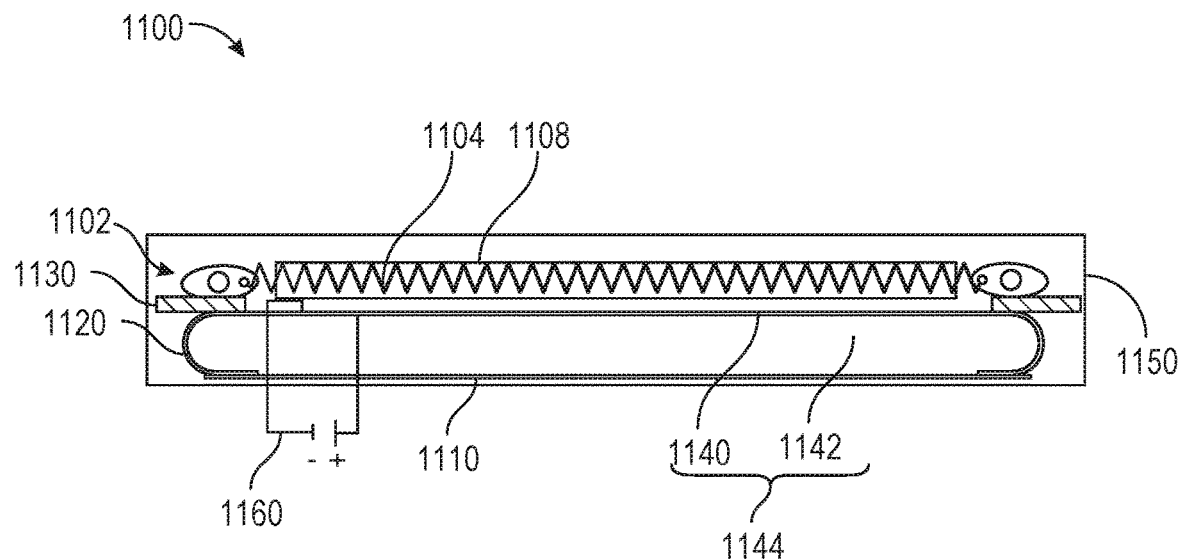
FIG. 10 is a cross-sectional side view of an optical lens assembly in a neutral, non-actuated state, according to another embodiment of the present disclosure.
Figure 11:
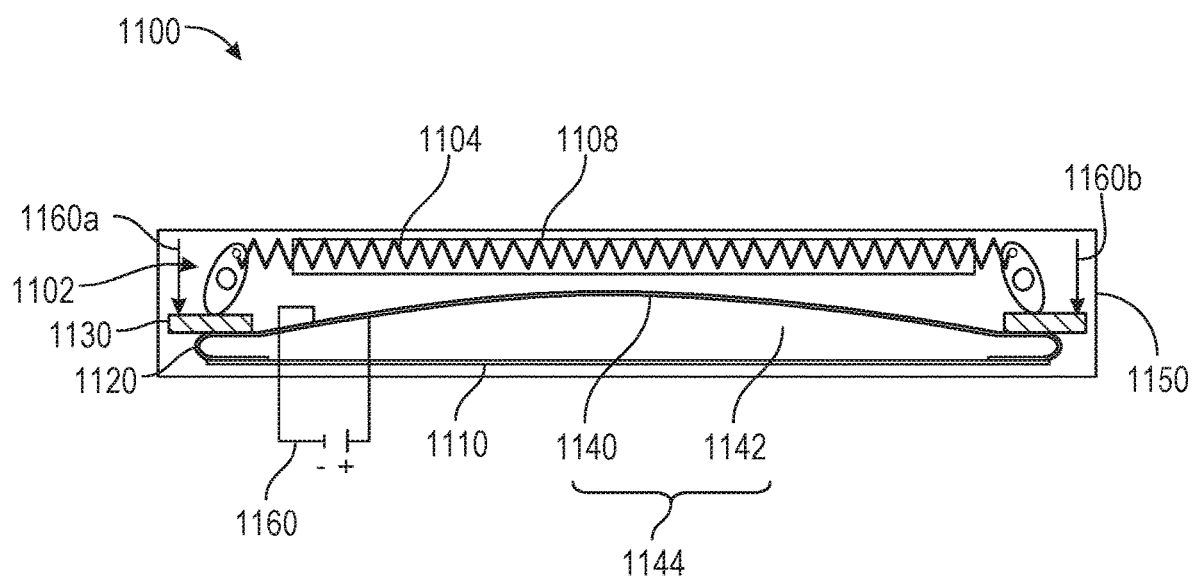
FIG. 11 is a cross-sectional side view f the optical lens assembly of FIG. 10 in an actuated state.

FIGS. 10 and 11 show an embodiment of an optical lens assembly 1100 similar to the optical lens assembly 500 described above with reference to FIGS. 4-7, but with an adaptive element including a single compression spring 1104 between two cams 1102. In this example, the optical lens assembly 1100 may include a support element 1110 coupled to and supporting a deformable optical element 1144 including an electroactive element 1140 and a deformable medium 1142. A force distributor ring 1130 may be coupled to the electroactive element 1140 at a peripheral region 1120 thereof. A tube 1108 or other suitable support structure may be positioned at least partially around the spring 1104 to inhibit buckling of the compressing spring 1104. The compression spring 1104 may extend between inner portions of the cams 1102.

As shown in FIG. 11, upon primary actuation (e.g., upon application of a voltage to the electroactive element 1140 by an electrical driving circuit 1160), the force distributor ring 1130 may move downward 1170a, 1170b and the spring 1104 may move upward relative to the housing 1150 as the spring 1104 applies a spring force to the cams 1102. Like the embodiment described above with reference to FIGS. 8 and 9, the compression spring 1104 of FIGS. 10 and 11 may balance a spring force between the cams 1102 to control deformation of the deformable optical element 1144. Alternatively, the compression spring 1104 may extend between one of the cams 1102 and an attachment structure of the housing 1150, like the embodiment shown in FIGS. 4-7, for an adaptive element that controls application of force at individual points along the peripheral region 1120 of the deformable optical element 1144.

Figure 12:
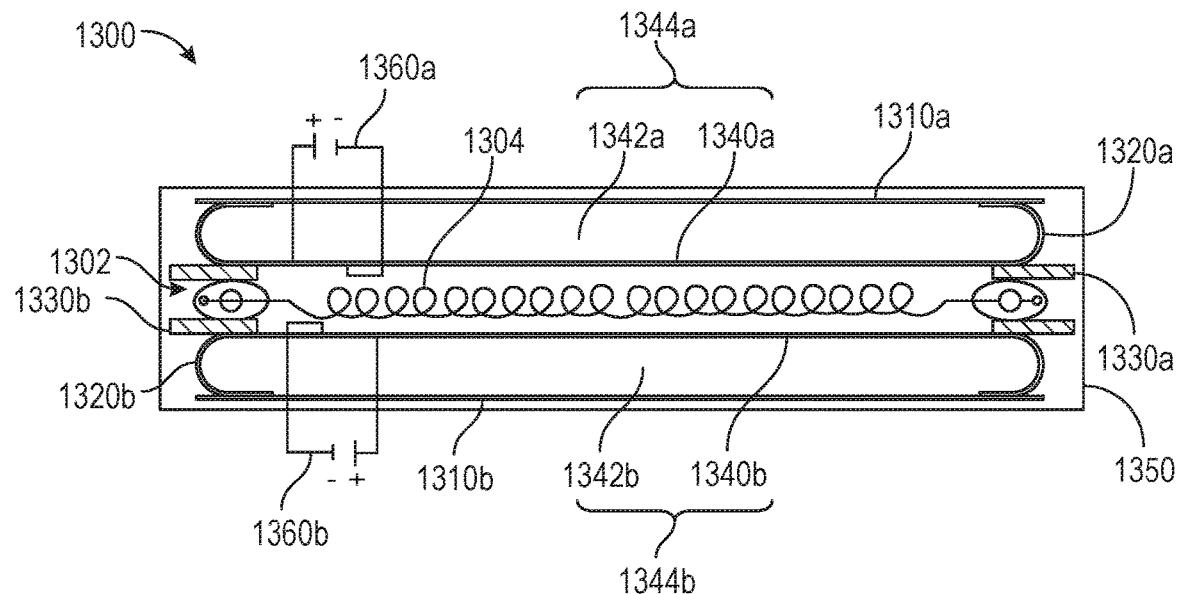
FIG. 12 is a cross-sectional side view of an optical lens assembly in a neutral, non-actuated state, according to another embodiment of the present disclosure.
Figure 13:
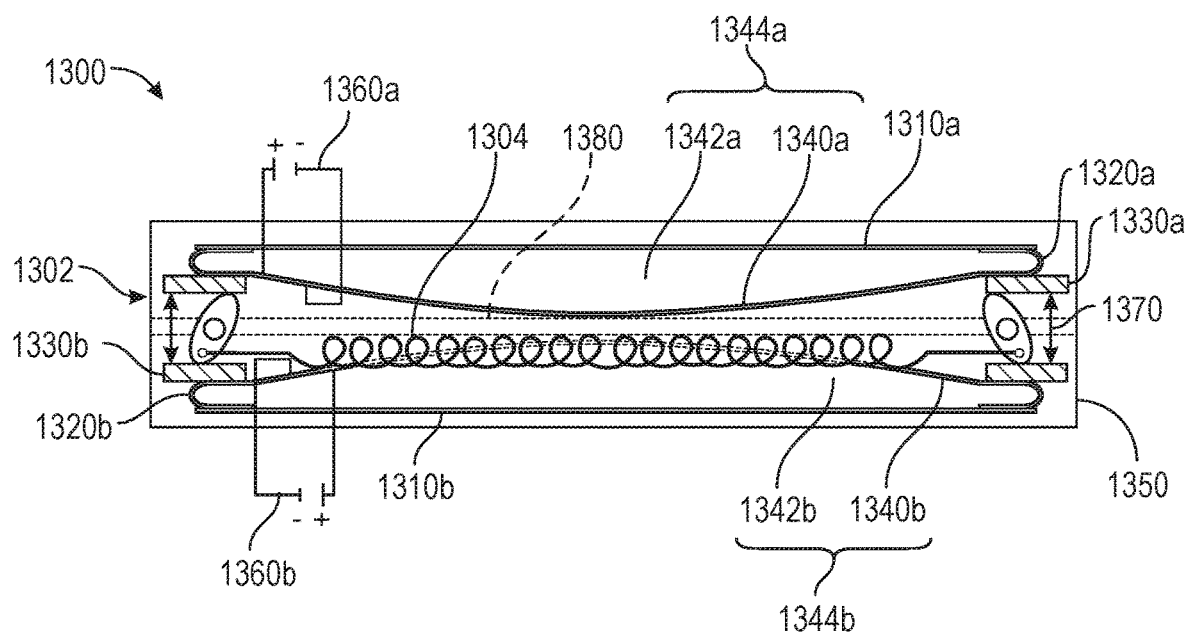
FIG. 13 is a cross-sectional side view f the optical lens assembly of FIG. 12 in an actuated state.

FIGS. 12 and 13 show an embodiment of an optical lens assembly 1300 similar to the optical lens assembly 500 described above with reference to FIGS. 4-7, but with two electroactive elements 1340a, 1340b that are configured to be simultaneously actuated as a pair. For example, the optical lens assembly 1300 may be primarily actuated using first electrical driving circuit 1360a and second electrical driving circuit 1360b operably coupled to the respective electroactive elements 1340a, 1340b. An adaptive element may include a cam 1302 and spring 1304 system that is positioned to act on peripheral regions 1320a, 1320b of the electroactive elements 1340a, 1340b through respective force distributor rings 1330a, 1330b. By way of example and not limitation, the optical lens assembly 1300 may be useful in augmented-reality systems, as explained further below.

In some examples, any relational term, such as "first," "second," "over," "top," "upward," "downward," "horizontal," "vertical," etc., may be used for clarity and convenience in understanding the disclosure and accompanying drawings, and does not necessarily connote or depend on any specific preference, orientation, or order, except where the context clearly indicates otherwise.

The optical lens assembly 1300 may include first and second substantially transparent support elements 1310a, 1310b, first and second deformable optical elements 1344a, 1344b (respectively including the first and second electroactive elements 1340a, 1340b and first and second deformable media 1342a, 1342b), the first force distributor ring 1330a coupled to a peripheral region 1320a of the first electroactive element 1340a, and the second force distributor ring 1330b coupled to a peripheral region 1320b of the second electroactive element 1340b. A display element 1380, shown in dashed lines in FIG. 13, may be positioned between the first deformable optical element 1344a and the second deformable optical element 1344b. A housing 1350 may support the components of the optical lens assembly 1300.

The spring 1304 may extend directly between two cams 1302, as shown in FIGS. 12 and 13 or, alternatively, may extend between each cam 1302 and a spring attachment structure as described above with reference to FIGS. 4-7. In the optical lens assembly 1300, the two separate force distributor rings 1330a, 1330b may be configured to move in opposite directions during actuation to augment a displacement 1370 from a primary actuator (e.g., the electroactive elements 1340a, 1340b activated by the electrical driving circuits 1360a, 1360b and/or another electromechanical actuator) and to deform the two electroactive elements 1340a, 1340b, as shown in FIG. 13. Alternatively, in some embodiments, the primary actuator and the cam 1302 may be positioned and configured to simultaneously move the force distributor rings 1330a, 1330b in the same direction (e.g., upward together or downward together, from the perspective of FIGS. 12 and 13).

In some examples, the optical lens assembly 1300 illustrated in FIGS. 12 and 13 may be used to reduce or eliminate the negative impact of a phenomenon known as the "vergence-accommodation conflict." Traditional augmented-reality displays may attempt to create the illusion that a virtual object is set at a distance in the real-world environment by displaying virtual images to the left eye and to the right eye with a relative offset, such that a user's eyes converge on the desired real-world focal point to align the left- and right-side virtual images. At the same time, the user's left and right eyes also undergo accommodation to bring the respective left- and right-side virtual images into focus. However, the distance of the real-world focal point may frequently differ from the distance of the augmented-reality display, causing a difference between the apparent vergence distance and the apparent accommodation distance of a virtual object. Unfortunately, because the human visual system is adapted to the expectation that the apparent vergence distance and the apparent accommodation distance of a real-world object will match, the mismatch frequently posed by traditional augmented-reality systems may confuse a user's vision, potentially breaking a sense of immersion—or even causing severe physical discomfort.

The optical lens assembly 1300 illustrated in FIGS. 12 and 13 may, in some embodiments, be configured to address the vergence-accommodation conflict. For example, the first deformable optical element 1344a may be positioned on a side of a display element 1380 proximate a user's eye, and the second deformable optical element 1344b may be positioned on a side of the display element 1370 opposite the user's eye. In this example, the first deformable optical element 1344a may be configured to adjust the user's view of an image rendered on the display element 1380. The second deformable optical element 1344b may be configured to counteract the adjustments of the first deformable optical element 1344a with respect to the user's view of a surrounding real-world environment. In other words, the two deformable optical elements 1344a, 1344b may together modify the apparent accommodation distance of a virtual object or scene shown on the display element 1380, while reducing or eliminating distortion of the appearance of the real-world environment through the optical lens assembly 1300.

FIGS. 14-17 show an embodiment of an optical lens assembly 1500 using an adaptive element including a buckling spring element 1504 that is configured to buckle so as to apply a secondary force against a force distributor ring 1530 to deform a deformable optical element 1544 including an electroactive element 1540 and a deformable medium 1542. The optical lens assembly 1500 may include a support element 1510 coupled to the deformable optical element 1544 at a peripheral region 1520 of the electroactive element

1540. The components of the optical lens assembly 1500 may be supported by a housing 1550 (e.g., a frame element). The buckling spring element 1504 may be or include a spring element that is initially in compression, torsion, and/or flexure, for example.

Figure 14:
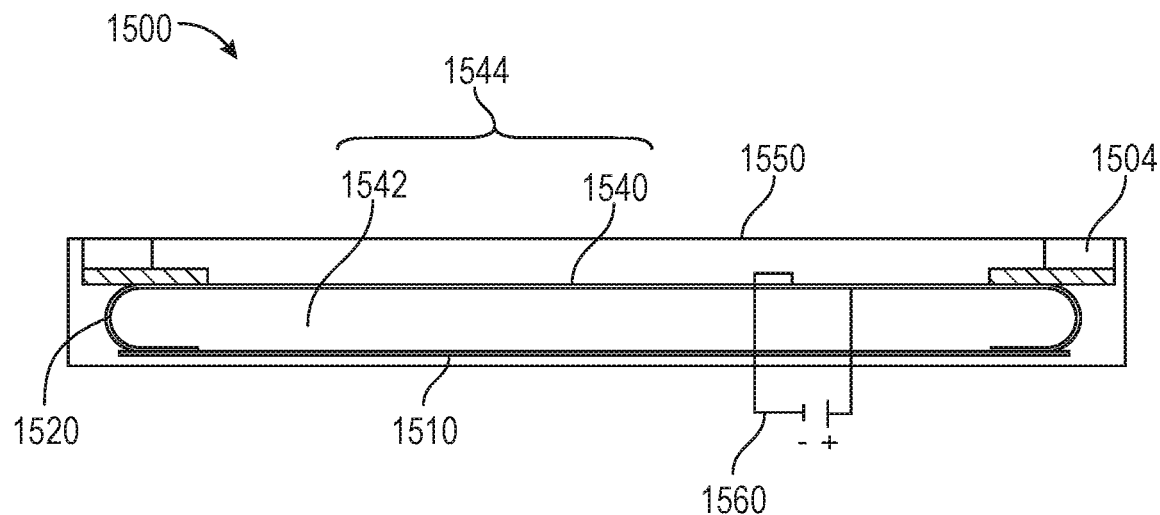
FIG. 14 is a cross-sectional side view through a central portion of an optical lens assembly in a neutral, non-actuated state according to another embodiment of the present disclosure.
Figure 15:
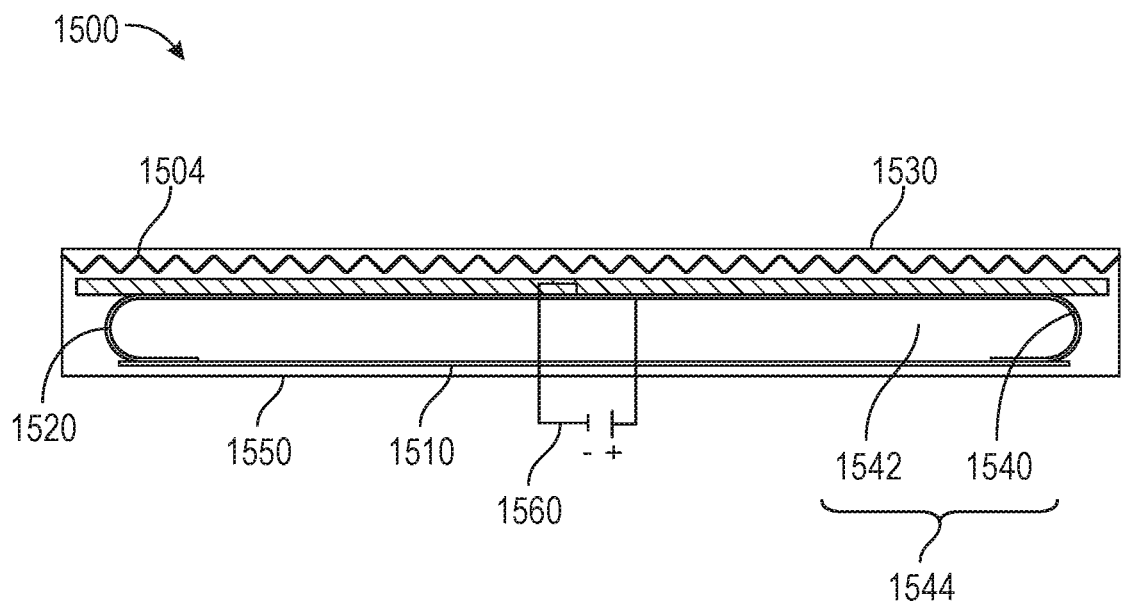
FIG. 15 is a cross-sectional side view from an edge portion of the optical lens assembly of FIG. 14.
Figure 16:
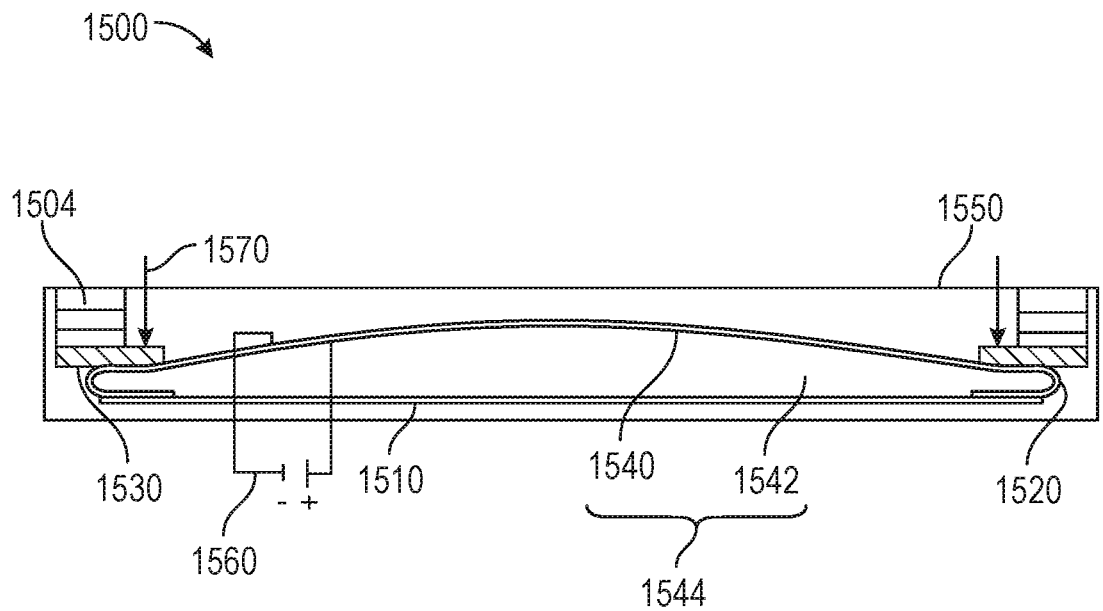
FIG. 16 is a cross-sectional side view through the central portion of the optical lens assembly of FIG. 14 in an actuated state.
Figure 17:
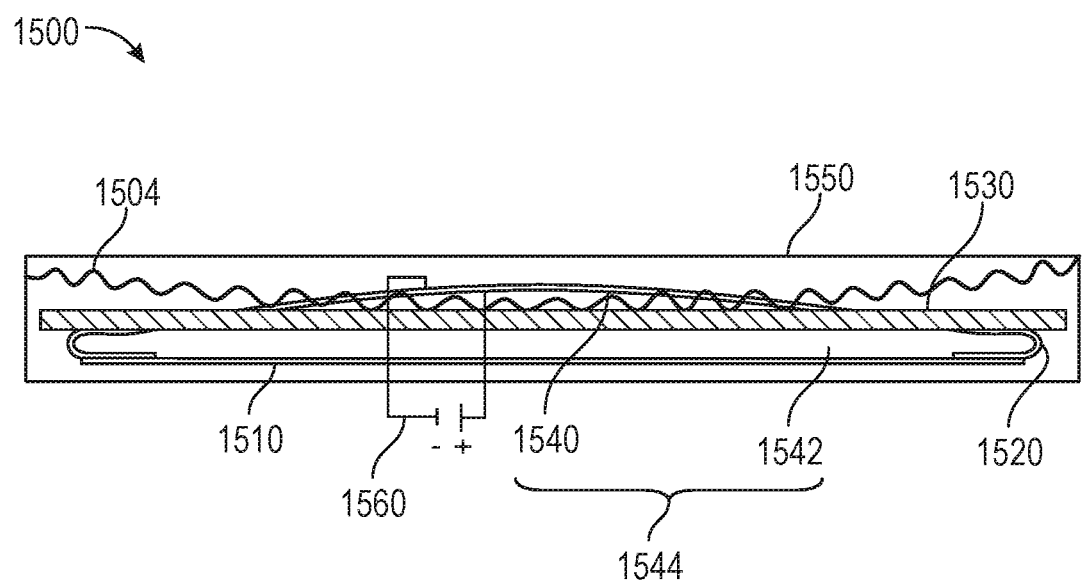
FIG. 17 is a cross-sectional side view from the edge portion of the optical lens assembly of FIG. 15.

FIGS. 14 and 15 illustrate the optical lens assembly 1500 in a neutral, non-actuated state. FIGS. 16 and 17 illustrate the optical lens assembly 1500 in an actuated state. FIGS. 14 and 16 show a cross-sectional side view through a central portion of the optical lens assembly 1500. FIGS. 15 and 17 show a cross-sectional side view from an edge portion of the optical lens assembly 1500.

During primary actuation of the electroactive element 1540 by an electrical driving circuit 1560 (and optionally another transducer), the buckling spring element 1504 may apply a secondary force to the force distributor ring 1530 to augment a displacement 1570 of the force distributor ring 1530. In the non-actuated state, the buckling spring element 1504 may be axially compressed (i.e., along a length of the buckling spring element 1504), since its neutral, uncompressed length is longer than a space in the housing 1550 containing the buckling spring element 1504. The buckling spring element 1504 may be laterally constrained by the force distributor ring 1530 and/or the housing 1550, as illustrated in FIGS. 14 and 15. The buckling spring element 1504 may be selected such that its elastic section modulus (geometry) and Young's modulus (material property) result in elastic buckling of the spring 1504 in one plane when unconstrained from the sides. As the primary actuation displaces the force distributor ring 1530, the buckling spring element 1504 may continue to buckle with an increasing force toward an equilibrium condition, thereby applying an increasing secondary force on the force distributor ring 1530, as illustrated in FIGS. 16 and 17.

Figure 18:
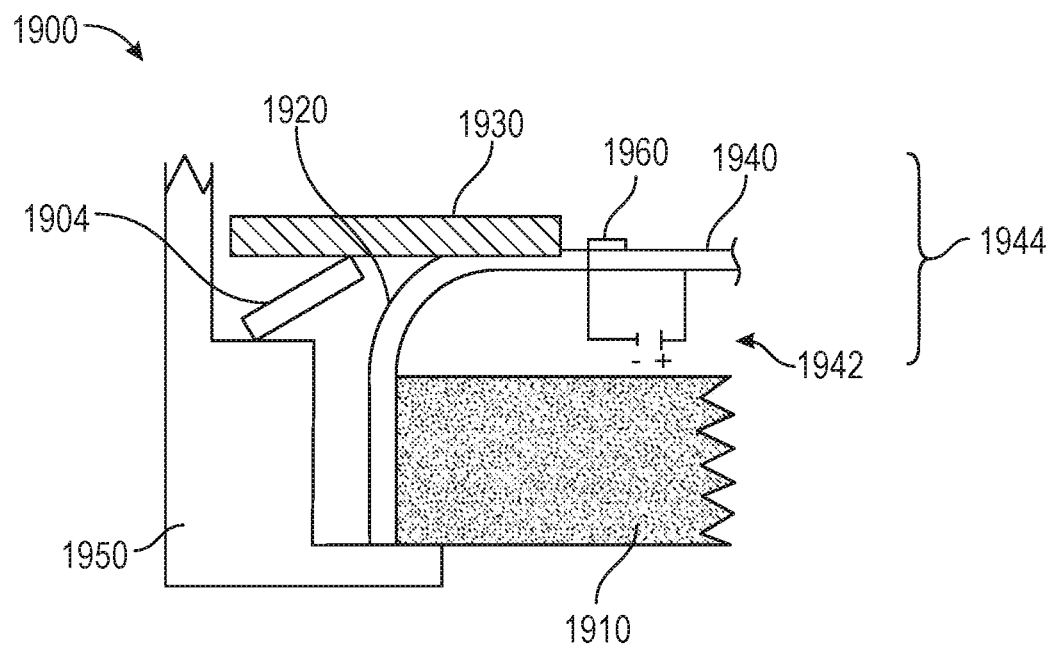
FIG. 18 is a partial cross-sectional side view of an optical lens assembly in a neutral, non-actuated state according to another embodiment of the present disclosure.
Figure 19:
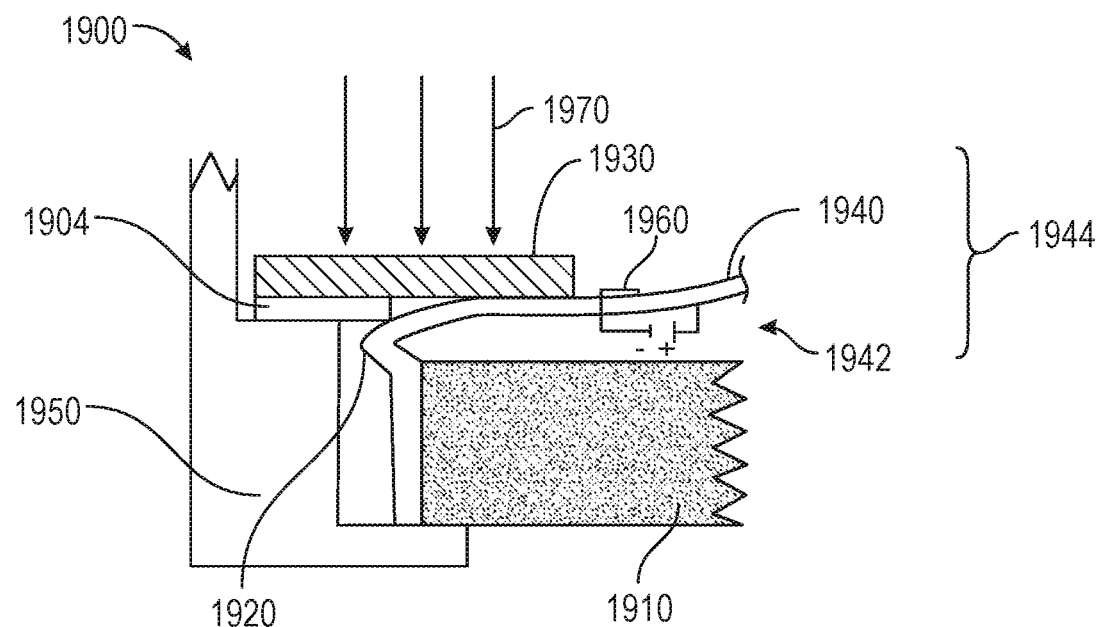
FIG. 19 is a partial cross-sectional side view of the optical lens assembly of FIG. 19 in an actuated state.

FIGS. 18 and 19 show an embodiment of an optical lens assembly 1900 in which an adaptive element includes a nonlinear disk spring 1904 that may be mounted in a housing 1950 adjacent to a peripheral region 1920 of an electroactive element 1940. In some examples, the term "nonlinear" may refer to a nonlinear force-displacement curve, which may result in load-dependent stiffness. A force distributor ring 1930 may be positioned over both the disk spring 1904 and the peripheral region 1920 of the electroactive element 1940. The optical lens assembly 1900 may also include a support element 1910 and a deformable optical element 1944 including the electroactive element 1940 and a deformable medium 1942. An electrical driving circuit 1960 may at least partially provide primary actuation of the deformable optical element 1944.

The disk spring 1904 may be configured to act in parallel to a deformation load for deforming the deformable optical element 1944. A relationship between force and displacement in the disk spring 1904 may be a cubic function that depends on its geometry, including thickness, height, and disk radius. For the primary actuator (e.g., the electroactive element 1940 and the electrical driving circuit 1960) to see a sufficient force and energy reduction for a given displacement profile, the disk spring 1904 may be selected or designed to achieve a negative spring constant near maximum stroke, which, when placed in parallel to the deformation load, may result in a leveling off or reduction in the actuator load requirement, as illustrated in FIG. 20.

Figure 20:
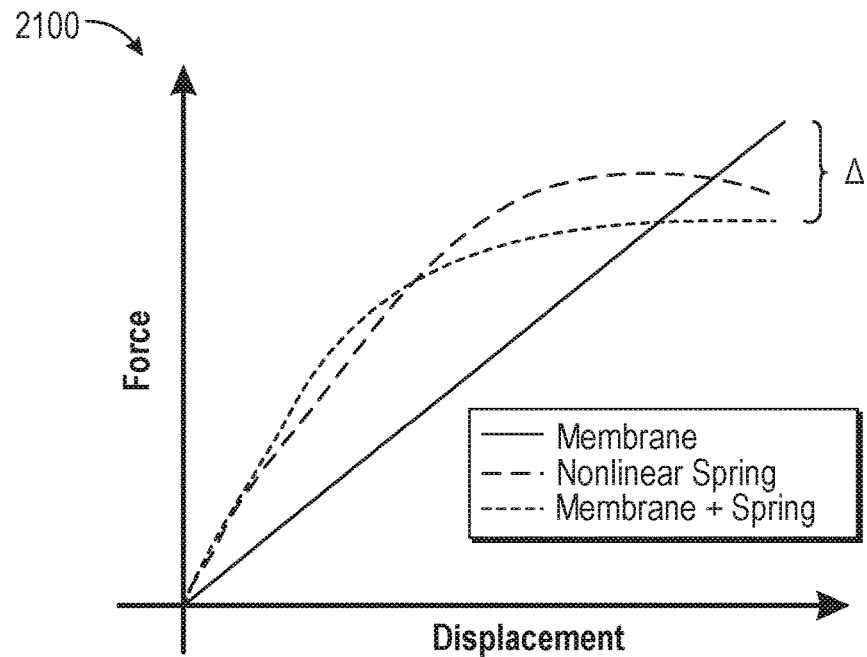
FIG. 20 is a graph showing displacement of and force applied to a force distributor ring of an optical lens assembly according to embodiments of the present disclosure.

FIG. 20 shows a plot 2100 of an example deformation load without adaptation (solid black line), an example nonlinear disk spring curve (long dashed line), and an example combined load (short dashed line) taking into consideration both the deformation load and disk spring curve. In this example, a force reduction Δ may be achieved at maximum stroke (e.g., at the state illustrated to the right of the plot 2100 of FIG. 20). In the plot 2100, the term "membrane" may refer to the electroactive element 1940.

FIGS. 18 and 19 show the states of the disk spring 1904 and deformable optical element 1944 along the peripheral region 1920 of the electroactive element 1940 when no load is applied and when a maximum primary force is applied and the force distributor ring 1930 is fully displaced 1970, respectively. In the neutral, non-actuated state (FIG. 18), the disk spring 1904 may be in its equilibrium, coned disk shape. The state shown in FIG. 18 corresponds to a leftmost point on the loading curve of FIG. 20. The state shown in FIG. 19 corresponds to a rightmost point on the loading curve of FIG. 20. At maximum stroke (FIG. 19), the disk spring 1904 may be substantially planar after compression to the maximum displacement 1970, and the electroactive element 1940 may be deformed to result in a convex lens shape. Because of the nonlinear properties of the disk spring 1904, the force reduction Δ (FIG. 20) may enable the deformation of the deformable optical element 1944 to be achieved with less input energy than would be possible without the disk spring 1904.

Figure 21:
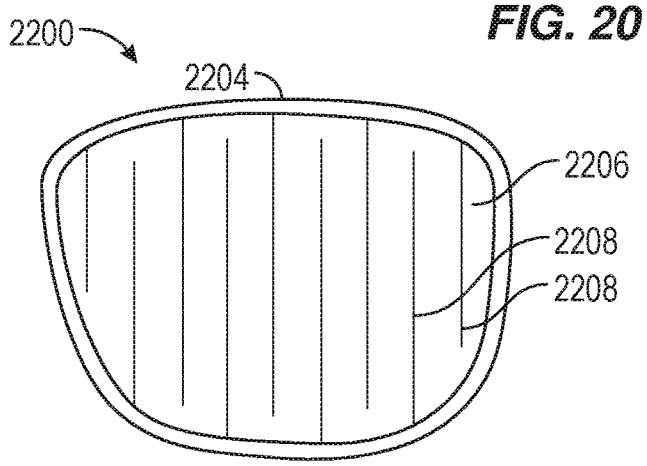
FIG. 21 is a plan view of an optical lens assembly according to at least one embodiment of the present disclosure.
Figure 22:
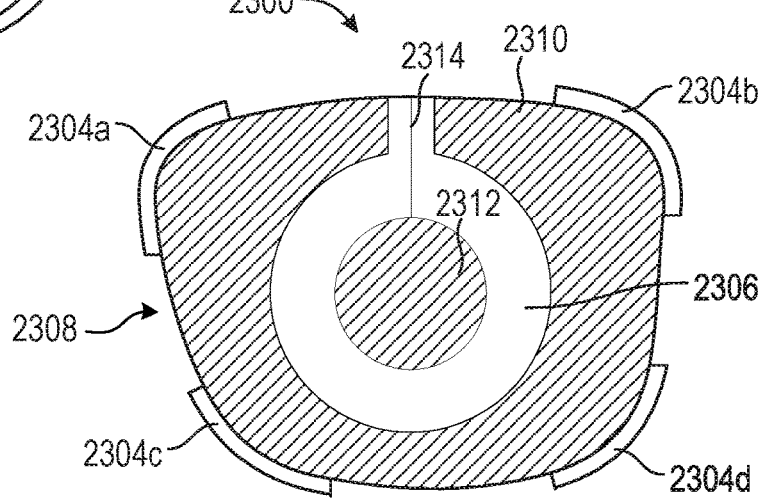
FIG. 22 is a plan view of an optical lens assembly according to another embodiment of the present disclosure.

FIGS. 21 and 22 show top views of optical lens assemblies 2200, 2300 including adaptive elements in the form of disk springs 2204, 2304 (like the disk spring 1904 of FIG. 18) positioned along a peripheral edge of respective deformable optical elements 2206, 2306. The deformable optical elements 2206, 2306 may include electroactive elements, as described above. FIG. 21 shows a continuous contour disk spring 2204 mounted along the entire edge of the optical lens assembly 2200. Since the curvature of the disk spring 2204 may not be constant in an asymmetric optical lens assembly 2200, the deflection under loading may vary locally (i.e., at different locations along a length of the disk spring 2204). FIG. 22 shows an alternative approach where disk springs 2304a, 2304b, 2304c, 2304d are positioned along only portions of the edge of the optical lens assembly 2300. Since loading is geometrically dependent, the application of sections of the disk springs 2304a, 2304b, 2304c, 2304d allows for the effective diameter of the disk springs 2304a, 2304b, 2304c, 2304d to be more widely varied than in the continuous contoured edge spring design (e.g., as shown in FIG. 21). Sections of the disk springs 2304a, 2304b, 2304c, 2304d can also be designed with constant curvature so the load and displacement are substantially uniform along an edge of the spring(s) 2304a, 2304b, 2304c, 2304d.

Non-uniform edge loading and displacement may be applied to an asymmetric lens for realizing substantially axisymmetric deflection, such as to achieve high optical quality. Accordingly, the non-uniform loading and displacement from the continuous contour or with a section disk spring design, as discussed above, may be amenable for the optical lens application.

Additionally, when the present disclosure refers to a "force distributor ring," the force distributor ring may form a complete, substantially continuous ring around an optical element like the disk spring 2204 of FIG. 21, or the force distributor ring may be formed of one or more segments around the optical element like the disk springs 2304a, 2304b, 2304c, 2304d of FIG. 22.

Referring again to FIG. 21, the deformable optical element 2206 may be actuated via conductive electrodes 2208 positioned on and/or in the electroactive element thereof. The conductive electrodes 2208 may be individually addressable and actuatable, such as to tailor a deformation of the deformable optical element 2206. The conductive electrodes 2208 are illustrated in FIG. 21 as generally linear and parallel to each other. However, in additional embodiments, the conductive electrodes 2208 may have different shapes and configurations. For example, the conductive electrodes 2208 may be nonlinear (e.g., curved, randomly or pseudo-randomly deviating from linearity, periodically deviating from linearity, etc.) and/or nonparallel to each other. In addition, at least some of the conductive electrodes 2208 may cross each other, such as to provide addressable nodes at intersections between the conductive electrodes 2208, as discussed above. Thus, the conductive electrodes 2208 may be formed for applying voltages in a variety of different configurations. Furthermore, the conductive electrodes 2208 may be provided in the form of a substantially continuous and transparent conductive material, rather than or in addition to conductive traces as illustrated in FIG. 21.

For example, as shown in FIG. 22, the optical lens assembly 2300 may include conductive electrodes 2308 in the form of substantially transparent conductive pads 2310, 2312 and/or at least one conductive trace 2314. In the illustrated example, a peripheral conductive pad 2310 may cover at least a portion of a periphery of the electroactive element 2306. A central conductive pad 2312 may be circular, and the conductive trace 2314 may provide electrical access to the central conductive pad 2312. A gap may separate the central conductive pad 2312 and the conductive trace 2314 from the peripheral conductive pad 2310, such that a voltage may be individually applied to the central conductive pad 2312 and the peripheral conductive pad 2310. Arranging the conductive pads 2310, 2312 in the manner illustrated in FIG. 23 may facilitate obtaining a substantially axis-symmetric deformation profile (i.e., having symmetry about the optical axis) in the electroactive element 2306 even in an asymmetric lens shape. Accordingly, various shapes and arrangements of conductive traces and/or conductive pads may be employed to achieve a variety of deformation profiles.

Figure 23:
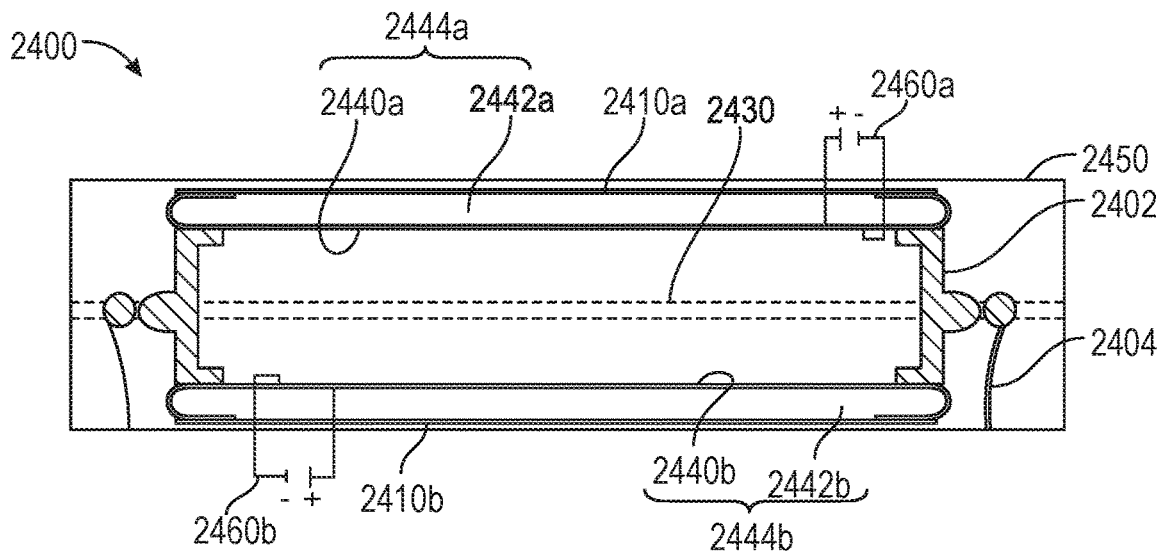
FIG. 23 is a cross-sectional side view of an optical lens assembly in a neutral, non-actuated state according to another embodiment of the present disclosure.
Figure 24:
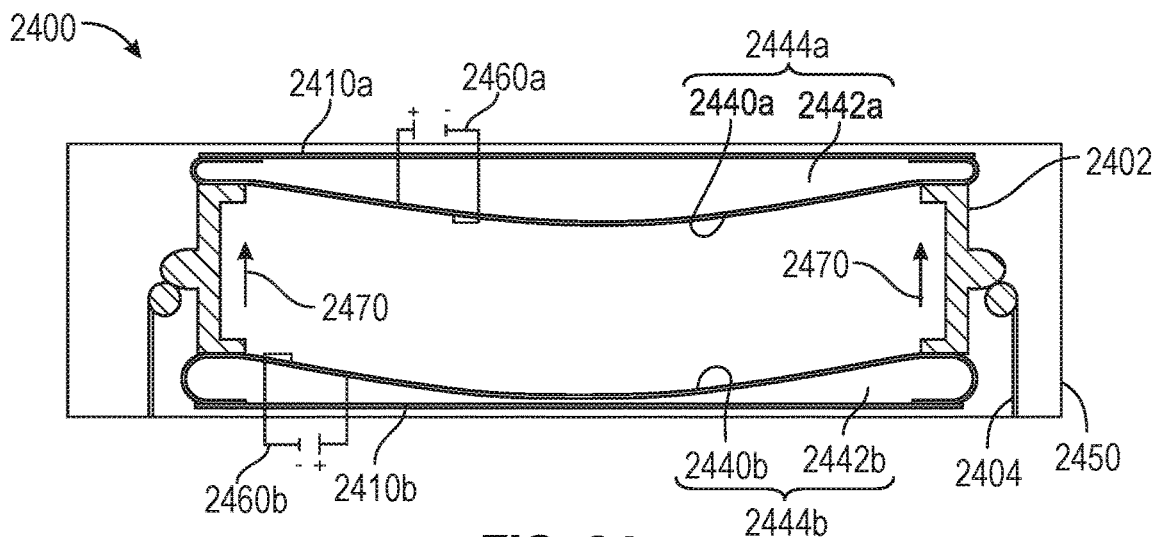
FIG. 24 is a cross-sectional side view of the optical lens assembly of FIG. 23 in a first actuated state.
Figure 25:
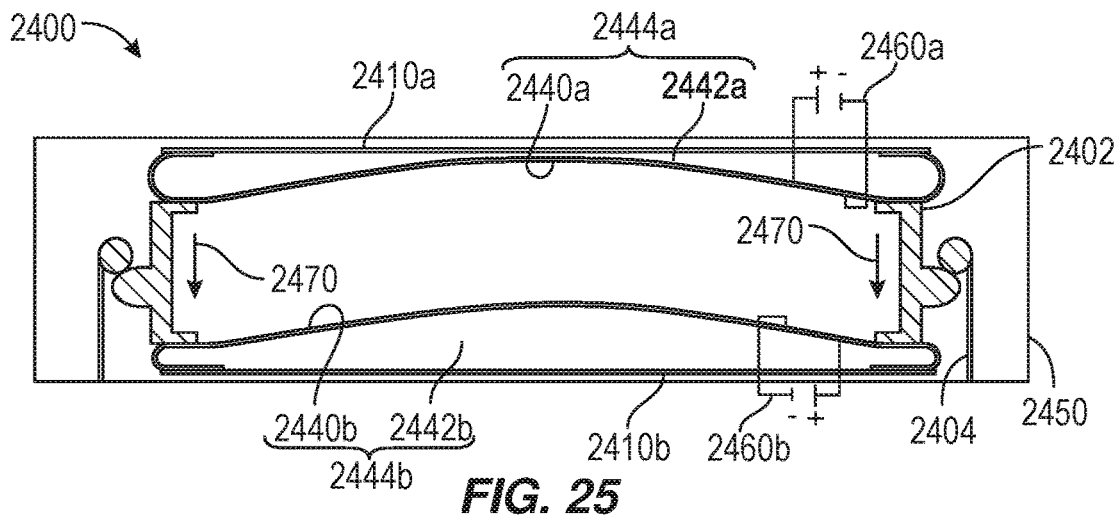
FIG. 25 is a cross-sectional side view f the optical lens assembly of FIG. 23 in a second actuated state.

FIGS. 23-25 show an embodiment of an optical lens assembly 2400 that includes an adaptive element in the form of a rigid shuttle 2402 instead of separate force distributor rings to simultaneously actuate two electroactive elements 2440a, 2440b. The optical lens assembly 2400 may include a first deformable optical element 2444a including a first electroactive element 2440a and a first deformable medium 2442a. A first support element 2410a may be coupled to and support the first deformable optical element 2444a. Similarly, a second deformable optical element 2444b may include a second electroactive element 2440b and a second deformable medium 2442b, which may be supported by a second support element 2410b. A display element 2430 may be positioned between the first deformable optical element 2444a and the second deformable optical element 2444b.

The adaptive element may also include a toggle spring 2404 that is coupled to a housing 2450 that supports the other components of the optical lens assembly 2400. The toggle spring 2404 may interact with the shuttle 2402 to store potential energy in a neutral, non-actuated state, and to apply a secondary force to the shuttle 2402 when actuated by a primary actuator (e.g., a first electrical driving circuit 2460a acting on the first electroactive element 2440a and a second electrical driving circuit 2460b acting on the second electroactive element 2440b). Upon actuation, the shuttle 2402 may be displaced 2470 (FIGS. 24 and 25). For example, the toggle spring 2404 may be flexed and abutted against an outer end surface of a protrusion of the shuttle 2402 in the neutral, non-actuated state. When actuated, the toggle spring 2404 may abut against a side surface of the protrusion of the shuttle 2402 to apply the secondary force to the side surface of the protrusion.

The shuttle 2402 moving in either direction from center may simultaneously alter physical boundary conditions of both of the two electroactive elements 2440a, 2440b. As shown in FIG. 24, the first electroactive element 2440a may deform into a convex shape and the second electroactive element 2440b may simultaneously deform into a concave shape when a sufficient voltage is applied by the electrical driving circuits 2460a, 2460b. The shuttle 2402 may move in an upward direction (from the perspective of FIGS. 23-25) upon actuation in this manner. Applying a voltage with an opposite polarity may move the shuttle 2402 in an opposite direction (e.g., downward from the perspective of FIGS. 23-25) off-center, which may also deform the first electroactive element 2440a into a concave shape and the second electroactive element 2440b into a convex shape, as shown in FIG. 25.

FIG. 23 shows the optical lens assembly 2400 in the neutral, non-actuated state. In this position, the shuttle 2402 may be centered between the two electroactive elements 2440a, 2440b, and the toggle spring 2404 may be deflected outward to apply a radial (e.g., inward) force but substantially no axial (e.g., upward or downward in the perspective of FIGS. 23-25) force to the shuttle 2402. The toggle spring 2404 could alternatively be a compression or extension coil spring, in some embodiments. Actuation of the optical lens assembly 2400 in one direction is shown in FIG. 24, after the shuttle 2402 is moved upward. Actuation of the optical lens assembly 2400 in an opposite direction is shown in FIG. 25, after the shuttle 2402 is moved downward. In either case, a contact point of the toggle spring 2404 against the shuttle 2402 may be moved to a different position where the spring force has an axial component on the shuttle 2402, thereby altering a physical boundary condition of the deformable optical elements 2444a, 2444b. In some embodiments, as the shuttle 2402 moves further off-center, the secondary force applied by the toggle spring 2404 may increase. Thus, the toggle spring 2404 may be configured to apply a reduced force to the deformable optical elements 2444a, 2444b in a first position (e.g., close to the central position shown in FIG. 23) between second positions (e.g., the positions shown in FIGS. 24 and 25) in which the toggle spring 2404 applies an increased force to the deformable optical elements 2444a, 2444b.

As with the example illustrated in FIGS. 12-13, the opposite shapes of the first and second deformable optical elements 2444a, 2444b of the optical lens assembly 2400 may provide a desired change in optical property (e.g., an accommodative or an adaptive optical property) relative to the display element 2430 (FIG. 23) through one of the deformable optical elements 2444a, 2444b, while maintaining a substantially zero-optical power view of a real-world environment through both of the deformable optical elements 2444a, 2444b. This configuration may be useful in augmented-reality applications, for example, to independently adjust a focus of an image rendered on the display element 2430 while maintaining substantially no optical effect (or a different optical effect) on a user's view of a real-world environment through both of the deformable optical elements 2444a, 2444b.

Figure 26:
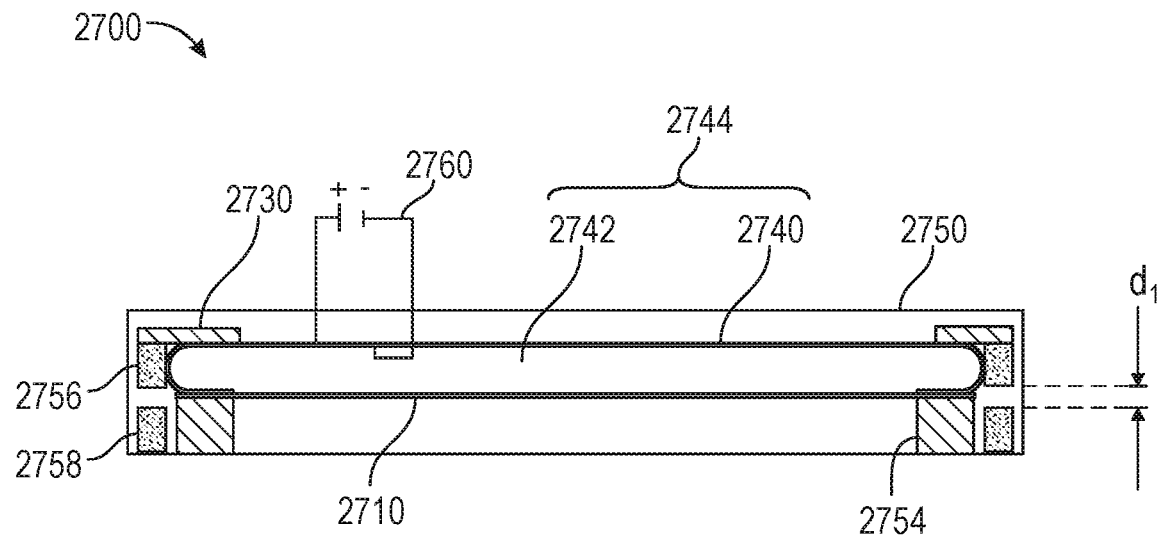
FIG. 26 is a cross-sectional side view of an optical lens assembly in a neutral, non-actuated state according to another embodiment of the present disclosure.
Figure 27:
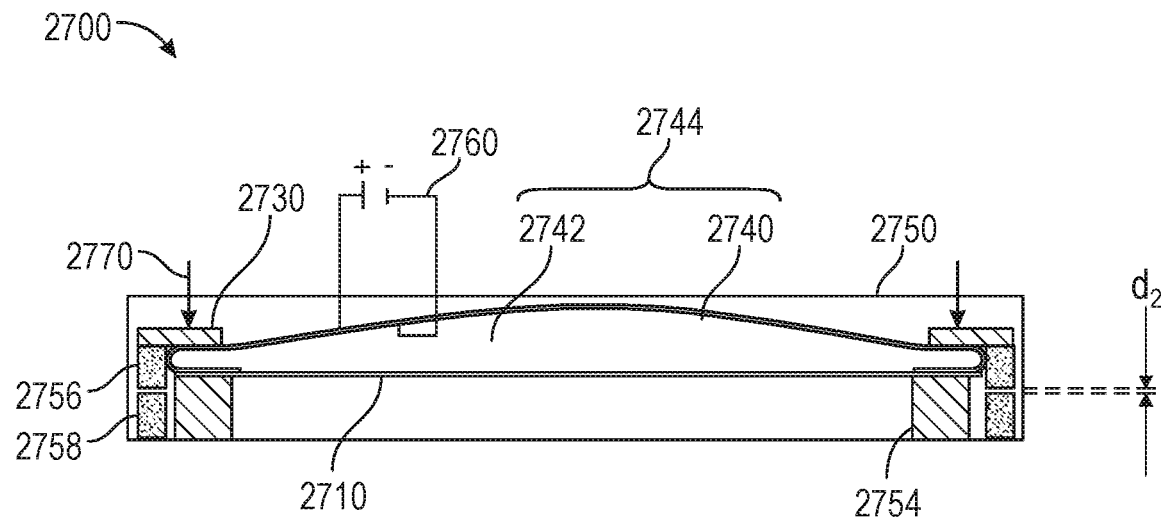
FIG. 27 is a cross-sectional side view of the optical lens assembly of FIG. 26 in an actuated state.

FIGS. 26 and 27 show an embodiment of an optical lens assembly 2700 using magnetic attraction force to alter a physical boundary condition of a deformable optical element 2744. The optical lens assembly 2700 may include a support element 2710, the deformable optical element 2744 including an electroactive element 2740 and a deformable medium 2742, a force distributor ring 2730 coupled to a peripheral region of the electroactive element 2740, a housing 2750, and a standoff 2754 positioned between the support element 2710 and the housing 2750. In addition, one magnetic element 2756 may be attached to the force distributor ring 2730, and another magnetic element 2758 may be attached to the housing 2750.

In this example, the magnetic attraction force between the magnetic elements 2756, 2758, which corresponds to a secondary force applied on the force distributor ring 2730, may be a function of the distance $d_1$, $d_2$ between the magnetic elements 2756, 2758. As the primary actuator (e.g., the electroactive element 2740 actuated by an electrical driving circuit 2760) displaces the force distributor ring 2730 as shown at arrows 2770 in FIG. 27, the initial distance $d_1$ between the magnetic elements 2756, 2758 gets smaller, and the magnetic attraction force increases. The relationship between magnetic attraction force and the separation distance $d_2$ between the magnetic elements 2756, 2758 may follow a $1/d_2$ nonlinear trend. Accordingly, as the separation distance $d_2$ decreases, the magnetic attraction force and, therefore, a secondary force applied to the force distributor ring 2730 by the magnetic element 2756 may increase. The magnetic elements 2756, 2758 may be selected to exhibit an attraction force that is less than a resilient force of the deformable optical element 2744, such that the deformable optical element 2744 may return to its original shape upon removal of the voltage applied by the electrical driving circuit 2760.

The standoff 2754 may be present to provide space for the other magnetic element 2758 coupled to the housing 2750. However, in some embodiments, the magnetic elements 2756, 2758 may be configured or positioned so that the standoff 2754 is omitted. For example, the magnetic element 2756 may be positioned over a top (from the perspective of FIGS. 26 and 27) of the force distributor ring 2730, and the other magnetic element 2758 may be positioned radially outward from the electroactive element 2740. In some embodiments, the magnetic element 2756 may replace the force distributor ring 2730. In additional examples, the other magnetic element 2756 may be a part of the housing 2750. Furthermore, one of the magnetic elements 2756, 2758 may be a permanent magnet or an electromagnet, and the other of the magnetic elements 2756, 2758 may include a ferromagnetic material (e.g., a material that does not exhibit magnetism, but that may respond to a magnetic field).

Figure 28:
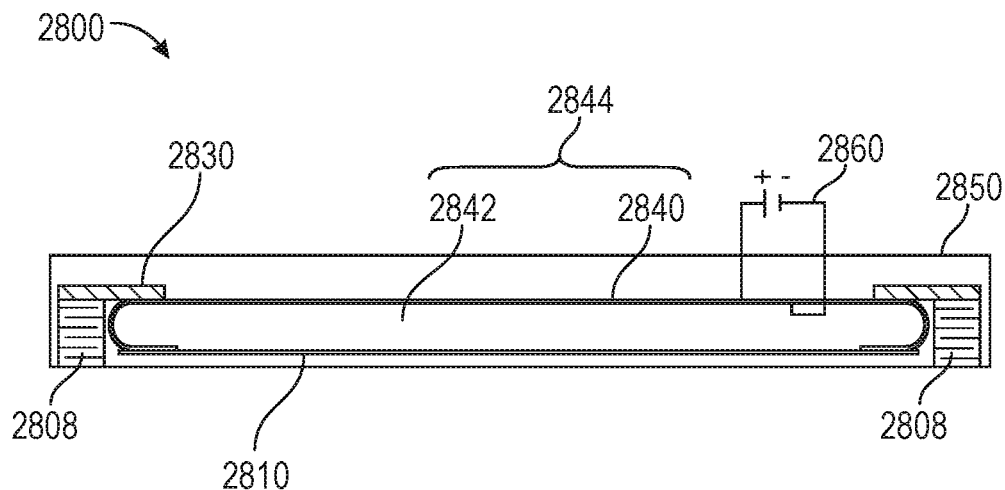
FIG. 28 is a cross-sectional side view of an optical lens assembly in a neutral, non-actuated state according to another embodiment of the present disclosure.
Figure 29:
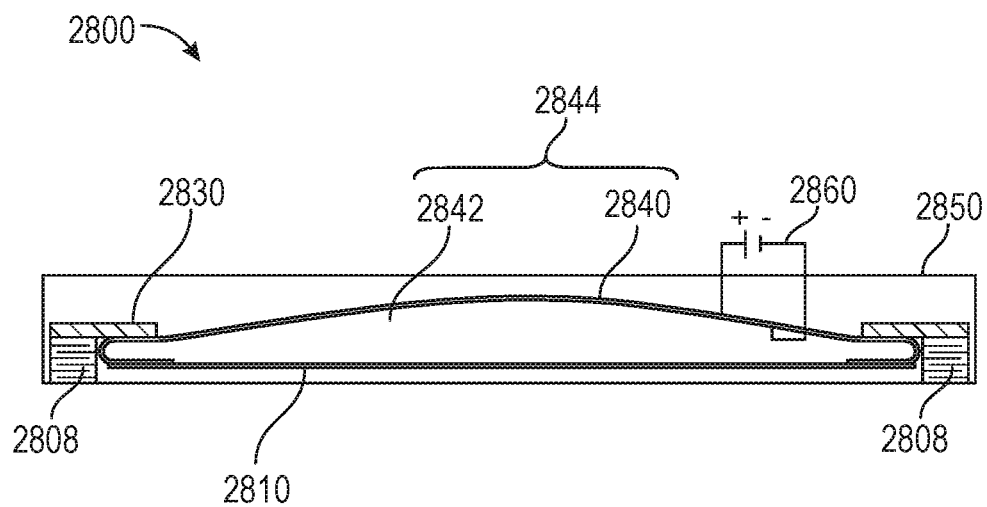
FIG. 29 is a cross-sectional side view of the optical lens assembly of FIG. 28 in an actuated state.

FIGS. 28 and 29 show an embodiment of an optical lens assembly 2800 using a nanovoided polymer actuator 2808 in an adaptive element to alter a physical boundary condition of a deformable optical element 2844. The optical lens assembly 2800 may include a support element 2810, the deformable optical element 2844 including an electroactive element 2840 and a deformable medium 2842, a force distributor ring 2830 coupled to a peripheral region of the electroactive element 2840, and a housing 2850 for supporting the components of the optical lens assembly 2800.

In this example, the nanovoided polymer actuator 2808 may be an electroactive material that is configured to deform (e.g., expand or contract) upon application of a sufficient voltage thereto. Any other suitable electroactive polymer acctuator (e.g., a nonvoided polymer actuator) may be used in place of or in addition to the nanovoided polymer actuator 2808. The nanovoided polymer actuator 2808 may be positioned between and coupled to the force distributor ring 2830 and the housing. In some embodiments, the nanovoided polymer actuator 2808 may include a silicone polymer, such as, for example, polydimethyl siloxane ("PDMS"). Additionally or alternatively, the nanovoided polymer actuator 2808 may include, but not be limited to, acrylates, styrenes, polyesters, polycarbonates, and epoxies, and/or any other suitable polymer material. In certain embodiments, the nanovoided polymer actuator 2808 may further include one or more additional electroactive material layers and/or abutting material layers (e.g., electrodes) overlapping in a stacked configuration having from three electroactive material layers and corresponding electrodes to thousands of electroactive material layers and/or corresponding electrodes.

In an embodiment, the nanovoided polymer actuator 2808 may include one or more electroactive polymers and/or elastomer materials. In some examples, an "electroactive polymer" may refer to a deformable polymer that may be symmetric with regard to electrical charge (e.g., PDMS acrylates, and the like) or asymmetric (e.g., poled polyvinylidene fluoride (PVDF) or its copolymers such as poly [(vinylidenefluoride-co-trifluoroethylene] ("PVDF-TrFE")).

In some embodiments, the nanovoided polymer actuator 2808 may include one or more thermoplastic polymers. Suitable polymers may include, but are not limited to, polyolefins, for example, polyethylene homopolymers and copolymers, polypropylene, polypropylene homopolymers and copolymers, functionalized polyolefins, polyesters, poly (ester-ether), polyamides, including nylons, poly(etheramide), polyether sulfones, fluoropolymers, polyurethanes, and mixtures thereof. Polyethylene homopolymers include those of low, medium or high density and/or those formed by high-pressure or low-pressure polymerization. Polyethylene and polypropylene copolymers include, but are not limited to, copolymers with C4-C8 alpha-olefin monomers, including 1-octene, 1-butene, 1-hexene and 4-methyl pentene.

Other non-limiting examples of suitable olefinic polymeric compositions for use in the nanovoided polymer actuator 2808 include olefinic block copolymers, olefinic random copolymers, polyurethanes, rubbers, vinyl arylenes and conjugated dienes, polyesters, polyamides, polyethers, polyisoprenes, polyneoprenes, copolymers of any of the above, and mixtures thereof.

Examples of suitable copolymers for use in the nanovoided polymer actuator 2808 include, but are not limited to, copolymers such as poly(ethylene-butene), poly(ethylenehexene), poly(ethylene-octene), and poly(ethylene-propylene), poly(ethylene-vinylacetate), poly(ethylene-methylacrylate), poly(ethylene-acrylic acid), poly(ethylenebutylacrylate), poly(ethylene-propylenediene), poly(methyl methacrylate) and/or polyolefin terpolymers thereof.

In some aspects, the nanovoided polymer actuator 2808 may include elastomeric polymers, including styrenic block copolymers, elastomeric olefinic block copolymers and combinations thereof. Non-limiting examples of suitable styrenic block copolymers ("SBC's") include styrene-butadiene-styrene ("SBS"), styrene-isoprene-styrene ("SIS"), styrene-ethylene-butylene-styrene ("SEBS"), styrene-ethylene-propylene ("SEP"), styrene-ethylene-propylene-styrene ("SEPS"), or styrene-ethylene-ethylene-propylene-styrene ("SEEPS") block copolymer elastomers, polystyrene, and mixtures thereof. In one embodiment, the film comprises styrene-butadiene-styrene, polystyrene, and mixtures thereof.

The nanovoided polymer actuator 2808 may further include optional components, such as fillers, plasticizers, compatibilizers, draw down polymers, processing aids, antiblocking agents, viscosity-reducing polymers, and the like. Other additives may include pigments, dyes, antioxidants, antistatic agents, slip agents, foaming agents, heat or light stabilizers, UV stabilizers, and the like.

In some embodiments, an "elastomer material" may refer to a polymer with viscoelasticity (i.e., both viscosity and elasticity) and relatively weak intermolecular forces, and generally low elastic modulus (a measure of the stiffness of a solid material) and high failure strain compared with other materials. In some embodiments, the nanovoided polymer actuator 2808 may include an elastomer material that has an effective Poisson's ratio of less than a predetermined value (e.g., less than approximately 0.35, less than approximately 0.3, less than approximately 0.25, less than approximately 0.2, less than approximately 0.15, less than approximately 0.1, less than approximately 0.5). In at least one example, the elastomer material may have an effective density that is less than a predetermined value (e.g., less than approximately 90%, less than approximately 80%, less than approximately 70%, less than approximately 60%, less than approximately 50%, less than approximately 40%) of the elastomer when densified (e.g., when the elastomer is compressed, for example, by abutting materials to make the elastomer denser).

In some examples, the nanovoided polymer actuator 2808 may include a plurality of voids, including nano-sized voids, in the material. In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided polymer actuator 2808. The voids and/or nanovoids may be either closed- or open-celled, or a mixture thereof. If the voids are open-celled, the void size may be the minimum average diameter of the cell. In some embodiments, the polymer layer(s) may have an elastic modulus of less than approximately 10 GPa (e.g., approximately 0.5 GPa, approximately 1 GPa, approximately 2 GPa, approximately 3 GPa, approximately 4 GPa, approximately 5 GPa, approximately 6 GPa, approximately 7 GPa, approximately 8 GPa, approximately 9 GPa).

The voids and/or nanovoids may be any suitable size and, in some embodiments, the voids may approach the scale of the thickness of the polymer layer in the undeformed state. For example, the voids may be between approximately 10 nm to about equal to the gap between two paired electrodes. In some embodiments, the voids may be between approximately 10 nm and approximately 1000 nm, such as between approximately 10 and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

In some examples, the term "effective density," as used herein, may refer to a parameter that may be obtained using a test method where a uniformly thick layer of a nanovoided polymer material (e.g., elastomer) may be placed between two flat and rigid circular plates. In some embodiments, the diameter of the nanovoided polymer material being compressed may be at least 100 times the thickness of the nanovoided polymer material. The diameter of the nanovoided polymer material may be measured, then the plates may be pressed together to exert a pressure of at least approximately $1\times10^6$ Pa on the nanovoided polymer material, and the diameter of the nanovoided polymer material may be remeasured. The effective density may be determined from the following expression: $D_{ratio}=D_{uncompressed}/D_{compressed}$, where $D_{ratio}$ may represent the effective density ratio, $D_{uncompressed}$ may represent the density of the uncompressed nanovoided polymer material, and $D_{compressed}$ may represent the density of the uncompressed nanovoided polymer material.

In an embodiment, the nanovoided polymer actuator 2808 may include a fabricated multilayer structure that may include several of the materials described above. That is, the multilayer structure may include abutting layers, such as a plurality of electroactive polymer materials, various common buses, insulating areas, and contact areas.

In some embodiments, the nanovoided polymer actuator 2808 may include particles of a material having a high dielectric constant, the particles having an average diameter between approximately 10 nm and approximately 1000 nm. In some embodiments, the material having the high dielectric constant may include barium titanate ($BaTiO_3$), which is a member of the perovskite family and which may also include other titanates. Additionally or alternatively, any other suitable component may be added to the electroactive polymer material. $BaTiO_3$ is a ferroelectric material with a relatively high dielectric constant (e.g., a value of between approximately 500 and approximately 7000) and polarization and may be used in various electroactive devices described herein. Besides large polarizability and permittivity, large strains may also be achievable with $BaTiO_3$. Pure $BaTiO_3$ is an insulator, whereas upon doping it may transform into a semiconductor in conjunction with the polymer material. In some embodiments, the particles of the materials having high dielectric constant may be included in the polymer to modify a mechanical (e.g., a Poisson's ratio) or electrical property (resistance, capacitance, etc.) of the electroactive polymer materials, including nanovoided polymer materials.

In some embodiments, the nanovoided polymer actuator 2808 may have an initial (i.e., not actuated) thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 lam, approximately 8 am, approximately 9 μm, approximately 10 μm), with an example thickness of approximately 200 nm to approximately 500 nm.

In some embodiments, the nanovoided polymer actuator 2808 may include a first elastomer material and a second elastomer material, respectively, each having a Poisson's ratio of approximately 0.35 or less. In some embodiments, the nanovoided polymer actuator 2808 may include particles of a material to assist the formation thereof or to support the voided regions, or both. Suitable particles may include a silicate, such as silica, including structures resulting from silica gels, fumed silica, a titanate, such as barium titanate, a metal oxide, such as titanium dioxide, composites thereof, and the like. The particles may have an average diameter between approximately 10 nm and approximately 1000 nm, and the particles may form branched or networked particles with average dimensions of between approximately 100 nm and approximately 10,000 nm.

In some embodiments, the application of a voltage to the nanovoided polymer actuator 2808 may change the internal pressure of gases in the nanovoided regions of the nanovoided polymer actuator 2808. For example, gases may diffuse either into or out of the nanovoided polymer actuator 2808 during dimensional changes associated with its deformation. Such changes in the nanovoided polymer actuator 2808 can affect, for example, the hysteresis thereof during dimensional changes, and also may result in drift when the electroactive polymer element's dimensions are rapidly changed. Accordingly, in an embodiment, the nanovoids may be filled with a gas to suppress electrical breakdown of the electroactive polymer element (for example, during deformation). In another aspect, the gas may include sulfur hexafluoride and/or any suitable gas. In another aspect, the nanovoided polymer actuator 2808 may have a sealing layer (not shown) applied to the edges thereof, and/or to one or more of the electrodes, or a combination thereof. Suitable sealing layers may include thin film layers of an inorganic material, such as silica, applied with any suitable method, including, for example, atomic layer deposition ("ALD"), physical vapor deposition ("PVD"), chemical vapor deposition ("CVD"), or the like. The thin film layers may also be made from one or more dyads of a polymer layer and an inorganic layer. In an embodiment, the sealing layer may also include a barrier material, such as polychlorotrifluoroethylene ("PCTFE") or other polymer applied by solvent and/or with initiated-CVD.

The nanovoided polymer actuator 2808 may have a maximum thickness in an undeformed or relaxed state (e.g., FIG. 28) and a minimum thickness in a deformed state (e.g., FIG. 29) when a sufficient voltage is applied. In some embodiments the maximum thickness of the nanovoided polymer actuator 2808 may be from approximately 10 nm to approximately 10 µm. Additionally, or alternatively, a width of the nanovoided polymer actuator 2808 in the undeformed state may be from approximately 100 nm to approximately 100 µm (e.g., approximately 100 nm, approximately 500 nm, approximately 1 µm, approximately 10 µm, approximately 20 µm, approximately 30 µm, approximately 40 µm, approximately 50 µm, approximately 60 µm, approximately 70 µm, approximately 80 µm, approximately 90 µm, approximately 100 µm). In some examples, the width may refer to the extent of at least a portion of the nanovoided polymer actuator 2808 in a dimension transverse to that of the expected electrostatic field.

As shown in FIG. 29, when a voltage is applied to the electroactive element 2840 by the electrical driving circuit 2860, the deformable optical element 2844 may deform (e.g., into a convex shape). Independent of this deformation, another voltage may be applied to the nanovoided polymer actuator 2808 to change a position of the force distributor ring 2830 relative to the housing 2850. In the example shown in FIG. 29, actuation of the nanovoided polymer actuator 2808 may cause a peripheral region of the deformable optical element 2844 to be compressed by the force distributor ring 2830. In additional examples, the force distributor ring 2830 may be located in a different relative position by selective actuation of the nanovoided polymer actuator 2808 to control a physical boundary condition (e.g., a position of the peripheral region) of the deformable optical element 2844.

Figure 30:
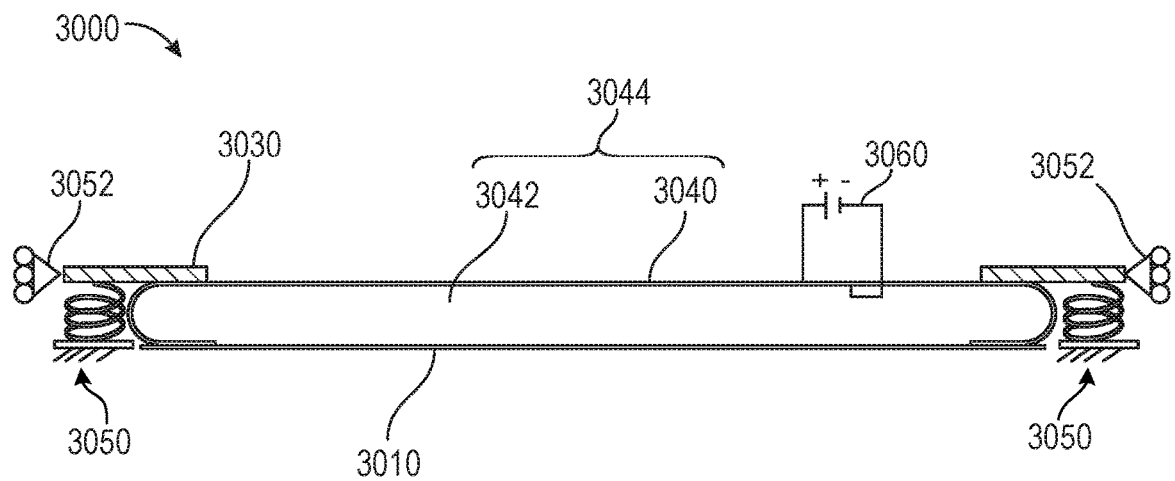
FIG. 30 is a cross-sectional side view of an optical lens assembly in a neutral, non-actuated state according to another embodiment of the present disclosure.
Figure 31:
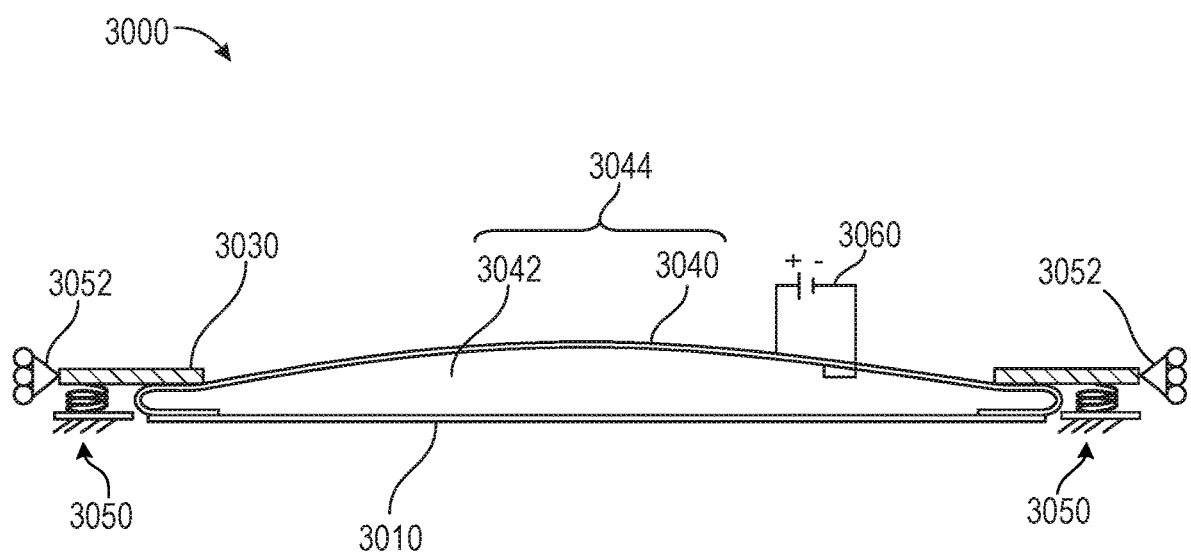
FIG. 31 is a cross-sectional side view of the optical lens assembly of FIG. 30 in an actuated state.
Figure 32:
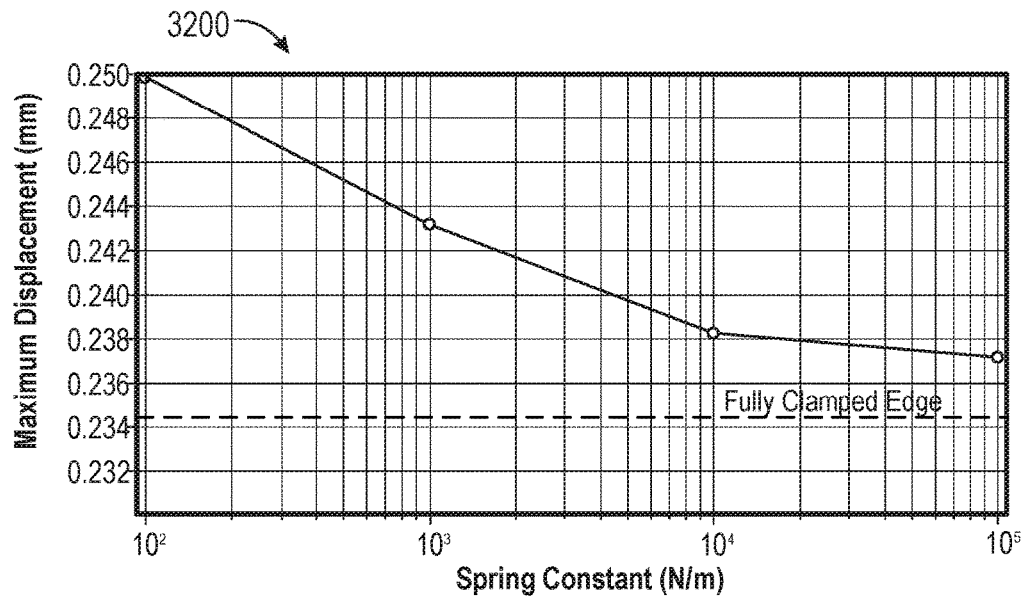
FIG. 32 is a plot showing a calculated maximum displacement of a deformable optical lens as a function of a spring constant of a spring as shown in FIGS. 30 and 31.

FIGS. 30 and 31 show an embodiment of an optical lens assembly 3000 employing an adaptive element that includes a spring 3050 that is constrained to vertical (in the perspective of FIGS. 30 and 31) movement. The spring 3050 may be coupled to a force distributor ring 3030 that is positioned and configured to apply a force to a peripheral region of a deformable optical element 3044. The deformable optical element 3044 may include an electroactive element 3040 and a deformable medium 3042 that are coupled to a support element 3010. Deformation of the deformable optical element 3044 may be primarily driven by an electrical driving circuit 3060 that is operably coupled to the electroactive element 3040.

The movement of the spring 3050 and force distributor ring 3030 may be constrained to vertical movement by a constraining element 3052. For example, the constraining element 3052 may be or include a roller, a slide, a dovetail, a guideway, etc.

The physical boundary conditions of the deformable optical element 3044 may affect a level of achievable deformation for a given input energy. For example, with a fixed edge boundary condition, a relatively higher curvature of the electroactive element 3040 may result from primary actuation (e.g., by the electrical driving circuit 3060) compared to a more relaxed edge boundary condition. Thus, a fixed edge boundary condition may require a relatively higher input energy to achieve a spherical or quasi-spherical deflection profile, compared to a relaxed edge boundary condition. Thus, the adaptive element of FIGS. 30 and 31 may reduce (compared to a fixed edge boundary condition) the input energy required to achieve a given deflection profile due to the allowance of vertical movement of the force distributor ring 3030 and, consequently, of the peripheral region of the deformable optical element 3044.

FIG. 32 is a plot 3200 illustrating a simulated maximum displacement of a deformable optical element. The solid line shows the simulated maximum displacement of the deformable optical element 3044 of FIGS. 30 and 31 as a function of spring stiffness (i.e., spring constant) of the spring 3050. The dashed line shows a simulated maximum displacement of a deformable optical element with a peripheral region that is fully constrained (e.g., a fully clamped edge). As illustrated in the plot 3200, if the spring 3050 has a lower spring constant, the maximum displacement of the deformable optical element 3044 is generally higher than if the spring 3050 has a higher spring constant or if the deformable optical element 3044 has a fully clamped edge. Additionally, a spring 3050 with a lower spring constant may result in a more axisymmetric deformation profile (e.g., closer to a spherical deformation profile) compared to more constrained cases (e.g., fully clamped edge or higher spring constants).

Figure 33:
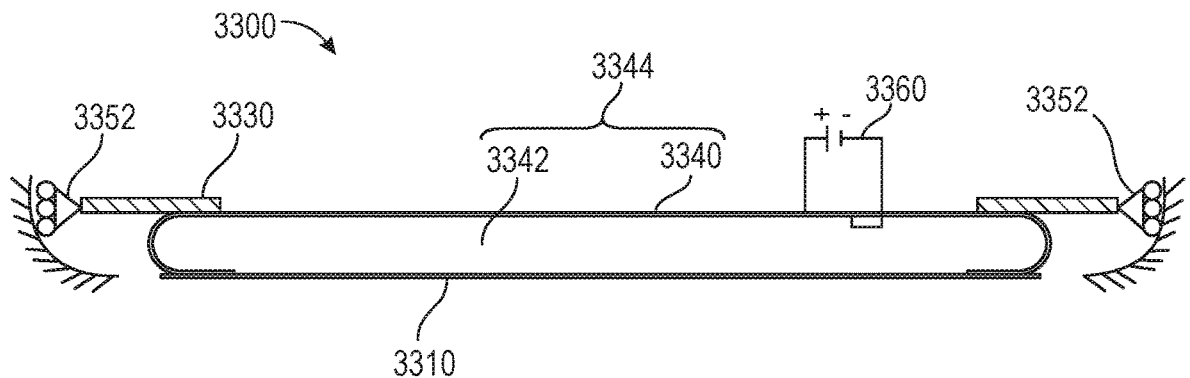
FIG. 33 is a cross-sectional side view of an optical lens assembly in a neutral, non-actuated state according to another embodiment of the present disclosure.
Figure 34:
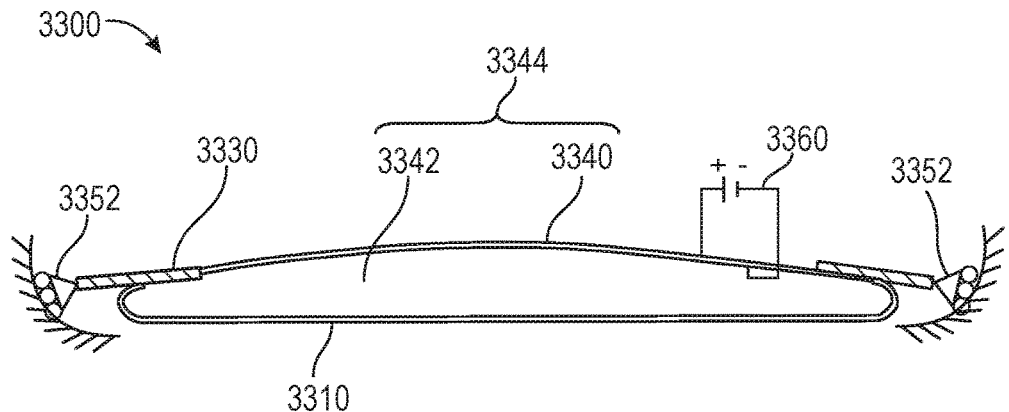
FIG. 34 is a cross-sectional side view f the optical lens assembly of FIG. 33 in an actuated state.

FIGS. 33 and 34 illustrate another example of an adaptive element, which may reduce a curvature change in a peripheral region of a deformable optical element upon primary actuation. In the embodiment shown in FIGS. 33 and 34, an optical lens assembly 3300 may include a deformable optical element 3344 including an electroactive element 3340 and a deformable medium 3342. The deformable optical element 3344 may be coupled to a support element 3310. An electrical driving circuit 3360 may be operatively coupled to the electroactive element 3340 to apply a sufficient voltage for deforming the deformable optical element 3344. A force distributor ring 3330 may be coupled to a peripheral region of the deformable optical element 3344. In some embodiments, the adaptive element of the optical lens assembly 3300 illustrated in FIGS. 33 and 34 may include a spring, like the spring 3050 of FIGS. 30 and 31.

The adaptive element may include a constraining element 3352 that is able to move along a curved path. The constraining element 3352 may be configured to constrain movement of the force distributor ring 3330 and, therefore, of the peripheral region of the deformable optical element 3344. For example, the constraining element 3352 may be or include a roller, a slide, a dovetail, a guideway, etc., which may constrain movement to the curved path. As primary actuation occurs (e.g., by application of a voltage to the electroactive element 3340 by the electrical driving circuit 3360), the force distributor ring 3330 may rotate as it moves downward (in the perspective of FIGS. 33 and 34), such as to substantially follow an unconstrained deformation profile of the deformable optical element 3344. In additional embodiments, the curvature of the movement of the constraining element 3352 may be designed to rotate the force distributor ring 3330 more or less than an unconstrained deformation profile of the deformable optical element 3344, such as to modify a shape of the deformable optical element 3344 upon primary actuation compared to a completely unconstrained case.

Since a change in curvature of the deformed electroactive element 3340 at the peripheral region is less pronounced than in fully constrained or constrained-to-vertical (FIGS. 30 and 31) instances, an input energy required to achieve a desired deformation profile may be reduced by the optical lens assembly 3300 compared to other embodiments. In addition, different deformation profiles may be achievable due to the modified physical boundary conditions achieved by the optical lens assembly 3300 of FIGS. 33 and 34.

FIGS. 35-46 illustrate additional embodiments of optical lens assemblies, which include deformable optical elements and adaptive elements that are configured to adjust a position of a contact point of the adaptive element against a peripheral region of the deformable optical elements.

Figure 35:
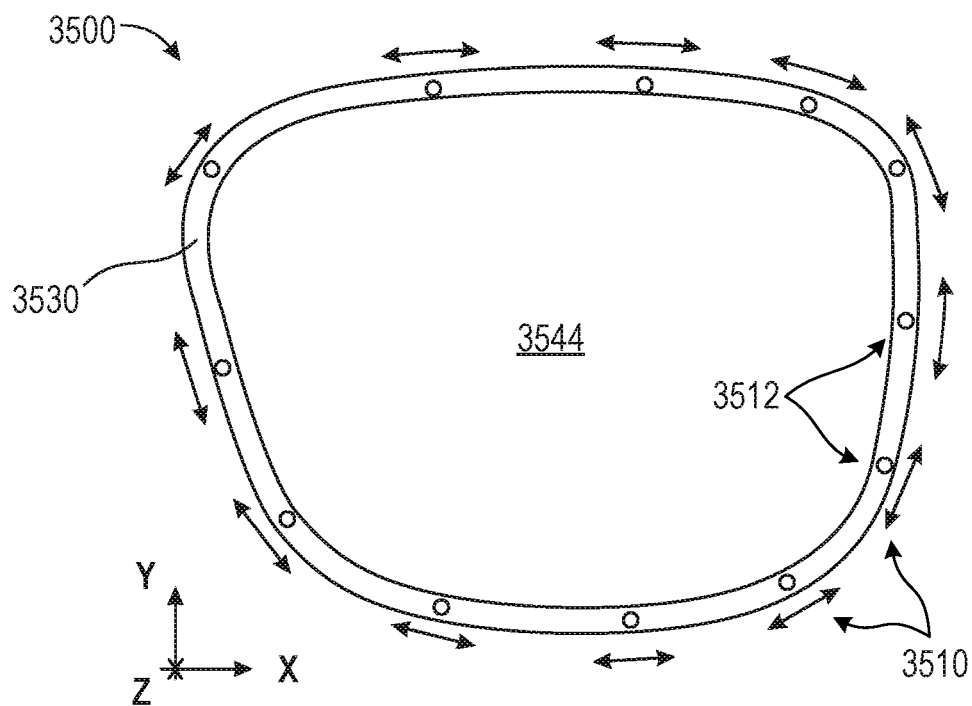
FIG. 35 is a front view of an optical lens assembly with adaptive elements, according to at least one embodiment of the present disclosure.

As shown in FIG. 35, an optical lens assembly 3500 may include a deformable optical element 3544 and a plurality of adaptive elements 3510 positioned along a peripheral region of the deformable optical element 3544. The deformable optical element 3544 may include an electroactive element, as discussed above. A force distributor ring 3530 may also be positioned along the peripheral region of the deformable optical element 3544. The adaptive elements 3510 may contact the deformable optical element 3544 (e.g., directly or indirectly via the force distributor ring 3530) at respective contact points 3512. The adaptive elements 3510 may be configured to move the contact points 3512, such as in X- and Y-directions (i.e., generally parallel to a major surface of the deformable optical element 3544), as shown in FIG. 35. In some examples, the adaptive elements 3510 may additionally be configured to move the contact points 3512 in a Z-direction (i.e., transverse to the major surface of the deformable optical element 3544, which is in-and-out of the page in the perspective of FIG. 35).

Figure 36:
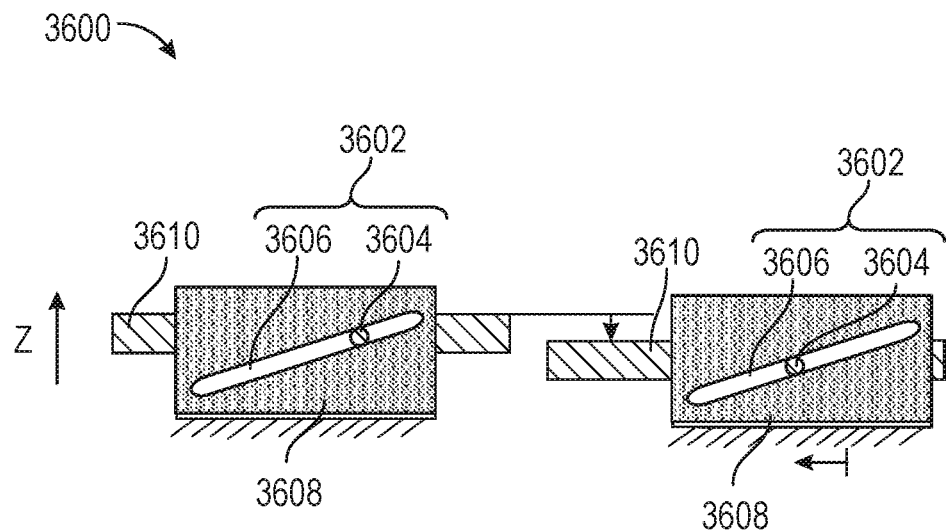
FIG. 36 is a cross-sectional side view of an adaptive element in an initial position and in an adjusted position, according to at least one embodiment of the present disclosure.

FIG. 36 illustrates an example of an adaptive element 3600 that may be used as the adaptive element 3510 described above. The left side of FIG. 6 illustrates the adaptive element 3600 in an initial position, and the right side of FIG. 6 illustrates the adaptive element 3600 in an adjusted position. The adaptive element 3600 may be or include a slide 3602 including a pin 3604 and a slot 3606 in a block 3608. The pin 3604 may be coupled to a peripheral region of a deformable optical element 3610. The pin 3604 may be moveable (e.g., slidable) within the slot 3606. When the pin 3604 is slid in the slot 3606, a position of a contact point (e.g., a position of a constrained location on the peripheral region of the deformable optical element 3610) may be moved. For example, as shown in FIG. 36, the contact point may move in a Z-direction (i.e., transverse to the major surface of the deformable optical element 3610) and/or in X- and Y-directions (FIG. 35, i.e., generally parallel to the major surface of the deformable optical element 3610).

The slot 3606 is illustrated in FIG. 36 as linear. However, in additional embodiments, the slot 3606 may have a non-linear shape, such as curved.

Figure 37:
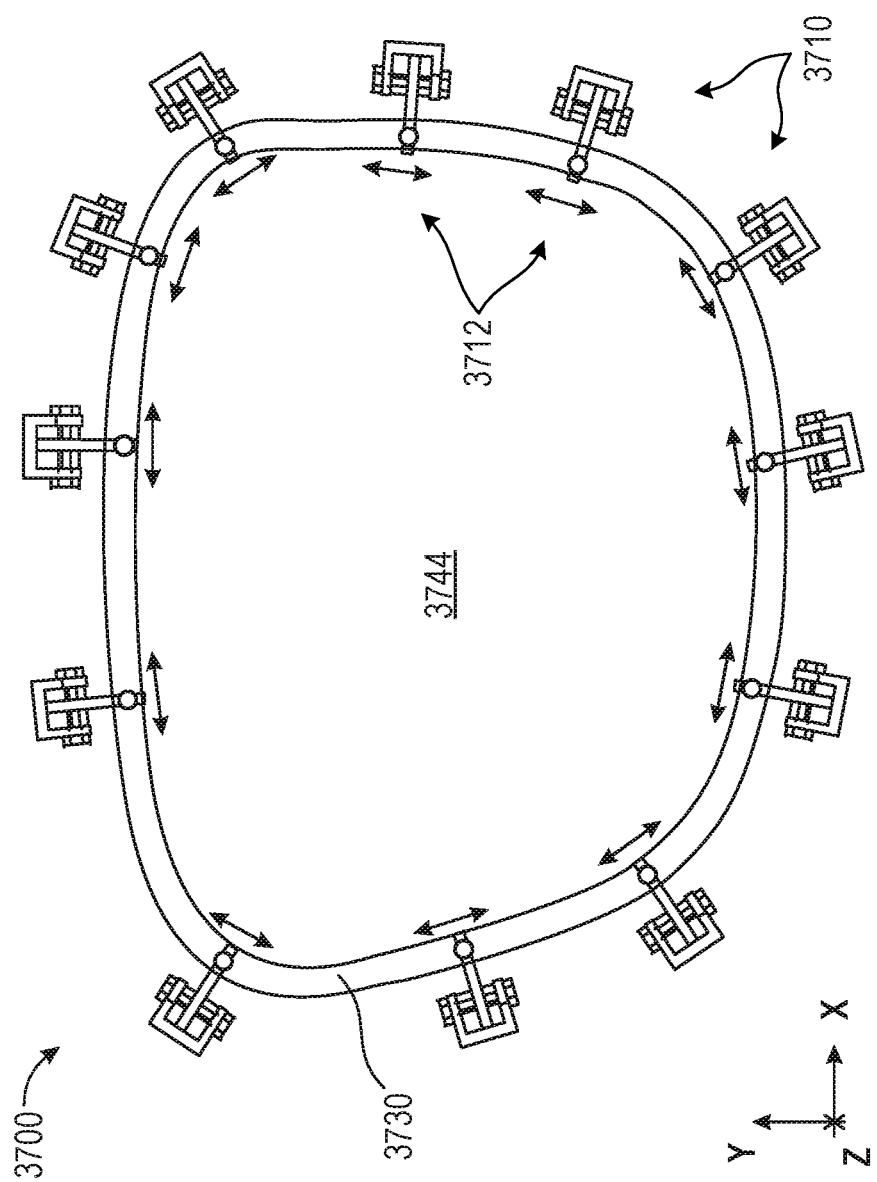
FIG. 37 is a front view of an optical lens assembly with adaptive elements, according to an additional embodiment of the present disclosure.

FIG. 37 shows another embodiment of an optical lens assembly 3700 including a deformable optical element 3744 and a plurality of adaptive elements 3710 positioned along a peripheral region of the deformable optical element 3744. The deformable optical element 3744 may include an electroactive element, as discussed above. A force distributor ring 3730 may also be positioned along the peripheral region of the deformable optical element 3744. The adaptive elements 3710 may contact the deformable optical element 3744 (e.g., via the force distributor ring 3730) at respective contact points 3712. The adaptive elements 3710 may be configured to move the contact points 3712, such as in X- and Y-directions (i.e., generally parallel to a major surface of the deformable optical element 3744), as shown in FIG. 37. In some examples, the adaptive elements 3710 may additionally be configured to move the contact points 3712 in a Z-direction (i.e., transverse to the major surface of the deformable optical element 3744), as will be explained below with reference to FIG. 39.

Figure 38:
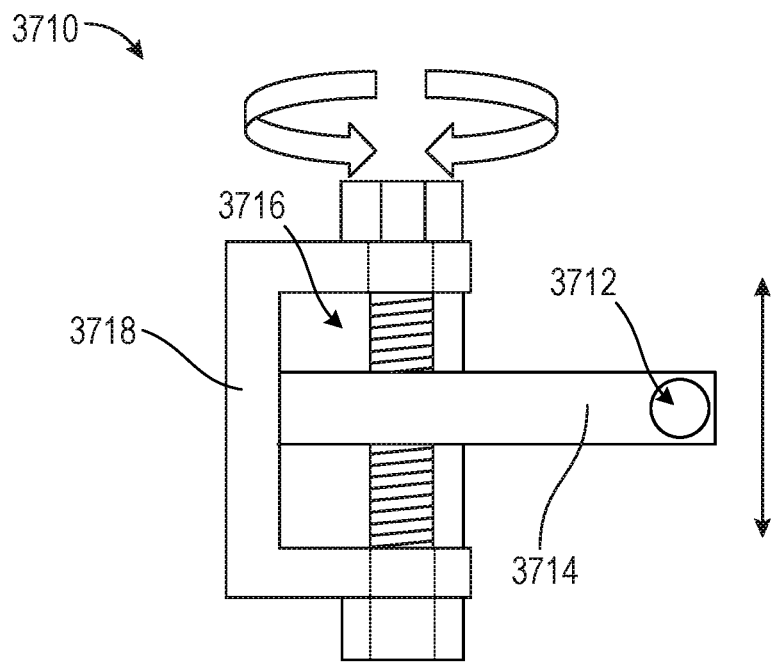
FIG. 38 is a detailed view of an adaptive element of the optical lens assembly of FIG. 37.

FIG. 38 illustrates a detailed view of one of the adaptive elements 3710 of the optical lens assembly 3700 of FIG. 37. As shown in FIG. 38, the adaptive element 3710 may include a lever arm 3714 that is configured to move the contact point 3712 in X- and/or Y-directions (FIG. 37, i.e., generally parallel to the major surface of the deformable optical element 3744). The lever arm 3714 may be engaged by threads to a screw 3716, which may be supported by a bracket 3718. When the screw 3716 is turned, either manually or by an actuator, the lever arm 3714 may translate and the contact point 3712 may move in a corresponding direction.

In some examples, adjustment of the adaptive element 3710 may be performed to compensate for variability in the manufacture of the optical lens assembly 3700, such as after the deformable optical element 3744 is formed. For example, during the manufacturing process of the optical lens assembly 3700, the deformable optical element 3744 may be deformed (e.g., by application of a voltage to an electroactive element thereof) and its shape may be determined. Adjustments to the shape may be made by adjusting one or more of the adaptive elements 3710 to move the contact point(s) 3712. Thus, the adaptive elements 3710 may be used to make one-time changes to at least one physical boundary condition of the deformable optical element 3744. Alternatively or additionally, adjustments may be made to the adaptive elements 3710 multiple times. For example, adjustments may be made after the manufacture of the optical lens assembly 3700, such as to adjust for material creep or other changes in the deformable optical element 3744. In additional examples, adjustments may be made to the adaptive elements 3710 during use, such as by one or more transducers (e.g., an electromechanical actuator, a spring, etc.), such as to tailor the shape of the actuated deformable optical element 3744 to accommodate a particular user's eyes and/or to adjust for an image displayed or viewed through the deformable optical element 3744.

Figure 39:
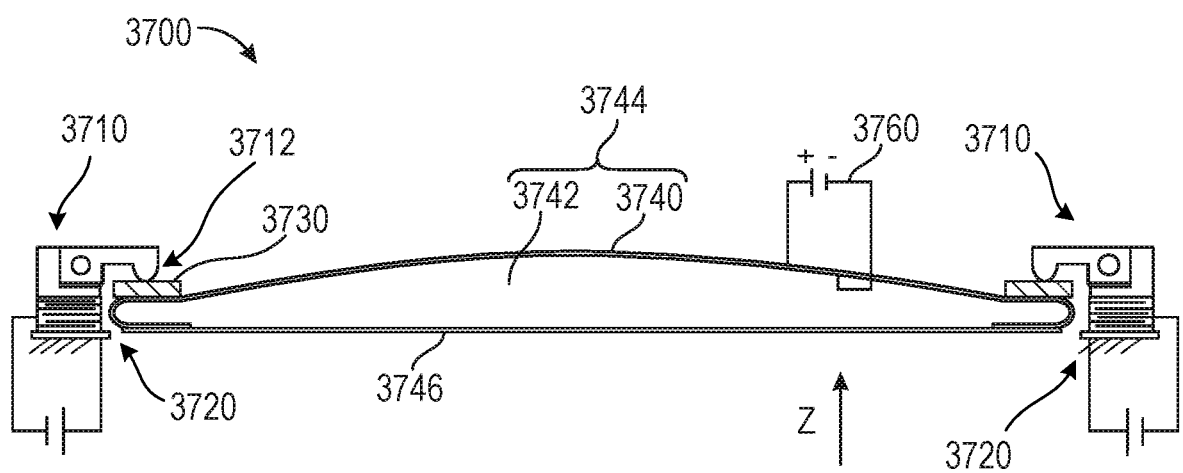
FIG. 39 is a cross-sectional side view of the optical lens assembly of FIG. 37.

FIG. 39 illustrates an example in which the adaptive element 3710 may also be configured to move the contact point 3712 and, therefore, a physical boundary condition of the deformable optical element 3744 in a Z-direction (i.e., transverse to the major surface of the deformable optical element 3744). As shown in FIG. 39, the adaptive element 3710 may be mounted on a transducer, such as, for example, a nanovoided polymer actuator 3720. A primary actuator for deforming the deformable optical element 3744 may be or include an electrical driving circuit 3760 coupled to an electroactive element 3740 of the deformable optical element 3744. The deformable optical element 3744 may also include a deformable medium 3742 positioned between the electroactive element 3740 and a support element 3746. The nanovoided polymer actuator 3720 may be a secondary actuator configured to apply a force to the force distributor ring 3730, such as to augment the deformation of the deformable optical element 3744. The location of contact points 3712 of the adaptive elements 3710 on the peripheral region of the deformable optical element 3744 (e.g., via the force distributor ring 3730) may have been, or may be, adjusted as discussed above.

Figure 40:
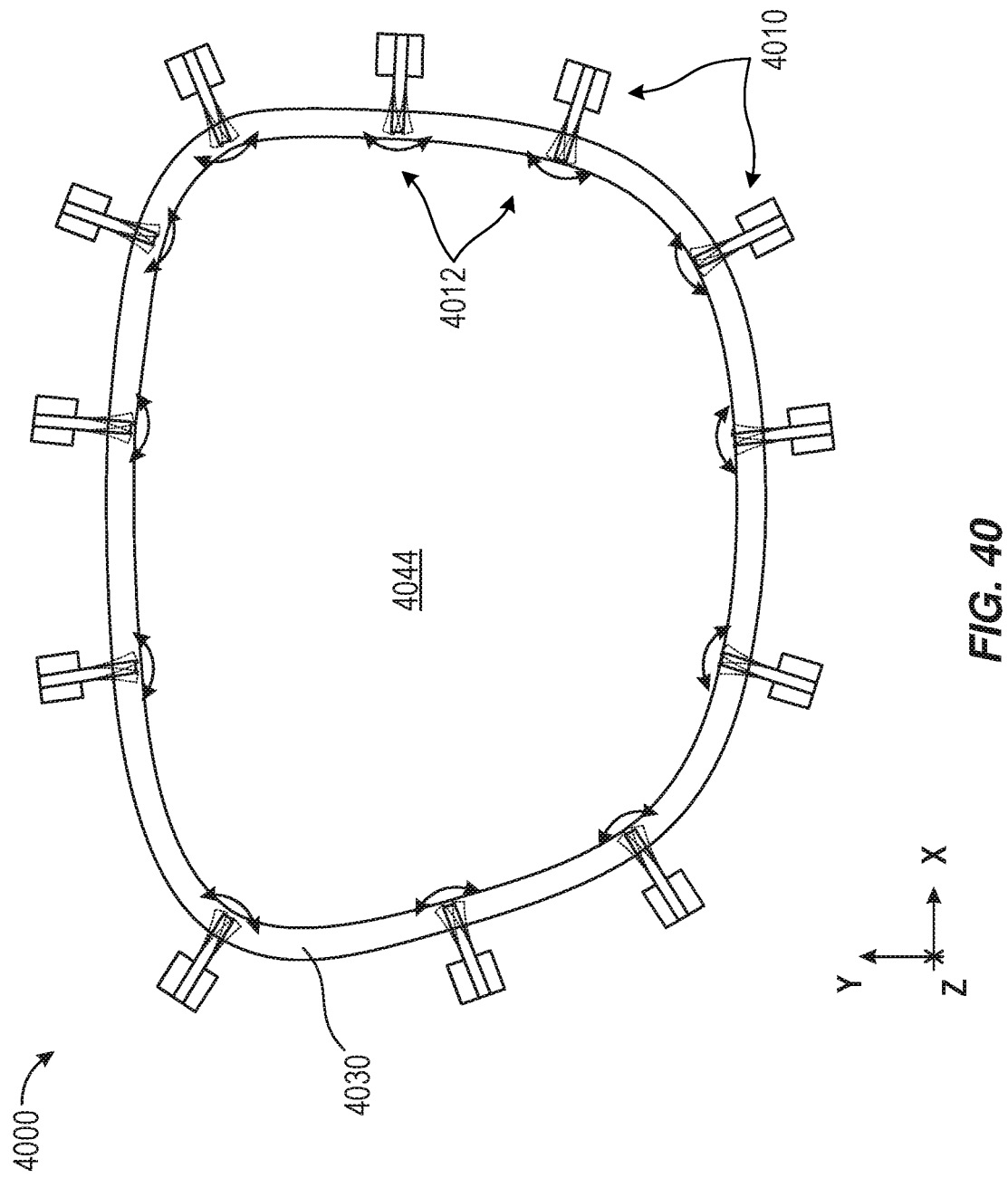
FIG. 40 is a front view of an optical lens assembly with adaptive elements, according to an additional embodiment of the present disclosure.

FIG. 40 shows another embodiment of an optical lens assembly 4000 including a deformable optical element 4044 and a plurality of adaptive elements 4010 positioned along a peripheral region of the deformable optical element 4044. The deformable optical element 4044 may include an electroactive element, as discussed above. A force distributor ring 4030 may also be positioned along the peripheral region of the deformable optical element 4044. The adaptive elements 4010 may contact the deformable optical element 4044 (e.g., via the force distributor ring 4030) at respective contact points 4012. The adaptive elements 4010 may be configured to move the contact points 4012, such as in X- and Y-directions (i.e., generally parallel to a major surface of the deformable optical element 4044), as shown in FIG. 40. In some examples, the adaptive elements 4010 may additionally be configured to move the contact points 4012 in a Z-direction (i.e., transverse to the major surface of the deformable optical element 4044), as will be explained below with reference to FIG. 42.

Figure 41:
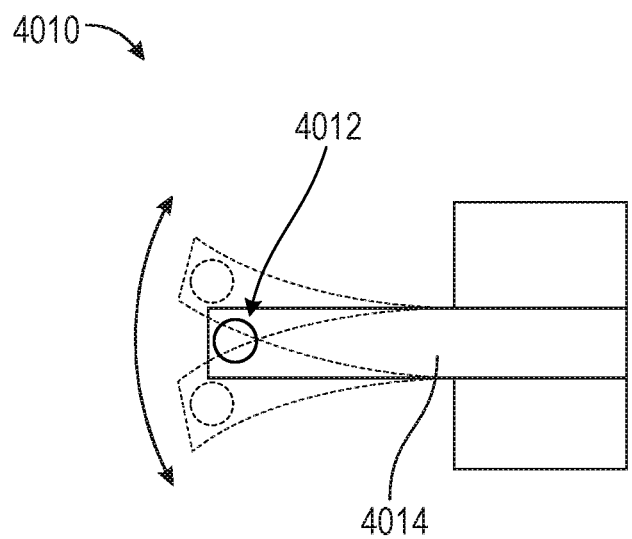
FIG. 41 is a detailed view of an adaptive element of the optical lens assembly of FIG. 40.

FIG. 41 illustrates a detailed view of one of the adaptive elements 4010 of the optical lens assembly 4000 of FIG. 40. As shown in FIG. 41, the adaptive element 4010 may include a cantilever 4014 that is configured to move the contact point 4012 in X- and/or Y-directions (FIG. 40, i.e., generally parallel to the major surface of the deformable optical element 4044). The cantilever 4014 may be formed of a material (e.g., a metal, a polymer, etc.) that may be plastically deformable. For example, the cantilever 4014 may be permanently or semi-permanently bent to move the contact point 4012 as desired. In additional embodiments, the cantilever 4014 may be or include an electroactive material, such as a shape memory alloy or a piezoelectric material, which may be bent by application of a voltage thereto.

Figure 42:
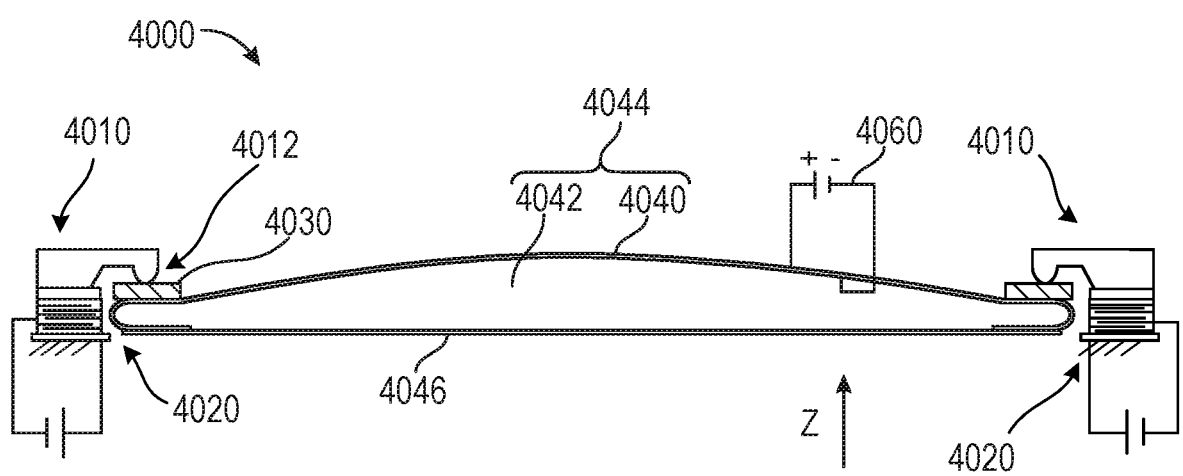
FIG. 42 is a cross-sectional side view of the optical lens assembly of FIG. 40.

FIG. 42 illustrates a cross-sectional side view of the optical lens assembly 4000, similar to the optical lens assembly 3700 shown in FIG. 39. As shown in FIG. 42, the optical lens assembly 4000 may include the adaptive elements 4010, the force distributor ring 4030, and the deformable optical element 4044. The deformable optical element 4044 may include an electroactive element 4040 and a deformable medium 4042 positioned over and coupled to a support element 4046. An electrical driving circuit 4060, which may function with the electroactive element 4040 as a primary actuator, may be operatively coupled to the electroactive element 4040. The adaptive elements 4010 may be positioned on a transducer, such as, for example, a nanovoided polymer actuator 4020. As discussed above with reference to FIG. 39, the nanovoided polymer actuator 4020 may be configured to move the adaptive elements 4010 in a Z-direction (i.e., transverse to a major surface of the deformable optical element 4044).

In FIGS. 39 and 42, the respective adaptive elements 3710 and 4010 are illustrated as mounted on nanovoided polymer actuators 3720, 4020. In additional embodiments, other transducers may be used in place of or in addition to the nanovoided polymer actuators 3720, 4020. For example, the adaptive elements 3710, 4010 may be mounted on a linear spring, a nonlinear spring, a voice coil actuator, a nanovoided polymer actuator, and/or a shape memory alloy.

In the examples described above with reference to FIGS. 35-42, at least portions of the adaptive elements may be adjusted on a one-time or infrequent basis, such as to compensate for variability in the manufacture of the deformable optical elements. FIGS. 43-46 illustrate additional examples of adaptive elements that may be adjusted on a one-time basis and/or during operation and use.

Figure 43:
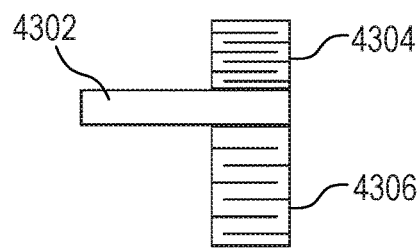
FIGS. 43 and 44 are top views of an adaptive element in two respective states, according to at least one embodiment of the present disclosure.
Figure 44:
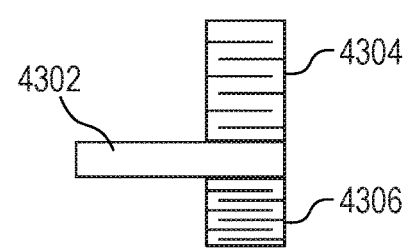

For example, FIGS. 43 and 44 are top views of an adaptive element 4300 that is configured to be adjusted in an X- and/or Y-direction (i.e., generally parallel to a major surface of a corresponding deformable optical element) during operation and use of a corresponding optical lens assembly. The adaptive element 4300 may include a lever 4302 for contacting a deformable optical element, such as via a force distribution ring. A position of the lever 4302 may be adjusted by one or more transducers, such as by a first nanovoided polymer actuator 4304 mounted on a first side of the lever 4302 and a second nanovoided polymer actuator 4306 mounted on a second, opposite side of the lever 4302. To adjust the position of the lever 4302, the nanovoided polymer actuators 4304, 4306 may be separately activated by application of varying voltages thereto. For example, the first nanovoided polymer actuator 4304 may be expanded by applying a first voltage and, simultaneously, the second nanovoided polymer actuator 4306 may be contracted by applying a second, different voltage (e.g., a voltage having an opposite polarity). By controlling and adjusting the applied voltages, a position of the lever 4302 may be controlled and adjusted.

Figure 45:
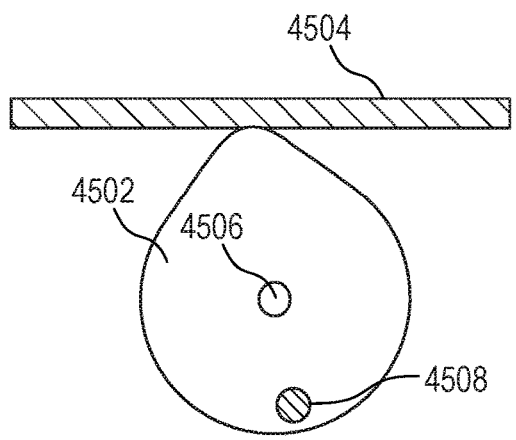
FIGS. 45 and 46 are side views of an adaptive element in two respective states, according to another embodiment of the present disclosure.
Figure 46:
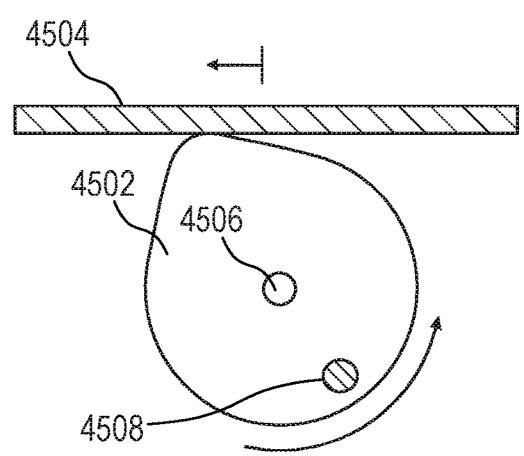

FIGS. 45 and 46 are side views of another adaptive element 4500, which includes a cam 4502. A contact point between the cam 4502 and a peripheral region of a deformable optical element 4504 (e.g., directly or indirectly via a force distributor ring) may be moved from an initial position (FIG. 45) to an adjusted position (FIG. 46) by rotating the cam 4502 about a pivot 4506 thereof. By way of non-limiting example, a pin 4508 engaged with or extending from the cam 4502 may be moved by a transducer (e.g., an electromechanical actuator) to rotate the cam 4502.

For variations between users, compensation for user-specific parameters, such as IPDs, may be beneficial. FIGS. 47-52 illustrate example mechanisms for IPD modification, which may be utilized in conjunction with or independently from the adaptive elements described above.

FIGS. 47 and 48 illustrate an optical lens assembly 4700 in the form of eyeglasses. The optical lens assembly 4700 includes an example IPD modification mechanism 4702 for modifying the lateral distance between a left optical lens body 4704 and a right optical lens body 4706 (left and right being from the perspective of the user). FIG. 49 is a schematic cross-sectional view of the right optical lens body 4706 and IPD modification mechanism 4702.

As shown in FIGS. 47 and 48, the IPD modification mechanism 4702 may include a first threaded rod 4708 mounted in a frame 4720 over the left optical lens body 4704 and a second threaded rod 4710 mounted in the frame 4720 over the right optical lens body 4706. The second threaded rods 4710 may be counter-threaded relative to the first threaded rod 4708. In other words, the first threaded rod 4708 may be threaded to tighten upon rotation in a first direction (e.g., clockwise) and the second threaded rod 4710 may be threaded to tighten upon rotation in a second direction (e.g., counterclockwise). The two threaded rods 4708, 4710 may be coupled to each other at a bridge portion of the frame 4720 with a flexible coupler 4712 to facilitate simultaneous rotation of the threaded rods 4708, 4710.

The optical lens bodies 4704, 4706 may be laterally moveable relative to the frame 4720 and relative to each other. For example, the optical lens bodies 4704, 4706 may be slidably coupled to the frame 4720 in a dovetail joint arrangement, such that one or more dovetail extensions 4714 of the optical lens bodies 4704, 4706 fit within a complementary groove in the frame 4720. The optical lens bodies 4704, 4706 may include internal threads complementary to the threaded rods 4708, 4710. For example, engagement members 4716, 4718 of the optical lens bodies 4704, 4706 may have threaded openings (e.g., threaded through-holes) or surface portions that at least partially surround and threadedly engage with corresponding portions of the threaded rods 4708, 4710, respectively (FIGS. 47 and 48).

The threaded rods 4708, 4710 may be laterally stationary and rotatable relative to the frame 4720. When the threaded rods 4708, 4710 are rotated (e.g., with a screwdriver or rotational actuator) relative to the frame 4720, the left optical lens body 4704 may move along the threads and along the frame 4720 in one direction (e.g., outward or inward) and the right optical lens body 4706 may move along the threads and along the frame 4720 in an opposite direction (e.g., respectively inward or outward). Because the threaded rods 4708, 4710 are counter-threaded relative to each other and are linked to each other with the flexible coupler 4712, the adjustments to the left and right optical lens bodies 4704, 4706 may be made simultaneously by rotating only one of the threaded rods 4708 or 4710 (which may result in rotation of the other threaded rod 4708 or 4710). Such simultaneous adjustment of the right and left optical lens bodies 4704, 4706 may facilitate IPD adjustment while ensuring that the right and left optical lens bodies 4704, 4706 are positioned at equal distances from a midpoint of the frame 4720 (i.e., with the bridge of the frame 4720 consistently centered between the optical lens bodies 4704, 4706 throughout a range of IPD adjustment positions). In additional embodiments, the threaded rods 4708, 4710 may not be coupled to each other via the flexible coupler 4712, and independent IPD adjustments may be made to the left and right optical lens bodies 4704, 4706 by separately rotating the threaded rods 4708, 4710.

The optical lens bodies 4704, 4706 may or may not be implemented as lens assemblies for artificial-reality systems. In other words, the IPD modification mechanism 4702 may be implemented with deformable optical elements, artificial-reality display elements and/or lenses, or conventional optical lenses.

Figure 50:
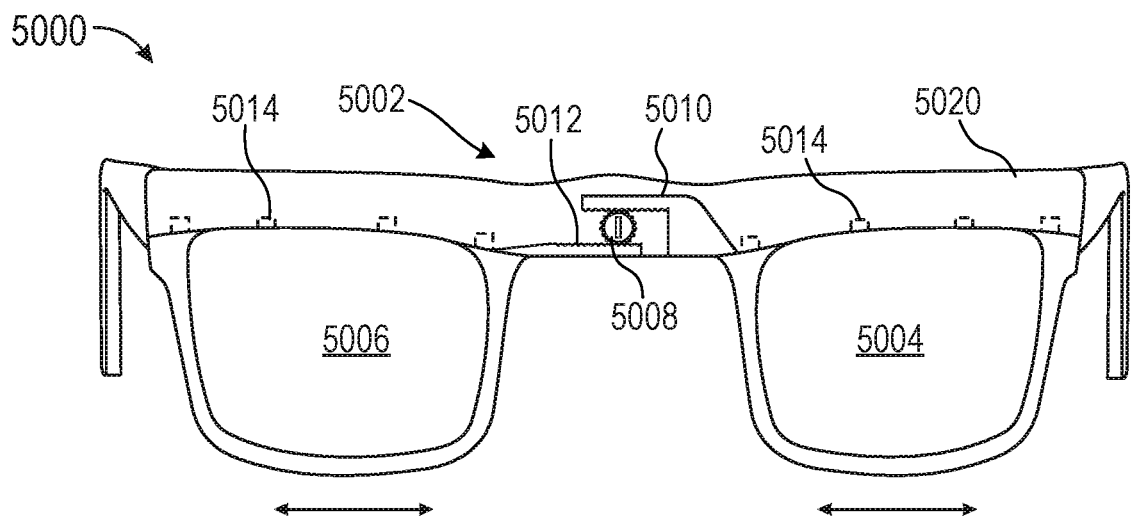
FIG. 50 shows a front view of an optical lens assembly including an interpupillary distance modification mechanism, according to another embodiment of the present disclosure.
Figure 51:
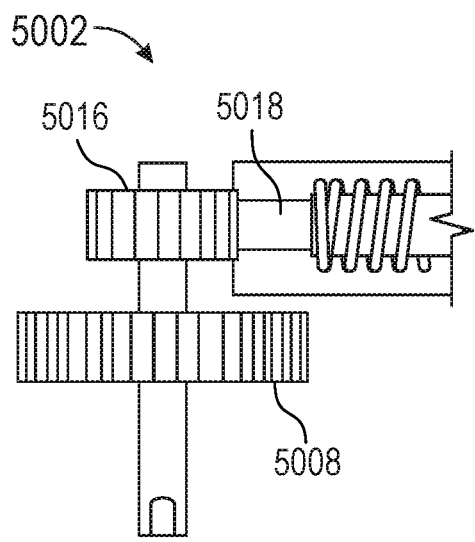
FIG. 51 shows a top view of a portion of the interpupillary distance modification mechanism of FIG. 50.

FIG. 50 illustrates another example of an optical lens assembly 5000 in the form of eyeglasses. The optical lens assembly 5000 includes an example IPD modification mechanism 5002 for modifying the lateral distance between a left optical lens body 5004 and a right optical lens body 5006 (left and right being from the perspective of the user). FIGS. 51 and 52 illustrate different views of portions of the IPD modification mechanism 5002.

As shown in FIG. 50, the IPD modification mechanism 5002 may include a rack and pinion device mounted in a bridge portion of a frame 5020, which may include a control pinion 5008, a first rack 5010 coupled to or extending from the left optical lens body 5004 and engaged with the control pinion 5008, and a second rack 5012 coupled to or extending from the right optical lens body 5006 and engaged with the control pinion 5008. The optical lens bodies 5004, 5006 may be slidably coupled to the frame 5020, such as by dovetail extensions 5014 that may fit within a complementary groove in the frame 5020. When the control pinion 5008 is turned, such as with a screwdriver, knob, or rotational actuator, the first and second racks 5010, 5012 may move in opposite directions to cause the optical lens bodies 5004, 5006 to move toward or away from each other, thus adjusting the IPD of the optical lens assembly 5000.

FIGS. 51 and 52 illustrate different views of portions of the IPD modification mechanism 5002. The IPD modification mechanism 5002 may include a ratcheting mechanism to keep the optical lens bodies 5004, 5006 in place after an IPD adjustment is complete. For example, the control pinion 5008 may be coupled to a detent gear 5016, which may be engaged with a spring-loaded plunger 5018. When the control pinion 5008 is turned, the detent gear 5016 may rotate and the spring-loaded plunger 5018 may retract as it lifts over a tooth of the detent gear 5016. The spring-loaded plunger 5018 may extend by the spring force as it passes the tooth of the detent gear 5016. This process may repeat and continue until the turning of the control pinion 5008 stops, at which time the detent gear 5016 and spring-loaded plunger 5018 may maintain the control pinion 5008, racks 5010, 5012, and optical lens bodies 5004, 5006 in position.

FIG. 53 is a flow diagram that illustrates a method 5300 of fabricating an optical lens assembly. At operation 5310, a substantially transparent electroactive element may be coupled to a substantially transparent substrate (e.g., a support element) to form a deformable optical element. Operation 5310 may be performed in a variety of ways. In some embodiments, a deformable medium may be positioned between the electroactive element and the substrate. The electroactive element and the substrate may be adhered, bonded, bolted, pressed, clipped, or otherwise coupled to each other.

At operation 5320, an electrical driving circuit may be electrically coupled to the electroactive element. When activated, the electrical driving circuit may deform the electroactive element and thus change at least one optical property of the deformable optical element. Operation 5320 may be performed in a variety of ways. For example, at least a first electrode may be coupled to a first side of the electroactive element and a second electrode maybe coupled to a second, opposite side of the electroactive element. For electroactive elements that are formed of multiple layers of electroactive materials and/or passive materials, one or more electrodes may be positioned between such layers. The electrodes may be or include a substantially transparent, electrically conductive material, which may be a continuous material across an area (e.g., substantially an entirety) of the electroactive element. Alternatively or additionally, the electrodes may be or include non-transparent, electrically conductive material (e.g., a metallic material), which may be provided in the form of conductive traces.

At operation 5330, at least one adaptive element may be positioned at a peripheral region of the deformable optical element. Operation 5330 may be performed in a variety of ways. For example, the adaptive element may be positioned in any of the locations and configurations as described above with reference to FIGS. 4-19, 21-31, and 33-52.

At operation 5340, the adaptive element may be adjusted to alter a physical boundary condition of the deformable optical element. Operation 5340 may be performed in a variety of ways. For example, the adaptive element may be adjusted in any of the ways as described above with reference to FIGS. 4-19, 21-31, and 33-52. In some embodiments, adjusting the adaptive element may include moving a point of contact between the adaptive element and the peripheral region of the deformable optical element. In additional embodiments, adjusting the adaptive element may include offsetting a load experienced by an electromechanical actuator that is configured to deform the deformable optical element.

FIG. 54 is a flow diagram that illustrates a method 5400 of operating an optical lens assembly. At operation 5410, a deformable optical lens may be deformed by application of a voltage by an electrical driving circuit to an electroactive element of the deformable optical lens. Operation 5410 may be performed in a variety of ways, such as those discussed above.

At operation 5420, a physical boundary condition of the deformable optical lens may be altered with an adaptive element coupled to a peripheral region of the deformable optical element. Operation 5420 may be performed in a variety of ways, such as those discussed above. For example, a point of contact between the adaptive element and the deformable optical element may be changed, and/or a load experienced by an electromechanical actuator may be offset.

Accordingly, embodiments of the present disclosure include optical lens assemblies with deformable optical elements and adaptive elements that are configured to alter at least one physical boundary condition of the deformable optical elements. The alteration of the physical boundary condition(s) may compensate for manufacturing variations and/or may be used to otherwise modify at least one optical property of the optical lens assemblies before or during use.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical lens assembly, comprising:
   a deformable optical element held by a frame, the deformable optical element comprising:
   a substantially transparent electroactive element positioned at least partially within an optical aperture of the deformable optical element; and
   an electrical driving circuit configured to apply, via at least one substantially transparent electrode that is positioned at least partially within both the optical aperture of the deformable optical element and the frame, a voltage to the electroactive element to deform the electroactive element and thus change at least one optical property of the deformable optical element; and
   at least one adaptive element positioned at a peripheral region of the deformable optical element outside of the optical aperture, wherein the adaptive element is configured to alter a physical boundary condition of the deformable optical element.

2. The optical lens assembly of claim 1, wherein the adaptive element comprises an adjustment mechanism that is configured to alter the physical boundary condition of the deformable optical element to calibrate the deformable optical element.

3. The optical lens assembly of claim 1, wherein the adaptive element comprises an adjustment mechanism that is configured to adjust a position of a contact point of the adaptive element against the peripheral region of the deformable optical element.

4. The optical lens assembly of claim 3, wherein the adjustment mechanism comprises at least one of:
   a set screw that, when rotated, adjusts the position of the contact point;
   a bendable cantilever that, when bent, adjusts the position of the contact point;
   a rotatable cam that, when rotated, adjusts the position of the contact point; or
   a slide comprising a pin in a slot that, when the pin is slid in the slot, adjusts the position of the contact point.

5. The optical lens assembly of claim 3, wherein the adaptive element further comprises a transducer coupled to the adjustment mechanism and configured to compress or relax the peripheral region of the deformable optical element at the contact point.

6. The optical lens assembly of claim 5, wherein the transducer comprises
   at least one of:
   a linear spring;
   a nonlinear spring;
   a voice coil actuator;
   a nanovoided polymer actuator; or
   a shape memory alloy.

7. The optical lens assembly of claim 1, wherein the at least one adaptive element comprises a plurality of adaptive elements positioned along the peripheral region of the deformable optical element.

8. The optical lens assembly of claim 1, wherein the electroactive element comprises at least one of the following materials arranged in a single layer, double layer, or multi-layer structure:
   a dielectric elastomer material;

a piezoelectric material; or an electrostrictive material.

9. The optical lens assembly of claim 1, further comprising:

another deformable optical element; and at least one interpupillary distance modification mechanism configured to laterally move the deformable optical elements relative to each other to adjust an interpupillary distance of the optical lens assembly.

10. The optical lens assembly of claim 9, wherein the interpupillary distance modification mechanism comprises at least one of:

a rack and pinion mechanism; or a threaded rod rotatably coupled to the deformable optical element and a counter-threaded rod rotatably coupled to the other deformable optical element.

11. The optical lens assembly of claim 1, wherein the deformable optical element further comprises a plurality of first electrode traces on a first side of the electroactive element and within the optical aperture and at least one second electrode on a second, opposite side of the electroactive element.

12. The optical lens assembly of claim 11, wherein each first electrode trace of the plurality of first electrode traces is individually addressable and selectively actuatable relative to the other first electrode traces of the plurality of first electrode traces.

13. An optical lens system, comprising:

a frame;

at least one deformable optical element held by the frame, the deformable optical element comprising:

a substantially transparent electroactive element positioned at least partially within an optical aperture of the deformable optical element held by the frame; and an electrical driving circuit configured to apply, via at least one substantially transparent electrode that is positioned at least partially within both the optical aperture of the deformable optical element and the frame, a voltage to the electroactive element to deform the electroactive element and thus change at least one optical property of the deformable optical element;

at least one adaptive element coupled to the frame and to a peripheral region of the deformable optical element outside of the optical aperture, wherein the adaptive element is configured to alter a physical boundary condition of the deformable optical element; and at least one electronic display supported by the frame, wherein the deformable optical element is positioned in front of the electronic display relative to a user of the optical lens system.

14. The optical lens system of claim 13, wherein the adaptive element comprises an adjustment mechanism configured to apply a force to at least a portion of the peripheral region of the deformable optical element.

15. The optical lens system of claim 13, wherein the deformable optical element further comprises:

a substantially transparent rigid substrate supporting the electroactive element; and a substantially transparent deformable medium between the rigid substrate and the electroactive element.

16. The optical lens system of claim 15, wherein the deformable optical element is deformable into at least one of the following shapes for at least a part of its operating range:

a prism lens;

a freeform lens;

a meniscus lens;

a bi-convex lens;

a plano-convex lens;

a plano-concave lens; or a bi-concave lens.

17. The optical lens system of claim 13, wherein the adaptive element is configured to alter at least one of the following properties of the deformable optical element:

centration;

cylinder power;

prism;

chromatic aberration;

spherical aberration;

field curvature;

coma;

astigmatism; or distortion.

18. A method of fabricating an optical lens assembly, the method comprising:

coupling a substantially transparent electroactive element to a substantially transparent substrate to form a deformable optical element;

positioning the deformable optical element within a frame;

electrically coupling an electrical driving circuit to the electroactive element via at least one substantially transparent electrode, positioned at least partially within both an optical aperture of the deformable optical element and the frame, to deform the electroactive element and thus change at least one optical property of the deformable optical element when activated;

positioning at least one adaptive element at a peripheral region of the deformable optical element; and adjusting the adaptive element to alter a physical boundary condition of the deformable optical element.

19. The method of claim 18, wherein adjusting the adaptive element comprises moving a point of contact between the adaptive element and the peripheral region of the deformable optical element.

20. The method of claim 18, wherein adjusting the adaptive element comprises offsetting a load experienced by an electromechanical actuator that is configured to deform the deformable optical element.

* * * * *